(12) United States Patent
Zambetti et al.

(10) Patent No.: US 10,613,743 B2
(45) Date of Patent: Apr. 7, 2020

(54) USER INTERFACE FOR RECEIVING USER INPUT

(71) Applicant: Apple Inc., Cupertino, CA (US)

(72) Inventors: Nicholas Zambetti, San Francisco, CA (US); Jonathan R. Dascola, San Francisco, CA (US); Imran Chaudhri, San Francisco, CA (US); Anton M. Davydov, Gilroy, CA (US); Jonathan P. Ive, San Francisco, CA (US); Stephen O. Lemay, Palo Alto, CA (US); Kevin Lynch, Woodside, CA (US); Bas Ording, San Francisco, CA (US); Wan Si Wan, Sunnyvale, CA (US); Lawrence Y. Yang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 14/833,014

(22) Filed: Aug. 21, 2015

(65) Prior Publication Data

US 2016/0117147 A1 Apr. 28, 2016

Related U.S. Application Data

(60) Provisional application No. 62/129,903, filed on Mar. 8, 2015, provisional application No. 62/127,800, filed
(Continued)

(51) Int. Cl.
G06F 3/0488 (2013.01)
H04M 1/725 (2006.01)
(Continued)

(52) U.S. Cl.
CPC ........ G06F 3/04883 (2013.01); G06F 3/0236 (2013.01); G06F 3/038 (2013.01);
(Continued)

(58) Field of Classification Search
CPC ...... G06F 3/048; G06F 3/0481; G06F 3/0482; G06F 3/04883; G06F 3/0362; G06F 8/38;
(Continued)

(56) References Cited

U.S. PATENT DOCUMENTS 5,208,790 A 5/1993 Sato
5,455,808 A 10/1995 Grupp et al.
(Continued)

FOREIGN PATENT DOCUMENTS

AU 2010249319 A1 6/2012
AU 2015101019 A4 9/2015
(Continued)

OTHER PUBLICATIONS

Office Action received for Australian Patent Application No. 2015101021, dated Apr. 26, 2016, 4 pages.
(Continued)

*Primary Examiner* — John T Repsher, III
(74) *Attorney, Agent, or Firm* — Dentons US LLP

(57) ABSTRACT

The present disclosure relates to user interfaces for receiving user input. In some examples, a device determines which user input technique a user has accessed most recently, and displays the corresponding user interface. In some examples, a device scrolls through a set of information on the display. When a threshold criteria is satisfied, the device displays an index object fully or partially overlaying the set of information. In some examples, a device displays an emoji graphical object, which is visually manipulated based on user input. The emoji graphical object is transmitted to a recipient. In some examples, a device displays paging affordances that enlarge and allow a user to select a particular page of a user interface. In some examples, the device displays user interfaces for various input methods, including
(Continued)

multiple emoji graphical objects. In some examples, a keyboard is displays for receiving user input.

36 Claims, 58 Drawing Sheets

Related U.S. Application Data on Mar. 3, 2015, provisional application No. 62/044,923, filed on Sep. 2, 2014.

(51) Int. Cl.

| | | |
|---|---|---|
| *G06F 3/0362* | (2013.01) | |
| *G06F 8/38* | (2018.01) | |
| *G06F 3/023* | (2006.01) | |
| *G06F 3/038* | (2013.01) | |
| *G06F 3/0484* | (2013.01) | |
| *G06F 3/0483* | (2013.01) | |
| *G06F 3/041* | (2006.01) | |
| *G06F 3/0481* | (2013.01) | |
| *G06F 3/0485* | (2013.01) | |
| *G06F 3/0482* | (2013.01) | |
| *H04M 1/2745* | (2020.01) | |
| *H04M 1/27457* | (2020.01) | |

(52) U.S. Cl.
CPC .......... *G06F 3/0362* (2013.01); *G06F 3/0412* (2013.01); *G06F 3/0482* (2013.01); *G06F 3/0483* (2013.01); *G06F 3/0484* (2013.01); *G06F 3/0485* (2013.01); *G06F 3/04817* (2013.01); *G06F 3/04845* (2013.01); *G06F 3/04886* (2013.01); *G06F 8/38* (2013.01); *H04M 1/72519* (2013.01); *G06F 2203/04105* (2013.01); *H04M 1/27457* (2020.01); *H04M 1/72547* (2013.01); *H04M 2250/22* (2013.01)

(58) Field of Classification Search
CPC .... G06F 3/0236; G06F 3/038; G06F 3/04845; G06F 3/0483; G06F 3/0412; G06F 3/04817; G06F 3/04886; G06F 3/0485; G06F 3/0484; G06F 2203/04105; H04M 1/72519; H04M 1/274533; H04M 1/72547; H04M 2250/22
USPC .......................................................... 715/727
See application file for complete search history.

(56) References Cited

U.S. PATENT DOCUMENTS

| | | | |
|---|---|---|---|
| 5,508,979 A | 4/1996 | Eisenegger | |
| 5,659,693 A | 8/1997 | Hansen et al. | |
| 5,825,353 A | 10/1998 | Will | |
| 5,845,257 A | 12/1998 | Fu et al. | |
| 5,892,519 A | 4/1999 | Hirai | |
| 5,986,655 A | 11/1999 | Chiu et al. | |
| 5,999,195 A | 12/1999 | Santangeli | |
| 6,043,818 A | 3/2000 | Nakano et al. | |
| 6,279,018 B1 | 8/2001 | Kudrolli et al. | |
| 6,359,839 B1 | 3/2002 | Schenk et al. | |
| 6,441,824 B2 | 8/2002 | Hertzfeld | |
| 6,449,219 B1 | 9/2002 | Hepp et al. | |
| 6,452,597 B1 | 9/2002 | Goldberg et al. | |
| 6,477,117 B1 | 11/2002 | Narayanaswami et al. | |
| 6,496,780 B1 | 12/2002 | Harris et al. | |
| 6,556,222 B1 | 4/2003 | Narayanaswami | |
| 6,728,533 B2 | 4/2004 | Ishii | |
| 6,809,724 B1 | 10/2004 | Shiraishi et al. | |
| 6,871,076 B2 | 3/2005 | Samn | |
| 7,203,380 B2 | 4/2007 | Chiu et al. | |
| 7,257,254 B2 | 8/2007 | Tunney | |
| 7,479,949 B2 | 1/2009 | Jobs et al. | |
| 7,515,509 B2 | 4/2009 | Klein | |
| 7,751,285 B1 | 7/2010 | Cain | |
| 7,843,769 B2 | 11/2010 | Ishida et al. | |
| 7,898,542 B1 | 3/2011 | Yu et al. | |
| 8,462,997 B2 | 6/2013 | Pettit et al. | |
| 8,584,031 B2 | 11/2013 | Moore et al. | |
| 8,595,649 B2 | 11/2013 | Sherrard et al. | |
| 8,732,609 B1 | 5/2014 | Bayersdorfer et al. | |
| 8,884,874 B1 | 11/2014 | Kim et al. | |
| 8,963,894 B2 | 2/2015 | Klassen et al. | |
| 8,996,639 B1* | 3/2015 | Faaborg .................. H04L 51/02 455/412.1 |
| 9,070,092 B2 | 6/2015 | Chou et al. | |
| 9,141,270 B1 | 9/2015 | Stuart et al. | |
| 9,173,052 B2 | 10/2015 | Hauser et al. | |
| 9,244,562 B1 | 1/2016 | Rosenberg et al. | |
| 9,459,781 B2 | 10/2016 | Wilson et al. | |
| 9,547,425 B2 | 1/2017 | Wilson et al. | |
| 9,582,165 B2 | 2/2017 | Wilson et al. | |
| 9,753,436 B2 | 9/2017 | Ely et al. | |
| 2002/0054066 A1 | 5/2002 | Kikinis et al. | |
| 2002/0054541 A1 | 5/2002 | Hall | |
| 2002/0131331 A1 | 9/2002 | Molander | |
| 2003/0002391 A1 | 1/2003 | Biggs | |
| 2003/0027621 A1 | 2/2003 | Libby et al. | |
| 2003/0067497 A1 | 4/2003 | Pichon | |
| 2003/0074647 A1* | 4/2003 | Andrew .................. G06F 9/4443 717/100 |
| 2003/0164847 A1 | 9/2003 | Zaima et al. | |
| 2003/0214885 A1 | 11/2003 | Powell et al. | |
| 2004/0001105 A1 | 1/2004 | Chew et al. | |
| 2004/0021699 A1 | 2/2004 | Fildebrandt | |
| 2004/0168107 A1 | 8/2004 | Sharp et al. | |
| 2004/0192332 A1 | 9/2004 | Samn | |
| 2004/0218472 A1 | 11/2004 | Narayanaswami et al. | |
| 2005/0041667 A1 | 2/2005 | Miller et al. | |
| 2005/0094492 A1 | 5/2005 | Rosevear | |
| 2005/0125744 A1 | 6/2005 | Hubbard et al. | |
| 2005/0156873 A1 | 7/2005 | Walter et al. | |
| 2005/0200611 A1 | 9/2005 | Goto et al. | |
| 2005/0278757 A1 | 12/2005 | Grossman et al. | |
| 2006/0035628 A1 | 2/2006 | Miller et al. | |
| 2006/0035632 A1* | 2/2006 | Sorvari .................. H04M 1/271 455/418 |
| 2006/0055700 A1 | 3/2006 | Niles et al. | |
| 2006/0085765 A1 | 4/2006 | Peterson et al. | |
| 2006/0214935 A1 | 9/2006 | Boyd et al. | |
| 2007/0006096 A1 | 1/2007 | Kim et al. | |
| 2007/0082707 A1 | 4/2007 | Flynt et al. | |
| 2007/0094330 A1 | 4/2007 | Russell | |
| 2007/0101279 A1 | 5/2007 | Chaudhri et al. | |
| 2007/0162872 A1 | 7/2007 | Hong et al. | |
| 2007/0211042 A1 | 9/2007 | Kim et al. | |
| 2007/0236475 A1 | 10/2007 | Wherry | |
| 2007/0239754 A1 | 10/2007 | Schnitman | |
| 2007/0261537 A1 | 11/2007 | Eronen et al. | |
| 2007/0279190 A1 | 12/2007 | Lugt et al. | |
| 2008/0046839 A1* | 2/2008 | Mehra .................. G06F 3/0233 715/810 |
| 2008/0082930 A1 | 4/2008 | Omernick et al. | |
| 2008/0127268 A1 | 5/2008 | Bergeron et al. | |
| 2008/0155428 A1* | 6/2008 | Lee ........................ G06F 3/0482 715/745 |
| 2008/0168396 A1 | 7/2008 | Mates et al. | |
| 2008/0192021 A1 | 8/2008 | Lim et al. | |
| 2008/0215240 A1 | 9/2008 | Howard et al. | |
| 2008/0246778 A1 | 10/2008 | Ham et al. | |
| 2009/0059730 A1 | 3/2009 | Lyons et al. | |
| 2009/0100342 A1 | 4/2009 | Jakobson | |
| 2009/0164923 A1 | 6/2009 | Ovi | |
| 2009/0178007 A1 | 7/2009 | Matas et al. | |
| 2009/0199130 A1 | 8/2009 | Tsern et al. | |
| 2009/0231356 A1 | 9/2009 | Barnes et al. | |
| 2009/0249247 A1 | 10/2009 | Tseng et al. | |
| 2009/0254624 A1 | 10/2009 | Baudin et al. | |
| 2009/0259958 A1 | 10/2009 | Ban | |
| 2009/0287470 A1 | 11/2009 | Farnsworth et al. | |
| 2009/0300146 A1 | 12/2009 | Park et al. | |

(56) References Cited

U.S. PATENT DOCUMENTS

| | | |
|---|---|---|
| 2009/0305732 A1 | 12/2009 | Marcellino et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0064255 A1 | 3/2010 | Rottler et al. |
| 2010/0085203 A1 | 4/2010 | Kahn et al. |
| 2010/0110082 A1 | 5/2010 | Myrick et al. |
| 2010/0123724 A1 | 5/2010 | Moore et al. |
| 2010/0141606 A1 | 6/2010 | Bae et al. |
| 2010/0156833 A1 | 6/2010 | Kim et al. |
| 2010/0157742 A1 | 6/2010 | Relyea et al. |
| 2010/0217657 A1 | 8/2010 | Gazdzinski |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0251176 A1 | 9/2010 | Fong et al. |
| 2010/0281374 A1 | 11/2010 | Schulz et al. |
| 2010/0295789 A1 | 11/2010 | Shin et al. |
| 2011/0016425 A1 | 1/2011 | Homburg et al. |
| 2011/0018695 A1 | 1/2011 | Bells et al. |
| 2011/0025719 A1 | 2/2011 | Yanase |
| 2011/0029870 A1 | 2/2011 | May et al. |
| 2011/0076992 A1 | 3/2011 | Chou et al. |
| 2011/0078624 A1 | 3/2011 | Missig et al. |
| 2011/0083111 A1 | 4/2011 | Forutanpour et al. |
| 2011/0138329 A1 | 6/2011 | Wells et al. |
| 2011/0151415 A1 | 6/2011 | Darling |
| 2011/0157046 A1 | 6/2011 | Lee et al. |
| 2011/0179372 A1 | 7/2011 | Moore et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0265002 A1 | 10/2011 | Hong et al. |
| 2011/0296324 A1 | 12/2011 | Goossens et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0026110 A1 | 2/2012 | Yamano |
| 2012/0028707 A1 | 2/2012 | Raitt et al. |
| 2012/0059787 A1 | 3/2012 | Brown et al. |
| 2012/0084729 A1 | 4/2012 | Lin |
| 2012/0092383 A1 | 4/2012 | Hysek et al. |
| 2012/0110438 A1 | 5/2012 | Peraza et al. |
| 2012/0117507 A1 | 5/2012 | Tseng et al. |
| 2012/0124499 A1 | 5/2012 | Tsai |
| 2012/0154293 A1 | 6/2012 | Hinckley et al. |
| 2012/0159380 A1 | 6/2012 | Kocienda et al. |
| 2012/0167008 A1 | 6/2012 | Zaman et al. |
| 2012/0223935 A1 | 9/2012 | Renwick |
| 2012/0243735 A1 | 9/2012 | Wu |
| 2012/0254804 A1 | 10/2012 | Sheha et al. |
| 2012/0304084 A1 | 11/2012 | Kim et al. |
| 2012/0324390 A1 | 12/2012 | Tao |
| 2013/0014019 A1 | 1/2013 | Kim et al. |
| 2013/0024781 A1 | 1/2013 | Douillet et al. |
| 2013/0024802 A1* | 1/2013 | Zeng ............... G06F 9/4443 715/780 |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0067391 A1 | 3/2013 | Pittappilly et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler, III et al. |
| 2013/0116967 A1 | 5/2013 | Akcasu et al. |
| 2013/0117383 A1 | 5/2013 | Hymel |
| 2013/0141365 A1 | 6/2013 | Lynn et al. |
| 2013/0141371 A1 | 6/2013 | Hallford et al. |
| 2013/0169870 A1 | 7/2013 | Lee et al. |
| 2013/0191785 A1 | 7/2013 | Rampson et al. |
| 2013/0205194 A1 | 8/2013 | Decker et al. |
| 2013/0215044 A1 | 8/2013 | Ahn et al. |
| 2013/0234929 A1 | 9/2013 | Libin |
| 2013/0234969 A1 | 9/2013 | Yeh et al. |
| 2013/0254705 A1 | 9/2013 | Mooring et al. |
| 2013/0263043 A1 | 10/2013 | Sarbin |
| 2013/0275875 A1 | 10/2013 | Gruber et al. |
| 2013/0326418 A1 | 12/2013 | Utsuki et al. |
| 2014/0013414 A1 | 1/2014 | Bruck |
| 2014/0022183 A1 | 1/2014 | Ayoub et al. |
| 2014/0055388 A1 | 2/2014 | Yook et al. |
| 2014/0055495 A1 | 2/2014 | Kim et al. |
| 2014/0059493 A1 | 2/2014 | Kim |
| 2014/0074570 A1 | 3/2014 | Hope et al. |
| 2014/0082533 A1 | 3/2014 | Kelley |
| 2014/0123005 A1 | 5/2014 | Forstall et al. |
| 2014/0126336 A1 | 5/2014 | Goeller et al. |
| 2014/0129959 A1 | 5/2014 | Battles et al. |
| 2014/0143678 A1 | 5/2014 | Mistry et al. |
| 2014/0143682 A1 | 5/2014 | Druck |
| 2014/0143737 A1 | 5/2014 | Mistry et al. |
| 2014/0149878 A1 | 5/2014 | Mischari et al. |
| 2014/0157167 A1 | 6/2014 | Zhu |
| 2014/0157321 A1 | 6/2014 | Kurita |
| 2014/0164955 A1 | 6/2014 | Thiruvidam et al. |
| 2014/0173439 A1 | 6/2014 | Gutierrez et al. |
| 2014/0181219 A1 | 6/2014 | Wang et al. |
| 2014/0189577 A1 | 6/2014 | Shuttleworth et al. |
| 2014/0189584 A1 | 7/2014 | Weng et al. |
| 2014/0195972 A1 | 7/2014 | Lee et al. |
| 2014/0197946 A1 | 7/2014 | Park et al. |
| 2014/0229752 A1 | 8/2014 | Lee |
| 2014/0244165 A1 | 8/2014 | Bells |
| 2014/0245177 A1 | 8/2014 | Maklouf |
| 2014/0250374 A1 | 9/2014 | Ohki et al. |
| 2014/0250391 A1 | 9/2014 | Jong et al. |
| 2014/0258935 A1 | 9/2014 | Nishida et al. |
| 2014/0267303 A1 | 9/2014 | Larkin et al. |
| 2014/0282103 A1 | 9/2014 | Crandall |
| 2014/0282254 A1 | 9/2014 | Feiereisen et al. |
| 2014/0289660 A1 | 9/2014 | Min |
| 2014/0304664 A1 | 10/2014 | Lee et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0337791 A1 | 11/2014 | Agnetta et al. |
| 2014/0347289 A1 | 11/2014 | Suh et al. |
| 2014/0380229 A1 | 12/2014 | Volodin et al. |
| 2015/0022438 A1 | 1/2015 | Hong |
| 2015/0100537 A1* | 4/2015 | Grieves ............... G06N 5/048 706/52 |
| 2015/0100621 A1 | 4/2015 | Pan |
| 2015/0106752 A1 | 4/2015 | Yang |
| 2015/0113468 A1 | 4/2015 | Clark |
| 2015/0117162 A1 | 4/2015 | Tsai |
| 2015/0143234 A1 | 5/2015 | Norris, III |
| 2015/0160806 A1 | 6/2015 | Fey et al. |
| 2015/0160856 A1 | 6/2015 | Jang et al. |
| 2015/0185703 A1 | 7/2015 | Tanaka |
| 2015/0195179 A1* | 7/2015 | Skare ............... H04L 43/16 715/745 |
| 2015/0286372 A1 | 10/2015 | Swindell et al. |
| 2015/0301608 A1 | 10/2015 | Nagaraju et al. |
| 2015/0312175 A1 | 10/2015 | Langholz |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0048283 A1 | 2/2016 | Yang et al. |
| 2016/0062589 A1 | 3/2016 | Wan et al. |
| 2016/0098137 A1 | 4/2016 | Kim et al. |
| 2016/0188181 A1 | 6/2016 | Smith |
| 2016/0193502 A1 | 7/2016 | Kim et al. |
| 2016/0259542 A1 | 9/2016 | Chaudhri et al. |
| 2016/0261675 A1 | 9/2016 | Block et al. |
| 2016/0327911 A1 | 11/2016 | Eim et al. |
| 2016/0358311 A1 | 12/2016 | Chen et al. |
| 2017/0010677 A1 | 1/2017 | Roh et al. |
| 2017/0068407 A1 | 3/2017 | Wilson et al. |

(56) References Cited

U.S. PATENT DOCUMENTS

| | | |
|---|---|---|
| 2017/0068439 A1 | 3/2017 | Mohseni |
| 2017/0123640 A1 | 5/2017 | Wilson et al. |
| 2017/0134321 A1 | 5/2017 | Ushio et al. |
| 2018/0081515 A1 | 3/2018 | Block et al. |

FOREIGN PATENT DOCUMENTS

| | | |
|---|---|---|
| CA | 2781636 A1 | 7/2010 |
| CA | 2792987 A1 | 10/2011 |
| CH | 707412 A2 | 6/2014 |
| CN | 1536511 A | 10/2004 |
| CN | 1997957 A | 7/2007 |
| CN | 101098535 A | 1/2008 |
| CN | 101382438 A | 3/2009 |
| CN | 101627349 A | 1/2010 |
| CN | 101702112 A | 5/2010 |
| CN | 101819486 A | 9/2010 |
| CN | 101981987 A | 2/2011 |
| CN | 102687176 A | 9/2012 |
| CN | 102790826 A | 11/2012 |
| CN | 103399480 A | 11/2013 |
| CN | 103562832 A | 2/2014 |
| CN | 103607660 A | 2/2014 |
| CN | 103713843 A | 4/2014 |
| CN | 103744671 A | 4/2014 |
| CN | 103902165 A | 7/2014 |
| CN | 205608658 U | 9/2016 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1777611 A1 | 4/2007 |
| EP | 1832969 A2 | 9/2007 |
| EP | 2040146 A2 | 3/2009 |
| EP | 2194508 A1 | 6/2010 |
| EP | 2204702 A1 | 7/2010 |
| EP | 2302493 A2 | 3/2011 |
| EP | 2312512 A2 | 4/2011 |
| EP | 2413577 A2 | 2/2012 |
| EP | 2423810 A1 | 2/2012 |
| EP | 2426902 A1 | 3/2012 |
| EP | 2437148 A2 | 4/2012 |
| EP | 2602759 A2 | 6/2013 |
| EP | 2615607 A2 | 7/2013 |
| EP | 2653961 A1 | 10/2013 |
| EP | 2677775 A1 | 12/2013 |
| EP | 2720126 A1 | 4/2014 |
| EP | 2738640 A2 | 6/2014 |
| EP | 2821912 A1 | 1/2015 |
| GB | 2370208 A | 6/2002 |
| GB | 2475669 A | 6/2011 |
| JP | 8-110955 A | 4/1996 |
| JP | 9-251084 A | 9/1997 |
| JP | 11-232013 A | 8/1999 |
| JP | 2002-507718 A | 3/2002 |
| JP | 2002-271451 A | 9/2002 |
| JP | 2003-296246 A | 10/2003 |
| JP | 2004-519033 A | 6/2004 |
| JP | 2005-532607 A | 10/2005 |
| JP | 2005-339105 A | 12/2005 |
| JP | 2008-97202 A | 4/2008 |
| JP | 2009-147889 A | 7/2009 |
| JP | 2010-124181 A | 6/2010 |
| JP | 2010-257051 A | 11/2010 |
| JP | 3168099 U | 6/2011 |
| JP | 2011-530101 A | 12/2011 |
| JP | 2012-053642 A | 3/2012 |
| JP | 2012-505478 A | 3/2012 |
| JP | 2012-123475 A | 6/2012 |
| JP | 2012-147432 A | 8/2012 |
| JP | 2012-517630 A | 8/2012 |
| JP | 2012-203832 A | 10/2012 |
| JP | 2012-531607 A | 12/2012 |
| JP | 2014-123197 A | 7/2014 |
| JP | 2014-216868 A | 11/2014 |
| JP | 2015-210587 A | 11/2015 |
| KR | 10-2014-0064687 A | 5/2014 |
| KR | 10-2015-0001287 A | 1/2015 |
| TW | 498240 B | 8/2002 |
| TW | 200512616 A | 4/2005 |
| TW | 200850058 A | 12/2008 |
| TW | 201232486 A | 8/2012 |
| TW | M435665 U | 8/2012 |
| TW | 201419115 A | 5/2014 |
| WO | 99/66394 A1 | 12/1999 |
| WO | 99/66395 A2 | 12/1999 |
| WO | 01/71433 A1 | 9/2001 |
| WO | 02/054157 A1 | 7/2002 |
| WO | 2004/056107 A1 | 7/2004 |
| WO | 2006/112641 A1 | 10/2006 |
| WO | 2007/018881 A2 | 2/2007 |
| WO | 2010/017627 A1 | 2/2010 |
| WO | 2011/000893 A1 | 1/2011 |
| WO | 2011/130849 A8 | 10/2011 |
| WO | 2012/161434 A2 | 11/2012 |
| WO | 2013/051048 A1 | 4/2013 |
| WO | 2013/169842 A2 | 11/2013 |
| WO | 2013/169849 A2 | 11/2013 |
| WO | 2013/169851 A2 | 11/2013 |
| WO | 2013/169854 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/169882 A2 | 11/2013 |
| WO | 2014/024000 A1 | 2/2014 |
| WO | 2014/078114 A1 | 5/2014 |
| WO | 2014/105276 A1 | 7/2014 |
| WO | 2014/105278 A1 | 7/2014 |
| WO | 2014/105279 A1 | 7/2014 |
| WO | 2016/036522 A2 | 3/2016 |

OTHER PUBLICATIONS

Office Action received for Chinese Patent Application No. 201520595384.6, dated Mar. 25, 2016, 3 pages (1 page of English Translation and 2 pages of Official copy).

Office Action received for Chinese Patent Application No. 201520594249.X, dated Mar. 25, 2016, 3 pages (1 page of English Translation and 2 pages of Official copy).

Office Action received for Chinese Patent Application No. 201520595385.0, dated Mar. 25, 2016, 3 pages (1 page of English Translation and 2 pages of Official copy).

Office Action received for Chinese Patent Application No. 201520595408.8, dated Mar. 25, 2016, 3 pages (1 page of English Translation and 2 pages of Official copy).

Office Action received for Chinese Patent Application No. 201520595538.1, dated Mar. 25, 2016, 3 pages (1 page of English Translation and 2 pages of Official copy).

Non Final Office Action received for U.S. Appl. No. 14/815,890, dated Oct. 19, 2015, 5 pages.

Non-Final Office Action received for U.S. Appl. No. 14/815,898, dated Dec. 1, 2015, 22 pages.

Non-Final Office Action received for U.S. Appl. No. 14/815,907, dated Jan. 12, 2016, 22 pages.

Non-Final Office Action received for U.S. Appl. No. 14/815,909, dated Nov. 27, 2015, 12 pages.

Office Action received for Australian Patent Application No. 2015101019, dated Oct. 14, 2015, 3 pages.

Office Action received for Australian Patent Application No. 2015101020, dated Oct. 26, 2015, 8 pages.

Office Action received for Australian Patent Application No. 2015101183, dated Nov. 6, 2015, 4 pages.

Office Action received for Chinese Patent Application No. 201520595384.6, dated Dec. 9, 2015, 4 pages. (2 pages of English Translation and 2 pages of Official Copy).

Office Action received for Chinese Patent Application No. 201520595385.0, dated Dec. 9, 2015, 4 pages (2 pages of English Translation and 2 pages of Official Copy).

Office Action received for Chinese Patent Application No. 201520595408.8, dated Dec. 9, 2015, 4 pages (2 pages of English Translation and 2 pages of Official Copy).

(56) References Cited

OTHER PUBLICATIONS

Office Action received for Chinese Patent Application No. 201520595538.1, dated Dec. 9, 2015, 4 pages (2 pages of English Translation and 2 pages of Official Copy).
Office Action received for Chinese Patent Application No. 2015206791980, dated Nov. 18, 2015, 4 pages (2 pages English Translation and 2 pages Official copy).
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for Danish Patent Application No. PA201570499, dated Nov. 3, 2015, 7 pages.
Office Action received for Danish Patent Application No. PA201570498, dated Oct. 30, 2015, 7 pages.
International Search Report and Written Opinion received for PCT Patent Application No. PCT/US2015/034604, dated Nov. 9, 2015, 30 pages.
Invitation to Pay Additional Fees and Partial International Search Report received for PCT Patent Application No. PCT/US2015/034604, dated Sep. 4, 2015, 6 pages.
International Search Report and Written Opinion received for PCT Patent Application No. PCT/US2015/034606, dated Dec. 2, 2015, 17 pages.
Invitation to Pay Additional Fees and Partial International Search Report received for PCT Patent Application No. PCT/US2015/034606, dated Sep. 9, 2015, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for PCT Patent Application No. PCT/US2015/046262, dated Nov. 23, 2015, 7 pages.
International Search Report and Written Opinion received for PCT Patent Application No. PCT/US2015/044517, dated Oct. 28, 2015, 13 pages.
APK Root, "Butterfly 3D Live Wallpaper 1.0 APK", available at <http://apk-root.blogspot.in/2015/09/download-butterfly-3d-live-wallpaper-10.html/>, Feb. 26, 2013, 7 pages.
Avdonin, Nikita, "Astroviewer 3D", available at <https://www.youtube.comjwatch?v=zY0tslx3JHY/>, Nov. 5, 2013, 2 pages.
Evgenyevich, Sergey, "Earth & Moon in HD Gyro 3D", available at <https://www.youtube.com/watch?v=IRwNcaSYrls/>, Dec. 1, 2013, 4 pages.
Airshow, "Airshow App for Mobile Devices", available at <http://www.livingearthapp.com/>, 2012, 4 pages.
"Living Earth", available at: http;//www.livingcarthapp.com/, 2014, 6 pages.
"Link to Wayback Machine with link to Google Play showing different layouts of complications associated with a clock face", retrieved from <https://play.google.com/store/apps/details?id=com.levelup.beautifulwidgets.free&hl=da > Sep. 9, 2013, 6 pages.
"Sun Set Solar Image Clock" available at <https://web.archive.orgjweb/20140719005410/http://www.sunsetclock.com/>, 2013, 5 pages.
Viticci, Frederico, "Checking Time Zones with Living Earth", MacStories, available at <https://www.macstories.net/reviews/checking-time-zones-with-living-earth/>, Dec. 11, 2013, 5 pages.
Uikit User Interface Catalog, "Page Controls", available online at <0140703123442/https:/1developer.apple.com/library/ios/documentation/userexperience/ conceptual/UIKitUI Cat . . . >, Dec. 16, 2013, 4 pages.
Non Final Office Action received for U.S. Appl. No. 14/822,769, dated Feb. 5, 2016, 14 pages.
Office Action received for Chinese Patent Application No. 201520594249.X, dated Dec. 9, 2015, 4 pages (2 pages of English Translation and 2 pages of Official Copy).

Intention to Grant received for Danish Patent Application No. PA201570496, dated Feb. 17, 2016, 6 pages.
International Search Report and Written Opinion received for PCT Patent Application No. PCT/US2015/034607, dated Dec. 1, 2015, 23 pages.
Restriction Requirement received for U.S. Appl. No. 14/815,890, dated Feb. 22, 2016, 5 pages.
Office Action received for Australian Patent Application No. 2015101019, dated Feb. 12, 2016, 4 pages.
Office Action received for Danish Patent Application No. PA201570495, dated Oct. 29, 2015, 7 pages.
Office Action received for Australian Patent Application No. 2015101019, dated Apr. 7, 2016, 4 pages.
Office Action received for Chinese Patent Application No. 2015206791980, dated Mar. 7, 2016, 6 pages (4 pages of English Translation and 2 pages of Official Copy).
Horowitz, Paul, "Always Show Scroll Bars in Mac OS X", OSX Daily, retrieved from the Internet: URL:http:jjosxdaily.com/2011/08/03/show-scroll-bars-mac-os-x-lion/, 2011, 3 pages.
Intention to Grant received for Danish Patent Application No. PA201570563, dated Mar. 17, 2016, 7 pages.
Office Action received for Danish Patent Application No. PA201570667, dated Apr. 1, 2016, 7 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/046262, dated Mar. 15, 2016, 34 pages.
Invitation to Pay Additional fees received for PCT Patent Application No. PCT/US2015/053353, dated Jan. 21, 2016, 7 pages.
Final Office Action received for U.S. Appl. No. 14/815,879, dated Mar. 24, 2016, 46 pages.
Non Final Office Action received for U.S. Appl. No. 14/815,879, dated Nov. 6, 2015, 35 pages.
Castellini, Rick, "Google Earth", retrieved from https://www.youtube.com/watch?v=bgjMSBXsFZQ, Feb. 12, 2013, 3 pages.
NOVA, "Tour of the Solar System", retrieved from http://www.pbs.org/wgbh/nova/space/tour-solar-system.html, May 24, 2013, 14 pages.
Office Action received for Australian Patent Application No. 2015101021, dated Oct. 28, 2015, 10 pages.
Office Action received for Danish Patent Application No. PA201670319, dated Nov. 24, 2016, 7 pages.
Office Action received for Danish Patent Application No. PA201670320, dated Dec. 5, 2016, 4 pages.
Office Action received for Taiwanese Patent Application No. 104128684, dated Nov. 8, 2016, 24 pages (9 pages of English Translation and 15 pages of Official Copy).
Office Action received for Danish Patent Application No. PA201670320, dated Aug. 4, 2016, 9 pages.
Advisory Action received for U.S. Appl. No. 14/841,606, dated Feb. 28, 2019, 3 pages.
Advisory Action received for U.S. Appl. No. 14/815,898, dated Aug. 30, 2016, 3 pages.
Advisory Action received for U.S. Appl. No. 14/822,769, dated Apr. 30, 2018, 4 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 14/822,769, dated Jan. 17, 2019, 8 pages.
Corrected Notice of Allowance received for U.S. Appl. No. 14/841,402, dated May 4, 2018, 2 pages.
Decision on Acceptance received for Australian Patent Application No. 2015298710, dated Jul. 19, 2019, 18 pages.
Decision on Opposition received for Australian Patent Application No. 2015298710, dated Aug. 9, 2019, 4 pages.

(56) References Cited

OTHER PUBLICATIONS

Decision on Opposition received for Australian Patent Application No. 2015298710, dated Aug. 20, 2018, 20 pages.
Decision to Grant received for Danish Patent Application No. PA201670320, dated Oct. 18, 2018, 2 pages.
Decision to Refuse received for European Patent Application No. 15730924.6, dated Mar. 15, 2019, 12 pages.
"Deluxe Moon—Guide", available online at:—https://web.archive.org/web/20130520161057/http://www.lifewaresolutions.com/deluxe_moon_guide_ip.html, May 20, 2013, 5 pages.
Extended European Search Report received for European Patent Application No. 16762356.0, dated Nov. 9, 2018, 10 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/822,769, dated Jan. 4, 2018, 25 pages.
Final Office Action received for U.S. Appl. No. 14/841,402, dated Aug. 25, 2017, 17 pages.
Final Office Action received for U.S. Appl. No. 14/841,606, dated Sep. 7, 2018, 34 pages.
Final Office Action received for U.S. Appl. No. 15/352,215, dated Mar. 7, 2019, 22 pages.
Final Office Action received for U.S. Appl. No. 14/822,769, dated Nov. 9, 2016, 18 pages.
First Action Interview received for U.S. Appl. No. 14/815,890, dated Aug. 12, 2016, 3 pages.
"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.
"Google Earth on Android—AndroidCentral.com", Available online at:—https://www.youtube.com/watch?v=1WxN1RunrE4, Feb. 22, 2010, 1 page.
Intention to Grant received for Danish Patent Application No. PA201670320, dated May 17, 2018, 2 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/044517, dated Mar. 16, 2017, 10 pages.
International Preliminary Report on Patentability received for PCT Patent Application No. PCT/US2015/046262, dated Mar. 16, 2017, 26 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/017271, dated Sep. 21, 2017, 13 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
International Search Report and Written Opinion received for PCT Patent Application No. PCT/US2015/053353, dated May 9, 2016, 21 pages.
International Search Report and Written Opinion received for PCT Patent Application No. PCT/US2016/017271, dated Sep. 1, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
Invitation to Pay Additional Fee received for European Patent Application No. 15747595.5, dated Feb. 9, 2018, 6 pages.
Invitation to Pay Additional Fees received for PCT Patent Application No. PCT/US2016/017271, dated May 25, 2016, 7 pages.
Invitation to Pay Additional Fees received for PCT Patent Application No. PCT/US2016/035090, dated Jul. 15, 2016, 2 pages.
"Kidizoom Smartwatch", Available online at <URL:https://www.vtechnl.com/media/downloads/Kidizoom-Smart-Watch.pdf>, Jun. 24, 2014, 23 pages.
Minutes of Oral Proceedings received for European Patent Application No. 15730924.6, mailed on Mar. 13, 2019, 4 pages.
"MS Excel 2013", Jan. 29, 2013, 2 pages.
"New, but unsigned—Easy StopWatch for Symbian", XP55393563, Available online at <http://www.allaboutsymbian.com/flow/item/19490_New_but_unsigned-Easy_StopWatc.php>, Mar. 15, 2014, 15 pages.
Non-Final Office Action received for U.S. Appl. No. 14/815,890, dated Jun. 6, 2017, 19 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/822,769, dated Jun. 29, 2016, 14 pages.
Non-Final Office Action received for U.S. Appl. No. 14/822,769, dated May 4, 2017, 21 pages.
Non-Final Office Action received for U.S. Appl. No. 14/822,769, dated May 24, 2018, 30 pages.
Non-Final Office Action received for U.S. Appl. No. 14/839,889, dated Mar. 7, 2017, 26 pages.
Non-Final Office Action received for U.S. Appl. No. 14/841,402, dated Jan. 25, 2017, 18 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 15/352,215, dated Sep. 20, 2018, 31 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Notice of Acceptance received for Australian Patent Application No. 2015298710, dated Oct. 8, 2019, 3 pages.
Notice of Acceptance received for Australian Patent Application No. 2016229847, dated Sep. 12, 2018, 3 pages.
Notice of Allowance received for Chinese Patent Application No. 201510481525.6, dated May 27, 2019, 2 pages (1 page of English Translation and 1 page of Official Copy).

(56) References Cited

OTHER PUBLICATIONS

Notice of Allowance received for Chinese Patent Application No. 201510483305.7, dated Jan. 8, 2019, 3 pages (1 page of English Translation and 2 pages of Official Copy).
Notice of Allowance received for Chinese Patent Application No. 201510484514.3, dated Jun. 6, 2019, 2 pages (1 page of English Translation and 1 page of Official Copy).
Notice of Allowance received for Chinese Patent Application No. 201520594249.X, dated Jul. 12, 2016, 4 pages (2 pages of English Translation and 2 pages of Official Copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Danish Patent Application No. PA201570563, dated May 24, 2016, 2 pages.
Notice of Allowance received for Danish Patent Application No. PA201570667, dated Nov. 11, 2016, 2 pages.
Notice of Allowance received for Japanese Patent Application No. 2017-505450, dated Mar. 9, 2018, 10 pages (7 pages of English Translation and 3 pages of Official Copy).
Notice of Allowance received for Japanese Patent Application No. 2017-505847, dated May 20, 2019, 4 pages (1 page of English Translation and 3 pages of Official Copy).
Notice of Allowance received for Japanese Patent Application No. 2017-545918, dated Jul. 22, 2019, 4 pages (1 page of English Translation and 3 pages of Official Copy).
Notice of Allowance received for Japanese Patent Application No. 2018-074971, dated Apr. 23, 2019, 4 pages (1 page of English Translation and 3 pages of Official Copy).
Notice of Allowance received for Japanese Patent Application No. 2018-107114, dated Mar. 22, 2019, 4 pages (1 page of English Translation and 3 pages of Official Copy).
Notice of Allowance received for Korean Patent Application No. 10-2017-7005939, dated Mar. 30, 2018, 5 pages (2 pages of English Translation and 3 pages of Official Copy).
Notice of Allowance received for Netherland Patent Application No. 2019753, dated Jul. 6, 2018, 6 pages (2 pages of English Translation and 4 pages of Official copy).
Notice of Allowance received for Taiwanese Patent Application No. 104124962, dated Jul. 27, 2017, 3 pages (Official Copy only). {Se Communication under 37 CFR § 1.98(a) (3)}.
Notice of Allowance received for Taiwanese Patent Application No. 104124963, dated Sep. 28, 2017, 5 pages (1 page of English Translation of Search report and 4 pages of Official Copy).
Notice of Allowance received for Taiwanese Patent Application No. 104124995, dated Jul. 27, 2017, 3 pages (Official Copy only). {Se Communication under 37 CFR § 1.98(a) (3)}.
Notice of Allowance received for Taiwanese Patent Application No. 104124997, dated Jun. 16, 2017, 5 pages (1 page of English Translation of Search report and 4 pages of Official Copy).
Notice of Allowance received for Taiwanese Patent Application No. 104124998, dated Mar. 31, 2017, 3 pages (Official copy only). {Se Communication under 37 CFR § 1.98(a) (3)}.
Notice of Allowance received for Taiwanese Patent Application No. 104128684, dated Feb. 23, 2017, 3 pages (Official Copy only). {Se Communication under 37 CFR § 1.98(a) (3)}.
Notice of Allowance received for U.S. Appl. No. 14/815,879, dated Jun. 26, 2017, 8 pages
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/822,769, dated Nov. 29, 2018, 12 pages.
Notice of Allowance received for U.S. Appl. No. 14/839,889, dated Oct. 30, 2017, 16 pages.
Notice of Allowance received for U.S. Appl. No. 14/841,402, dated Apr. 26, 2018, 16 pages.
Office Action received for Danish Patent Application No. PA201570499, dated Nov. 1, 2017, 6 pages.
Office Action received for European Patent Application No. 15730924.6, dated Dec. 12, 2017, 8 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2018201089, dated Oct. 11, 2019, 4 pages.
Office Action received for Australian Patent Application No. 2018279037, dated Jun. 18, 2019, 5 pages.
Office Action received for Chinese Patent Application No. 201510479088.4, dated Mar. 12, 2018, 20 pages (6 pages of English Translation and 14 pages of Official Copy).
Office Action received for Chinese Patent Application No. 201510479088.4, dated May 7, 2019, 6 pages (3 pages of English Translation and 3 pages of Official Copy).
Office Action received for Chinese Patent Application No. 201510481525.6, dated Aug. 29, 2018, 10 pages (5 pages of English Translation and 5 pages of Official Copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Apr. 16, 2019, 6 pages (3 pages of English Translation and 3 pages of Official Copy).
Office Action received for Chinese Patent Application No. 201510483268.X, dated Dec. 1, 2017, 11 pages (5 pages of English Translation and 6 pages of Official Copy).
Office Action received for Chinese Patent Application No. 201510483268.X, dated Oct. 19, 2018, 10 pages (5 pages of English Translation and 5 pages of Official Copy).
Office action received for Chinese Patent Application No. 201510483305.7, dated Aug. 31, 2018, 10 pages (5 pages of English Translation and 5 pages of Official copy).
Office action received for Chinese Patent Application No. 201510483305.7, dated Dec. 1, 2017, 13 pages (5 pages of English Translation and 8 pages of Official Copy).
Office Action received for Chinese Patent Application No. 201510484514.3, dated Apr. 4, 2018, 12 pages (5 pages of English Translation and 7 pages of Official Copy).
Office Action received for Chinese Patent Application No. 201510484514.3, dated Dec. 24, 2018, 13 pages (6 pages of English Translation and 7 pages of Official Copy).

(56) References Cited

OTHER PUBLICATIONS

Office Action received for Chinese Patent Application No. 201510557356.X, dated Aug. 15, 2019, 12 pages (7 pages of English Translation and 5 pages of Official Copy).
Office Action received for Chinese Patent Application No. 201510557356.X, dated Dec. 29, 2017, 11 pages (5 pages of English Translation and 6 pages of Official Copy).
Office Action received for Chinese Patent Application No. 201510557356.X, dated Nov. 23, 2018, 12 pages (5 pages of English Translation and 7 pages of Official Copy).
Office Action received for Chinese Patent Application No. 201520595384.6, dated Dec. 30, 2016, 2 pages (Official Copy only). {Se Communication under 37 CFR § 1.98(a) (3)}.
Office Action received for Chinese Patent Application No. 201520595384.6, dated Jul. 22, 2016, 3 pages (1 page of English Translation and 2 pages of Official Copy).
Office Action received for Chinese Patent Application No. 201520595385.0, dated Dec. 30, 2016, 2 pages (Official Copy only). {Se Communication under 37 CFR § 1.98(a) (3)}.
Office Action received for Chinese Patent Application No. 201520595385.0, dated Jul. 22, 2016, 3 pages (1 page of English Translation and 2 pages of Official Copy).
Office Action Received for Chinese Patent Application No. 201520595408.8, dated Dec. 30, 2016, 2 pages (Official Copy Only). {Se Communication under 37 CFR § 1.98(a) (3)}.
Office Action received for Chinese Patent Application No. 201520595408.8, dated Jul. 25, 2016, 3 pages (1 page of English Translation and 2 pages of Official Copy).
Office Action received for Chinese Patent Application No. 201520595538.1, dated Dec. 30, 2016, 2 pages (Official Copy only). {Se Communication under 37 CFR § 1.98(a) (3)}.
Office Action received for Chinese Patent Application No. 201520595538.1, dated Jul. 22, 2016, 3 pages (1 page of English Translation and 2 pages of Official Copy).
Office Action received for Chinese Patent Application No. 201520679198.0, dated Jun. 24, 2016, 5 pages (3 pages of English Translation and 2 pages of Official Copy).
Office Action received for Chinese Patent Application No. 201621208900.6, dated Apr. 26, 2017, 2 pages (Official Copy only). {Se Communication under 37 CFR § 1.98(a) (3)}.
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Jun. 19, 2018, 4 pages.
Office Action received for Danish Patent Application No. PA201570667, dated Sep. 2, 2016, 2 pages.
Office Action received for Danish Patent Application No. PA201670319, dated Jun. 21, 2017, 6 pages.
Office Action received for Danish Patent Application No. PA201670320, dated Jan. 18, 2018, 2 pages.
Office Action received for Danish Patent Application No. PA201670320, dated Jul. 3, 2017, 4 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 15759998.6, dated Dec. 19, 2018, 6 pages.
Office Action received for European Patent Application No. 15759998.6, dated Jul. 16, 2018, 6 pages.
Office Action received for European Patent Application No. 15759998.6, dated May 29, 2019, 6 pages.
Office Action received for European Patent Application No. 16708014.2, dated Apr. 3, 2019, 7 pages.
Office Action received for European Patent Application No. 15730925.3, dated Feb. 27, 2019, 5 pages.
Office Action received for German Patent Application No. 112015003083.2, dated Mar. 9, 2018, 12 pages (5 pages of English Translation and 7 pages of Official Copy).
Office Action received for Japanese Patent Application No. 2017-505450, dated Jun. 20, 2017, 8 pages (4 pages of English Translation and 4 pages of Official Copy).
Office Action received for Japanese Patent Application No. 2017-505842, dated Feb. 22, 2019, 11 pages (6 pages of English Translation and 5 pages of Official Copy).
Office Action received for Japanese Patent Application No. 2017-505842, dated Sep. 9, 2019, 7 pages (3 pages of English Translation and 4 pages of Official Copy).
Office Action received for Japanese Patent Application No. 2017-505847, dated Feb. 12, 2019, 13 pages (6 pages of English Translation and 7 pages of Official Copy).
Office Action received for Japanese Patent Application No. 2017-510631, dated Mar. 2, 2018, 12 pages (7 pages of English Translation and 5 pages of Official Copy).
Office Action received for Japanese Patent Application No. 2017-545918, dated Sep. 14, 2018, 12 pages (7 pages of English Translation and 5 pages of Official copy).
Office Action received for Japanese Patent Application No. 2018-074971, dated Jan. 28, 2019, 6 pages (3 pages of English Translation and 3 pages of Official Copy).
Office Action received for Japanese Patent Application No. 2018-107114, dated Oct. 9, 2018, 4 pages (2 pages of English Translation and 2 pages of Official copy).
Office Action received for Korean Patent Application No. 10-2017-7005939, dated Jun. 30, 2017, 6 pages (2 pages of English Translation and 4 pages of Official copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2017-7024570, dated Sep. 28, 2018, 14 pages (6 pages of English Translation and 8 pages of Official Copy).
Office Action received for Korean Patent Application No. 10-2018-7018904, dated Aug. 20, 2019, 8 pages (3 pages of English Translation and 5 pages of Official Copy).
Office Action received for Netherland Patent Application No. 2015245, dated Jan. 24, 2017, 11 pages (1 page of English Translation and 10 pages of Official Copy).
Office Action received for Netherland Patent Application No. 2019753, dated Apr. 12, 2018, 8 pages (3 page of English Translation and 5 pages of Official Copy).
Office Action received for Netherlands Patent Application No. 2015239, dated Oct. 28, 2016, 13 pages (5 pages of English Translation and 8 pages of Official Copy).
Office Action Received for Taiwanese Patent Application No. 104124962, dated Nov. 29, 2016, 6 pages (3 pages of English Translation and 3 pages of Official Copy).
Office Action received for Taiwanese Patent Application No. 104124998, dated Nov. 29, 2016, 6 pages (3 pages of English Translation and 3 pages of Official Copy).

(56) References Cited

OTHER PUBLICATIONS

Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104126627, dated Nov. 29, 2016, 9 pages (4 pages of English Translation and 5 pages of Official Copy).
Office Action received for Taiwanese Patent Application No. 104126627, dated Aug. 30, 2018, 22 pages (9 pages of English Translation and 13 pages of Official Copy).
Office Action received for Taiwanese Patent Application No. 104126627, dated Dec. 20, 2018, 4 pages (2 pages of English Translation and 2 pages of Official Copy).
Office Action received for Taiwanese Patent Application No. 104126627, dated Oct. 16, 2017, 7 pages (3 pages of English Translation and 4 pages of Official Copy).
Office Action received for Taiwanese Patent Application No. 104128705, dated Aug. 29, 2016, 18 pages (7 pages of English Translation and 11 pages of Official Copy).
Office Action received for Taiwanese Patent Application No. 104128705, dated Mar. 16, 2017, 3 pages (Official copy only). {Se Communication under 37 CFR § 1.98(a) (3)}.
Office Action received for Taiwanese Patent Application No. 104132636, dated Dec. 13, 2018, 26 pages (9 pages of English Translation and 17 pages of Official Copy).
Office Action received for Taiwanese Patent Application No. 104132636, dated Mar. 23, 2017, 25 pages (10 pages of English Translation and 15 pages of Official Copy).
Office Action received for Taiwanese Patent Application No. 104132636, dated Oct. 31, 2017, 10 pages (4 pages of English Translation and 6 pages of Official Copy).
"Pentax K20D Operating Manual", http://www.ricoh-imaging.eu/en/operating-manuals-download.html, 2008, pp. 173-174.
Pre-Interview First Office Action received for U.S. Appl. No. 14/815,890, dated May 26, 2016, 4 pages
"Reuse Animations—Synfig Animation Studio", Available online at: https://wiki.synfig.org/index.php?title=Doc:Reuse_Animations&oldid=18173, May 20, 2013, 5 pages
Search Report and Opinion Received for Netherland Patent Application No. 2015232, dated Jan. 25, 2017, 9 pages (1 page of English Translation and 8 pages of Official Copy).
Search Report and Opinion received for Netherlands Patent Application No. 2015242, dated Jul. 4, 2017, 20 pages (10 pages of English Translation of Search Opinion and 10 pages of Official Copy).
Search Report and Opinion received for Netherlands Patent Application No. 2015364, dated Jul. 4, 2017, 12 pages (5 pages of English Translation of Search Opinion and 7 pages of Official Copy).
Search Report and Opinion received for Netherlands Patent Application No. 2018531, dated Jul. 27, 2017, 14 pages (6 pages of English Translation and 8 pages of Official Copy).
"Solar Walk Free", Vito Technology, Jun. 19, 2014, 9 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
"Tropical Fish 14", Available online at: https://www.turbosquid.com/3d-models/tropical-fish-3d-model/388510, Feb. 4, 2008, 2 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Bogdanov, Alexei, "SKMEI 1016", XP054977588, Available online at <URL:https://www.youtube.com/watch?v=E4q4Fug05Fw>, Jun. 21, 2014, 2 pages (Official Copy only). {Se Communication under 37 CFR § 1.98(a) (3)}.
Clark, Josh, "Designing Great iPhone Apps", O'Reilly Japan Co, O'Reilly Tim, vol. 1, May 24, 2012, 5 pages (Official Copy only). {Se Communication under 37 CFR § 1.98(a) (3)}.
Cyr, Jim, "Apple Watch—Customize Modular Watch Face", available online at: https://www.youtube.com/watch?v=02W93HbKIK8, May 13, 2015, 2 pages.
EBPMAN Tech Reviews, "LG G3 Tips: How to customize the clock face", Available online at: https://www.youtube.com/watch?v=evraMWFb1fY, Jul. 25, 2014, 1 page.
Feldman, Ari, "Excerpts from: Designing Arcade Computer Game Graphics", Available online at: http://www.phatcode.net/res/269/files/dacgg.pdf, Jan. 1, 2001, 35 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "Xperia Z1 Perfect Manual", Sotec Co, Ltd, No. 1, Nov. 15, 2013, pp. 217-218.
Gazer, "iPhone 4S Super Manual", Shuwa System Co, Saito Kazukuni, vol. 1, Jun. 6, 2013, 7 pages (Official Copy only). {Se Communication under 37 CFR § 1.98(a) (3)}.
Geary, David, "Programming HTML5 Canvas", O'Reilly Japan, Inc, No. 1, Jul. 23, 2014, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Gottabemobile, "How to Change Watch Faces on Android Wear", available online at <URL:https://www.youtube.com/watch?v=B8iRGkGq6a8>, Jul. 9, 2014, 4 pages.
ISO 9241-13:1998, "Ergonomic requirements for office work with visual display terminals (VDTs)", Part 13: User guidance, International Standard ISO, Zuerich, CH, vol. 9241-13, Jul. 15, 1998, 40 pages.
Kenney, Briley, "How to Customize a Smartwatch and other Personalization Questions", Available online at: <https://smartwatches.org/learn/customize-smartwatch/>, Jan. 23, 2014, 3 pages.
Nerdtalk, "The Best Android Clock Widgets", available at: https://www.youtube.com/watch?v=E1bAprWByfU, Apr. 25, 2011, 1 page.
Obara, Yuuta, "iPhone Application Selection for Univesity Students", Shuwa System Co, SAITO Kazukuni, vol. 1, May 16, 2013, 4 pages (Official Copy only). {Se Communication under 37 CFR § 1.98(a) (3)}.
Octoba, "Just Install It—Utilizing Method for Android Application Business", ASCII Media Works Co. Takano Kiyoshi, vol. 1, Apr. 25, 2013, 6 pages (Official Copy only). {Se Communication under 37 CFR § 1.98(a) (3)}.
Omar Romero, "Sony Smartwatch 2 Custom Watchfaces Tutorial", Retrieved From: <https://www.youtube.com/watch?v=8odbxqwSQR8>, May 1, 2014, 2 pages.
Rehman, A, "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Shiota, Shinji, "Windows 7 Dojo", Weekly ASCII, Ascii Mediaworks Inc, vol. 798, Aug. 31, 2010, 3 pages.
Smartwatch, "App Earth Space HD Live Wallpaper APK for Smart Watch", Version 1.7, Android version 2.2, Aug. 27, 2013, 1 page.
Sony, "Live View™ micro display", Extended User Guide, Aug. 2010, 27 pages.
Sony, "Sony SmartWatch", User Guide, Dec. 2011, 18 pages.
Stateoftech, "Samsung Galaxy Gear Tips—Change the Clock Face", Retrieved from: https://www.youtube.com/watch?v=GOom7AZUAjY, Dec. 11, 2013, 2 pages.

(56) References Cited

OTHER PUBLICATIONS

Talkandroid, "Android Wear walkthrough", Available online at: https://www.youtube.com/watch?v=4xntpZac4sw, Jun. 30, 2014, 1 page.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
XPERIA ZL2 SOL25, "Instruction Manual", Detailed version, KDDI Corporation, No. 1, vol. 1, Jun. 2014, 4 pages.
Zukerman, Erez, "6 Beautiful, Interesting Versatile Timer Apps [Android]", available at: http://www.makeuseof.com/tag/beautiful-interesting-versatile-timer-apps-android/, May 18, 2012, 5 pages.
Intention to Grant received for European Patent Application No. 15759998.6, dated Nov. 21, 2019, 12 pages.

\* cited by examiner

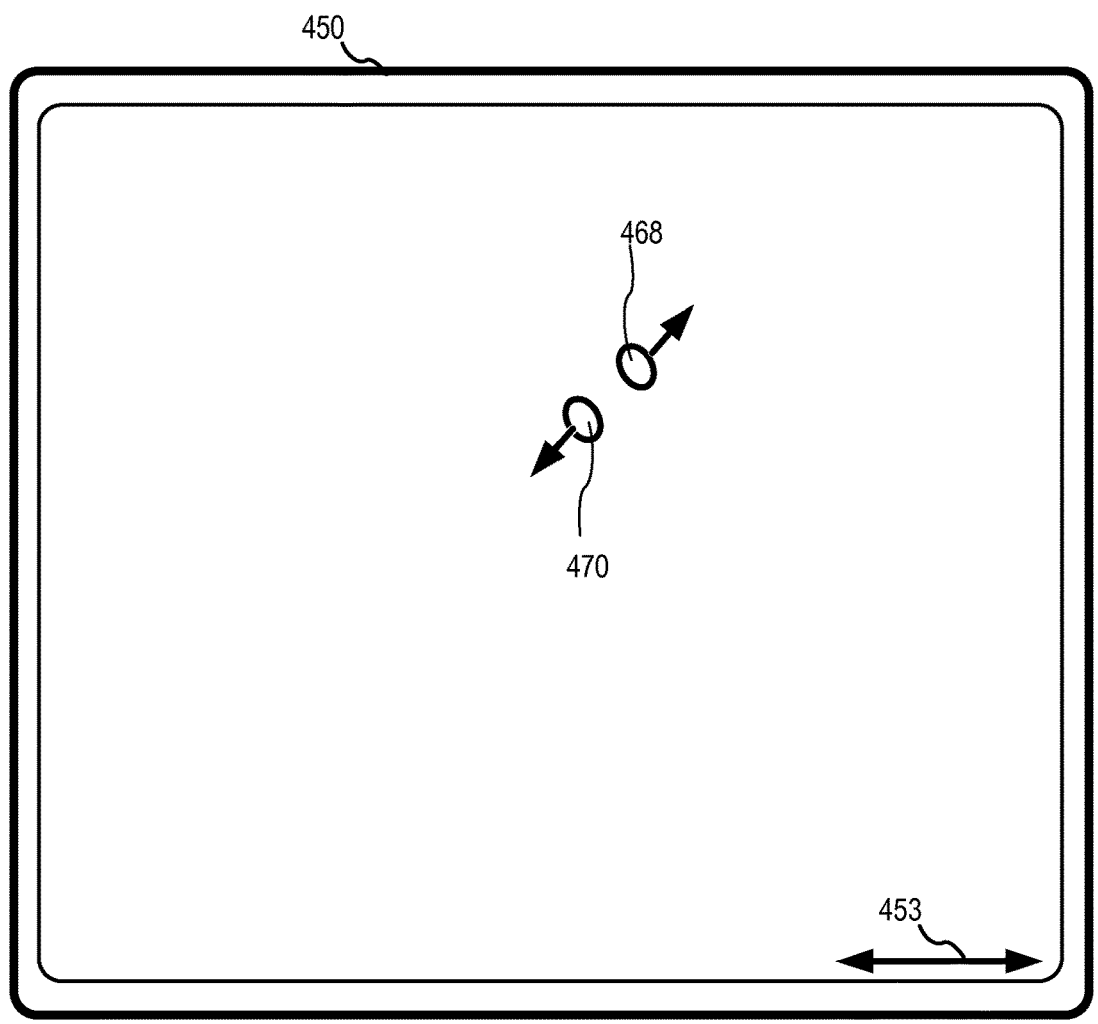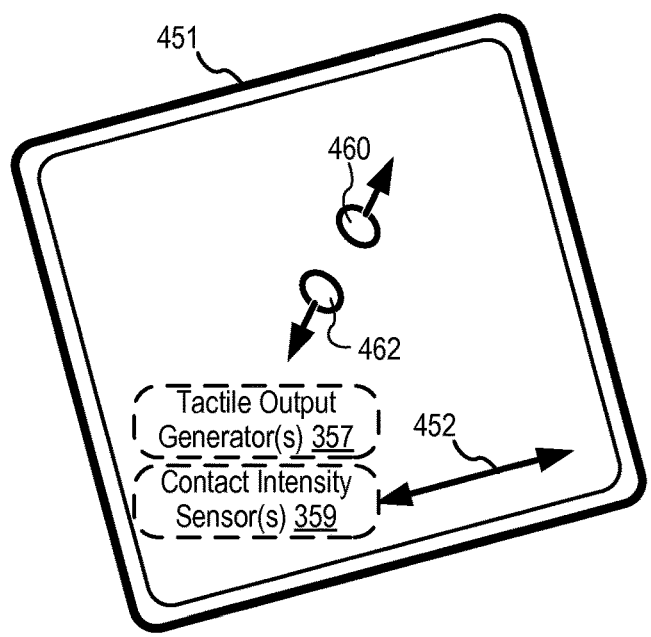
FIG. 4B

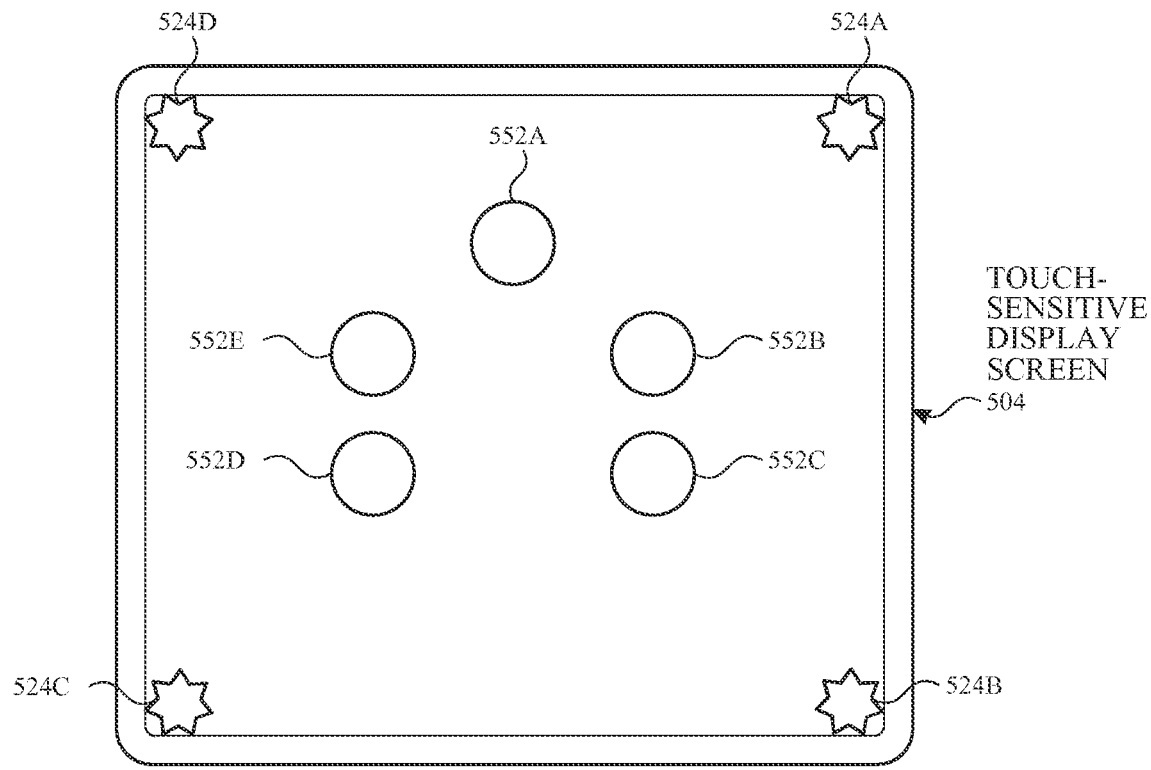
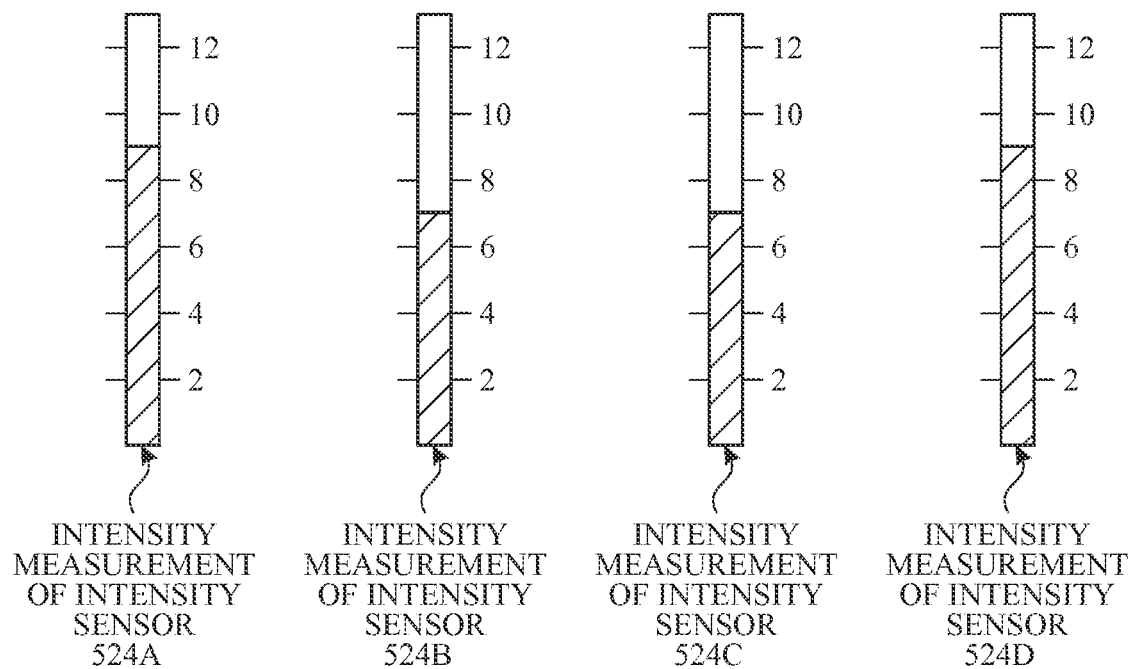
FIG. 5C

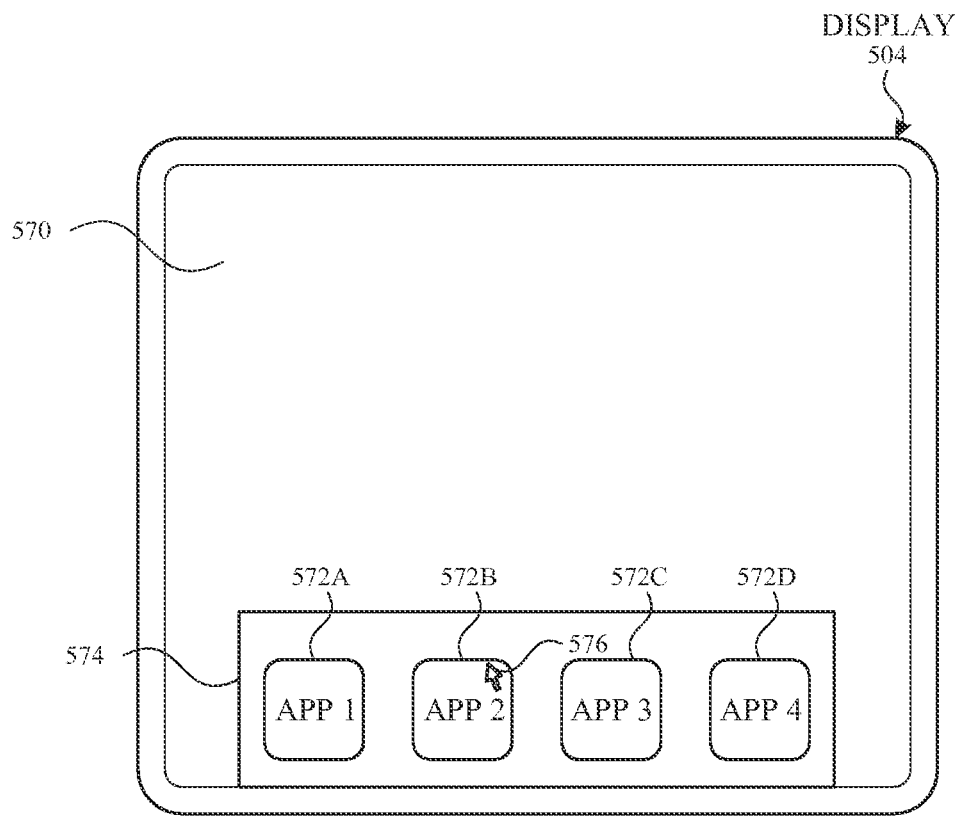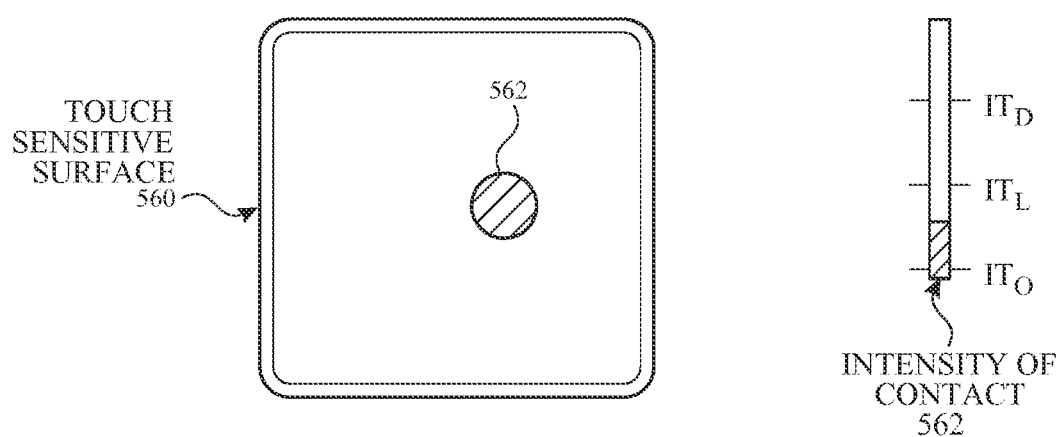
FIG. 5E

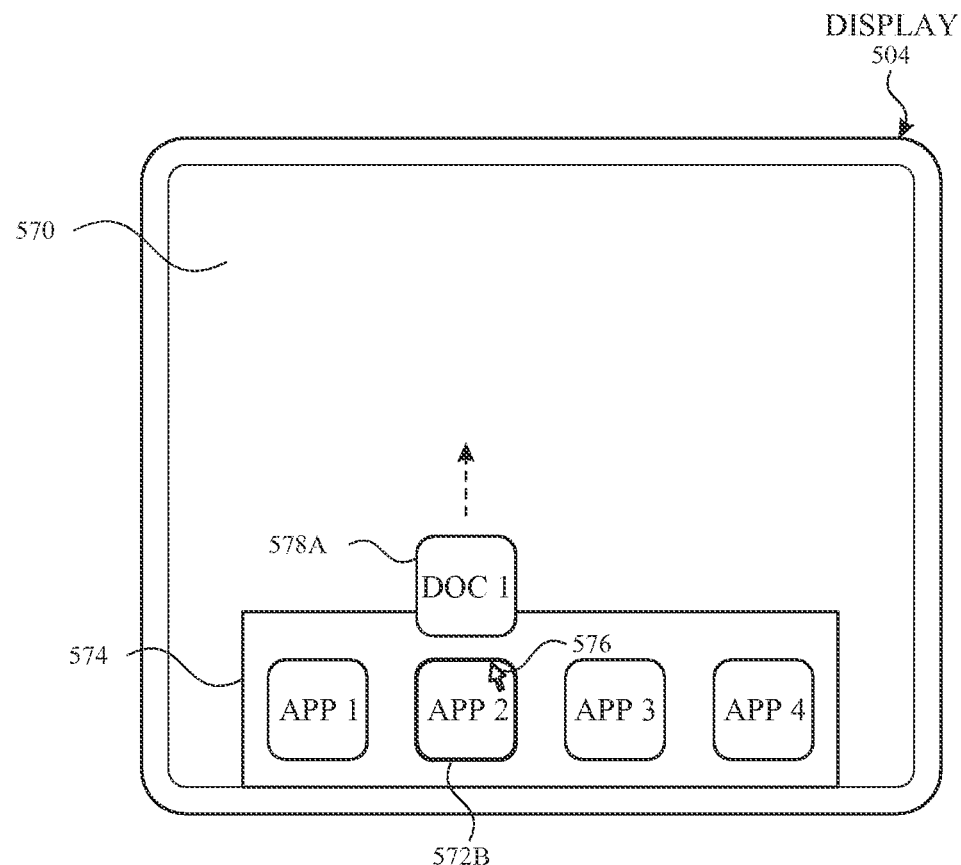
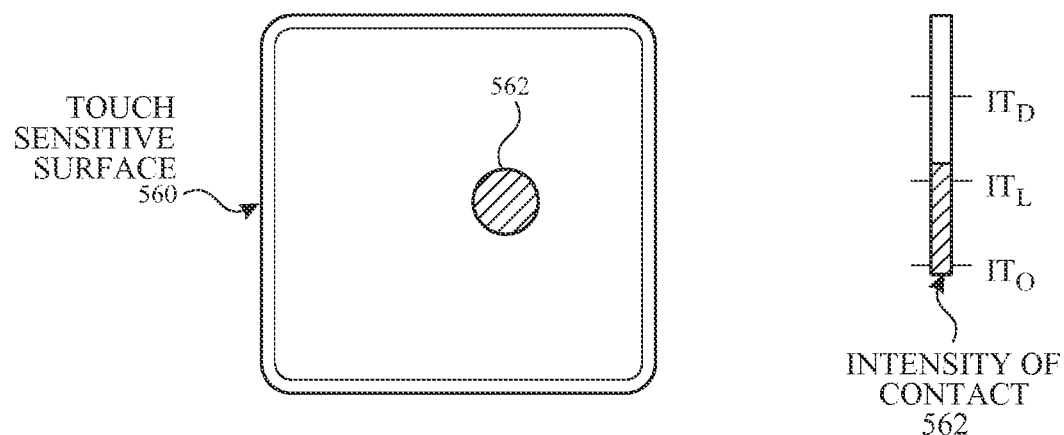
FIG. 5F

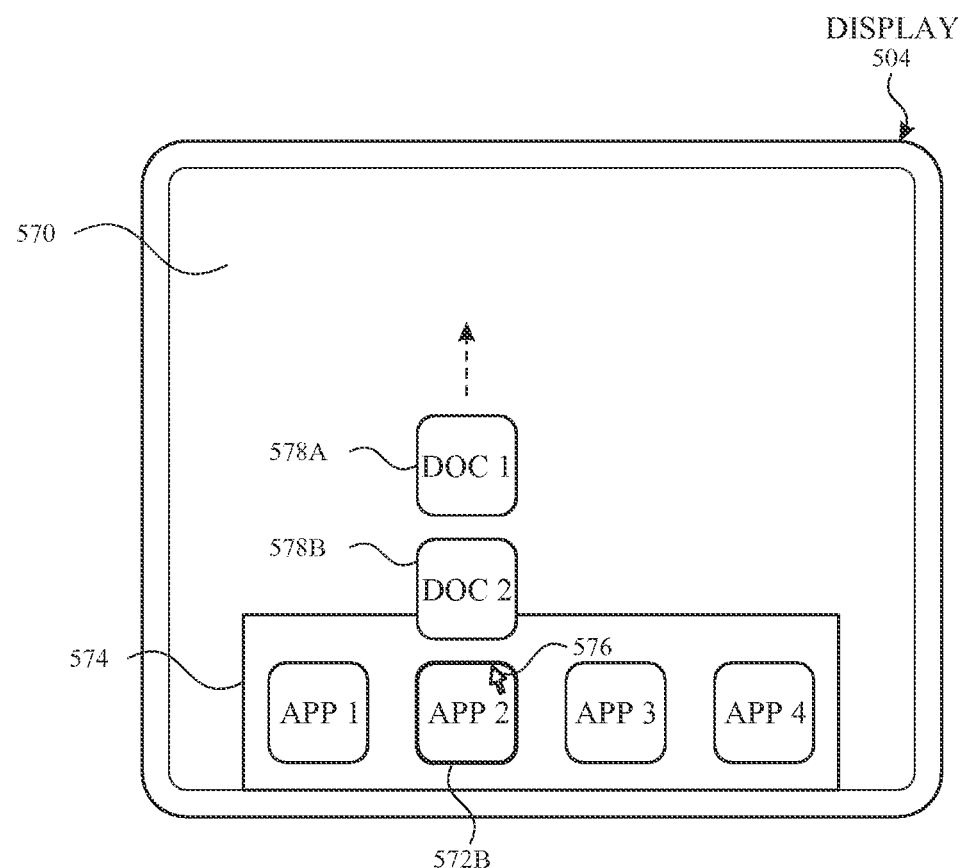
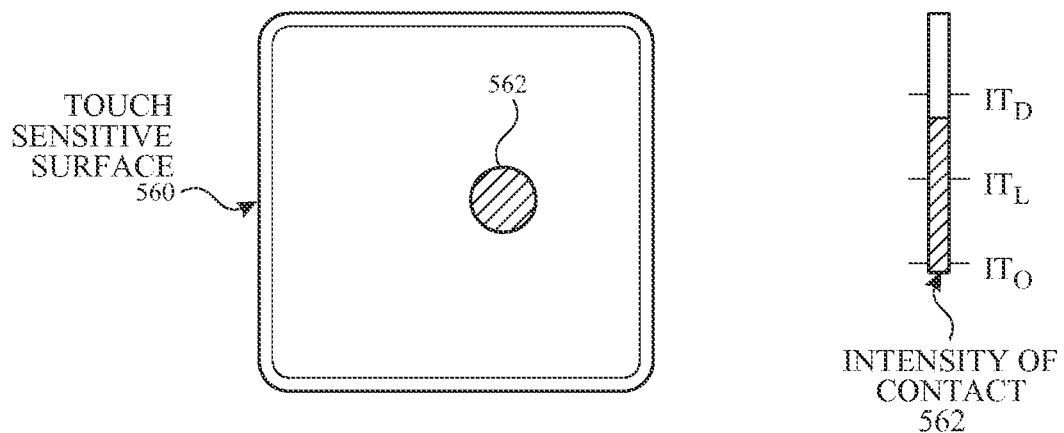
FIG. 5G

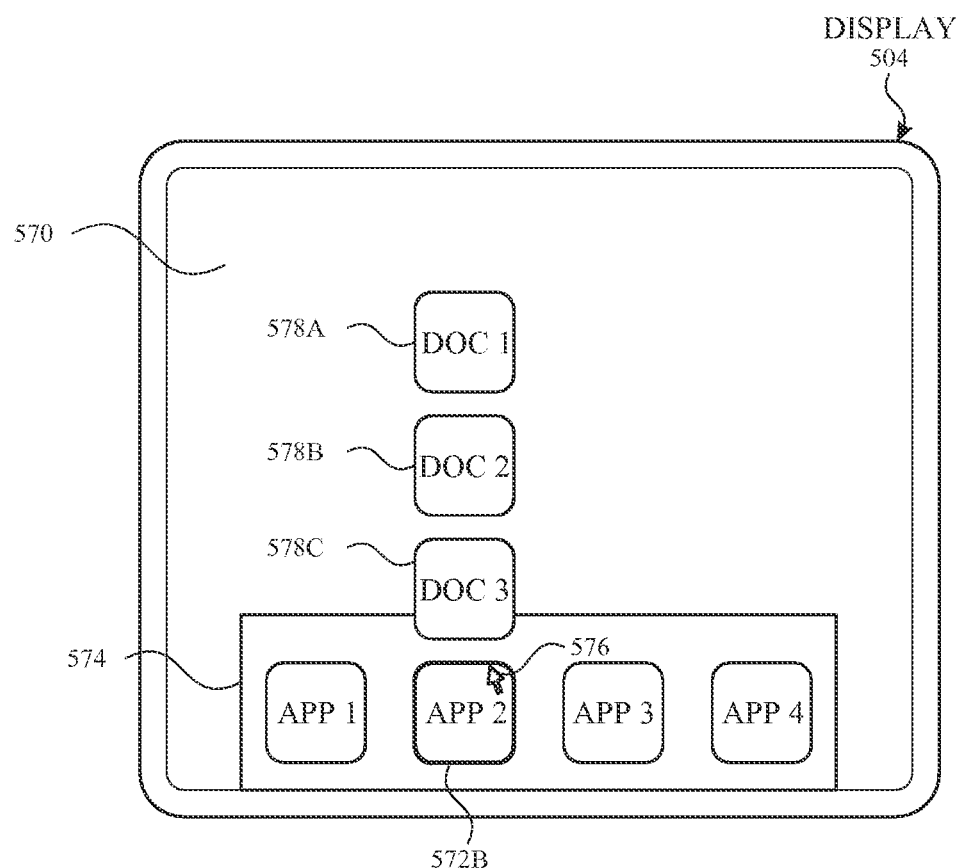
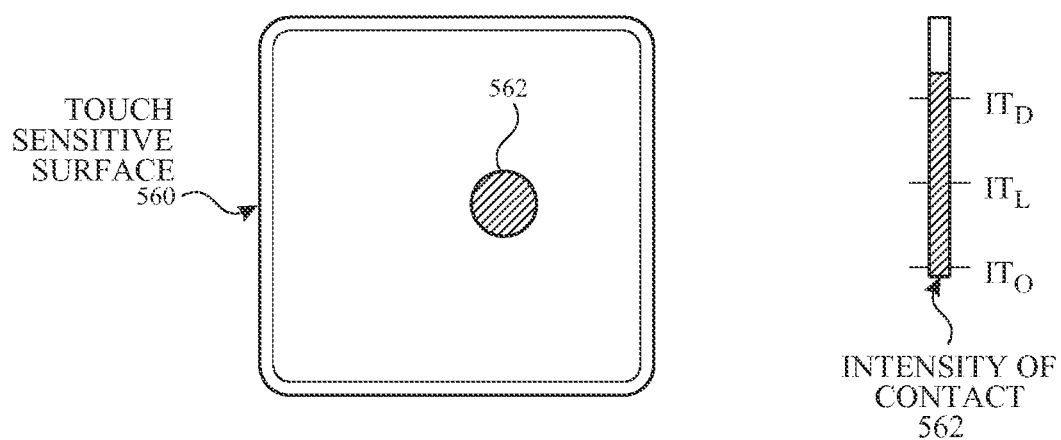
FIG. 5H

700

702
Receive a user input.

704
In response to receiving the user input:

706
Identify a most recently accessed user input technique of a set of user input techniques.

708
Identify a least recently accessed user input technique of the set of user input techniques.

710
Display a user input interface of the most recently accessed user input technique.

712
Display a first affordance associated with a user input interface of the least recently accessed user input technique.

902
Display, on the display, a portion of a set of information.

↓

904
Receive user input associated with the set of information.

↓

906
In response to receiving the user input associated with the set of information, scroll the set of information on the display.

↓

908
Determine whether a scroll attribute satisfies a threshold criteria.

↓

910
In accordance with a determination that the scroll attribute satisfies the threshold criteria, display an index object.

↓

912
In accordance with a determination that the scroll attribute does not satisfy the threshold criteria, end display of the index object fully or partially overlaying the set of information.

1202
Receive a user input.

1204
In response to receiving the user input, display an emoji graphical object.

1206
Receive a first user input associated with the emoji graphical object.

1208
In response to receiving the first user input associated with the emoji graphical object, change a first visual aspect of the emoji graphical object, wherein the change in the first visual aspect is based on the first user input.

1210
Receive recipient information.

1212
Transmit the emoji graphical object, including the changed first visual aspect, to a recipient associated with the received recipient information.

1402
Display a first page of a user interface and a first set of paging affordances, wherein the first set of paging affordances comprises a first paging affordance that includes a focus selector, and wherein the first paging affordance corresponds to the first page of the user interface.

↓

1404
Receive a user touch at a first location on the touch-sensitive surface, wherein the first location is associated with the first set of paging affordances.

↓

1406
In response to receiving the user touch at the first location, replace display of the first set of paging affordances with display of a second set of paging affordances, wherein the second set of paging affordances comprises a second paging affordance that corresponds to a second page of the user interface.

↓

1408
While continuing to receive the user touch, detect movement of the user touch from the first location to a second location on the touch-sensitive surface without a break in contact of the user touch on the touch-sensitive surface, wherein the second location is associated with the second paging affordance.

↓

1410
In response to detecting the user touch at the second location, display the second page of the user interface.

1422
Display a first page, of a plurality of pages, of a user interface and a first set of paging affordances, wherein the first set of paging affordances comprises a first paging affordance that includes a focus selector, and wherein the first paging affordance corresponds to the first page of the user interface.

1424
Receive a user touch at a first location on the touch-sensitive surface, the first location corresponding to the first set of paging affordances.

1426
In response to receiving the user touch at the first location, replace display of the first set of paging affordances with display of a second set of paging affordances, wherein the second set of paging affordances comprises a first paging affordance that includes a focus selector, and wherein the first paging affordance corresponds to the first page of the user interface.

1428
While continuing to receive the user touch, detect movement of the user touch from the first location to a second location on the touch-sensitive surface without breaking contact with the touch-sensitive surface, wherein the second location is associated with the second paging affordance.

1430
In response to detecting the user touch at the second location:

1432
Replace display if the first page with a second page of the plurality of pages.

1434
Update the second set of paging affordances, wherein the updating comprises removing the focus selector from the first paging affordance of the set and displaying a second paging affordance of the set of paging affordances with the focus selector.

1602
Receive a first user input.

1604
In response to receiving the first user input, display, on the display, a dictation user interface.

1606
Receive a second user input.

1608
In response to receiving the second user input, replace display of the dictation user interface with display of a first emoji graphical object.

1610
Receive a first user swipe gesture input at a location on the touch-sensitive surface associated with the first emoji graphical object.

1612
In response to receiving the first user swipe gesture input, replace display of the first emoji graphical object with display of a second emoji graphical object.

1614
Receive a second user swipe gesture input at the touch-sensitive surface.

2402
Display a keyboard and a text entry interface, the text entry interface comprising a character insertion point.

2404
Detect a touch user input with a first characteristic intensity at a first location on the touch-sensitive display, the first location associated with the keyboard and corresponding to a first character.

2406
Does a first characteristic intensity of the touch user input at the first location exceed an intensity threshold?

NO

2408
Display a preview of the first character on the touch-sensitive display.

YES

2410
Display the first character at the character insertion point on the touch-sensitive display.

*FIG. 24*

USER INTERFACE FOR RECEIVING USER INPUT

CROSS-REFERENCE TO RELATED APPLICATIONS

This application claims priority to U.S. Provisional Application Ser. No. 62/129,903, filed Mar. 8, 2015, U.S. Provisional Application Ser. No. 62/127,800, filed Mar. 3, 2015, and U.S. Provisional Application Ser. No. 62/044,923, filed Sep. 2, 2014, the contents of which are hereby incorporated by reference in their entirety.

This application also relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778, 287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices." The content of these applications is hereby incorporated by reference in their entirety.

FIELD

The present disclosure relates generally to computer user interfaces, and more specifically to techniques for receiving user input.

BACKGROUND

The use of electronic devices has significantly increased in recent years (e.g., accessing music and sending/receiving messages). Devices receive input from the user, such as a selection of a song for playback, a selection of a message recipient from a phonebook, a textual input for a message body, and a selection of a particular page of a document. As a result of the increased use of devices, the frequency of user input into such devices has also significantly increased.

BRIEF SUMMARY

Some techniques for receiving user input using electronic devices, however, are generally cumbersome and inefficient. For example, composing or preparing a response to a message requires navigating a complex and time-consuming user interface, which may include multiple key presses or keystrokes. Existing techniques require longer than necessary, wasting user time and device energy. This latter consideration is particularly important in battery-operated devices.

Accordingly, there is a need for electronic devices with faster, more efficient methods and interfaces for receiving user input. Such methods and interfaces optionally complement or replace conventional methods for receiving user input. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices for receiving user input are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device is user-wearable. In some embodiments, the device has a touch-sensitive display (also known as a "touch screen" or "touch screen display"). In some embodiments, the device has a display and a touch-sensitive surface. In some embodiments, the device has a short-range communication radio. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. Executable instructions for performing these functions may be included in a computer-readable storage medium or other computer program product configured for execution by one or more processors.

In some embodiments, a method is performed at an electronic device with a display. The method includes: receiving a user input; in response to receiving the user input: identifying a most recently accessed user input technique of a set of user input techniques, identifying a least recently accessed user input technique of the set of user input techniques, displaying, on the display, a user input interface of the most recently accessed user input technique, and displaying, on the display, a first affordance associated with a user input interface of the least recently accessed user input technique.

In some embodiments, a non-transitory computer-readable storage medium stores one or more programs, the one or more programs comprising instructions, which when executed by one or more processors of an electronic device with a display, cause the device to: receive a user input; in response to receiving the user input: identify a most recently accessed user input technique of a set of user input techniques; identify a least recently accessed user input technique of the set of user input techniques; display, on the display, a user input interface of the most recently accessed user input technique; and displaying, on the display, a first affordance associated with a user input interface of the least recently accessed user input technique.

In some embodiments, a transitory computer-readable storage medium stores one or more programs, the one or more programs comprising instructions, which when executed by one or more processors of an electronic device with a display, cause the device to: receive a user input; in response to receiving the user input: identify a most recently accessed user input technique of a set of user input techniques; identify a least recently accessed user input technique of the set of user input techniques; display, on the display, a user input interface of the most recently accessed user input technique; and displaying, on the display, a first affordance associated with a user input interface of the least recently accessed user input technique.

In some embodiments, an electronic device comprises: a display; one or more processors; a memory; and one or more programs, wherein the one or more programs are stored in the memory and configured to be executed by the one or more processors, the one or more programs including instructions for: receiving a user input; in response to receiving the user input: identifying a most recently accessed user input technique of a set of user input techniques; identifying a least recently accessed user input technique of the set of user input techniques; displaying, on the display, a user input interface of the most recently accessed user input technique; and displaying, on the display, a first affordance associated with a user input interface of the least recently accessed user input technique.

In some embodiments, an electronic device comprises: a display; means for receiving a user input; responsive to receiving the user input: means for identifying a most recently accessed user input technique of a set of user input techniques; means for identifying a least recently accessed user input technique of the set of user input techniques; means for displaying, on the display, a user input interface of the most recently accessed user input technique; and means for displaying, on the display, a first affordance associated with a user input interface of the least recently accessed user input technique.

In some embodiments, a device comprises: a displaying unit; a receiving unit configured to receive a user input; and a processing unit coupled to the displaying unit and the receiving unit, the processing unit configured to: in response to receiving the user input: identify a most recently accessed user input technique of a set of user input techniques; identify a least recently accessed user input technique of the set of user input techniques; display, on the displaying unit, a user input interface of the most recently accessed user input technique; and display, on the displaying unit, a first affordance associated with a user input interface of the least recently accessed user input technique.

In some embodiments, a method is performed at an electronic device with a display. The method includes: displaying a portion of a set of information; receiving user input associated with the set of information; in response to receiving the user input associated with the set of information, scrolling the set of information on the display; determining whether a scroll attribute satisfies a threshold criteria; and in accordance with a determination that the scroll attribute satisfies the threshold criteria, displaying an index object.

In some embodiments, a non-transitory computer-readable stores medium storing one or more programs, the one or more programs comprising instructions, which when executed by one or more processors of an electronic device with a display, cause the device to: display a portion of a set of information; receive user input associated with the set of information; in response to receiving the user input associated with the set of information, scroll the set of information on the display; determine whether a scroll attribute satisfies a threshold criteria; and in accordance with a determination that the scroll attribute satisfies the threshold criteria, display an index object.

In some embodiments, a transitory computer-readable stores medium storing one or more programs, the one or more programs comprising instructions, which when executed by one or more processors of an electronic device with a display, cause the device to: display a portion of a set of information; receive user input associated with the set of information; in response to receiving the user input associated with the set of information, scroll the set of information on the display; determine whether a scroll attribute satisfies a threshold criteria; and in accordance with a determination that the scroll attribute satisfies the threshold criteria, display an index object.

In some embodiments, an electronic device comprises: a display; one or more processors; a memory; and one or more programs, wherein the one or more programs are stored in the memory and configured to be executed by the one or more processors, the one or more programs including instructions for: displaying a portion of a set of information; receiving user input associated with the set of information; in response to receiving the user input associated with the set of information, scrolling the set of information on the display; determining whether a scroll attribute satisfies a threshold criteria; and in accordance with a determination that the scroll attribute satisfies the threshold criteria, displaying an index object.

In some embodiments, an electronic device comprises: a display; means for receiving a user input; responsive to receiving the user input: means for displaying a portion of a set of information; means for receiving user input associated with the set of information; means for, responsive to receiving the user input associated with the set of information, scrolling the set of information on the display; means for determining whether a scroll attribute satisfies a threshold criteria; and in accordance with a determination that the scroll attribute satisfies the threshold criteria, means for displaying an index object.

In some embodiments, a device comprises: a displaying unit; a processing unit coupled to the displaying unit, the processing unit configured to: display, on the displaying unit, a portion of a set of information; receive user input associated with the set of information; in response to receiving the user input associated with the set of information, scroll the set of information on the displaying unit; determine whether a scroll attribute satisfies a threshold criteria; and in accordance with a determination that the scroll attribute satisfies the threshold criteria, display an index object.

In some embodiments, a method is performed at an electronic device with a display. The method includes: receiving a user input associated with a messaging input interface; in response to receiving user input associated with a messaging input interface, displaying an emoji graphical object; receiving a first user input associated with the emoji graphical object; in response to receiving the first user input associated with the emoji graphical object, changing a first visual aspect of the emoji graphical object, wherein the change in the first visual aspect is based on the first user input; receiving recipient information; and transmitting the emoji graphical object, including the changed first visual aspect, to a recipient associated with the received recipient information.

In some embodiments, a non-transitory computer-readable storage medium stores one or more programs, the one or more programs comprising instructions, which when executed by one or more processors of an electronic device with a display, cause the device to: receive a user input associated with a messaging input interface; in response to receiving user input associated with the messaging input interface, display an emoji graphical object; receive a first user input associated with the emoji graphical object; in response to receiving the first user input associated with the emoji graphical object, change a first visual aspect of the emoji graphical object, wherein the change in the first visual aspect is based on the first user input; receive recipient information; and transmit the emoji graphical object, including the changed first visual aspect, to a recipient associated with the received recipient information.

In some embodiments, a transitory computer-readable storage medium stores one or more programs, the one or more programs comprising instructions, which when executed by one or more processors of an electronic device with a display, cause the device to: receive a user input associated with a messaging input interface; in response to receiving user input associated with the messaging input interface, display an emoji graphical object; receive a first user input associated with the emoji graphical object; in response to receiving the first user input associated with the emoji graphical object, change a first visual aspect of the emoji graphical object, wherein the change in the first visual aspect is based on the first user input; receive recipient information; and transmit the emoji graphical object, including the changed first visual aspect, to a recipient associated with the received recipient information.

In some embodiments, an electronic device comprises: a display; one or more processors; a memory; and one or more programs, wherein the one or more programs are stored in the memory and configured to be executed by the one or more processors, the one or more programs including instructions for: receiving a user input associated with a messaging input interface; in response to receiving user input associated with the messaging input interface, displaying an emoji graphical object; receiving a first user input associated with the emoji graphical object; in response to receiving the first user input associated with the emoji graphical object, changing a first visual aspect of the emoji graphical object, wherein the change in the first visual aspect is based on the first user input; receiving recipient information; and transmitting the emoji graphical object, including the changed first visual aspect, to a recipient associated with the received recipient information.

In some embodiments, an electronic device comprises: a display; means for receiving a user input associated with a messaging input interface; in response to receiving user input associated with the messaging input interface, displaying an emoji graphical object; means for receiving a first user input associated with the emoji graphical object; means for, responsive to receiving the first user input associated with the emoji graphical object, changing a first visual aspect of the emoji graphical object, wherein the change in the first visual aspect is based on the first user input; means for receiving recipient information; and means for transmitting the emoji graphical object, including the changed first visual aspect, to a recipient associated with the received recipient information.

In some embodiments, a device comprises: a displaying unit; a processing unit coupled to the displaying unit, the processing unit configured to: receive a user input associated with a messaging input interface; in response to receiving user input associated with the messaging input interface, display, on the displaying unit, an emoji graphical object; receive a first user input associated with the emoji graphical object; in response to receiving the first user input associated with the emoji graphical object, change a first visual aspect of the emoji graphical object, wherein the change in the first visual aspect is based on the first user input; receive recipient information; and transmit the emoji graphical object, including the changed first visual aspect, to a recipient associated with the received recipient information.

In some embodiments, a method is performed at an electronic device with a display. The method includes: displaying a first page of a user interface and a first set of paging affordances, wherein the first set of paging affordances comprises a first paging affordance that includes a focus selector, and wherein the first paging affordance corresponds to the first page of the user interface; receiving a user touch at a first location on the touch-sensitive surface, wherein the first location is associated with the first set of paging affordances; in response to receiving the user touch at the first location, replacing display of the first set of paging affordances with display of a second set of paging affordances, wherein the second set of paging affordances comprises a second paging affordance that corresponds to a second page of the user interface; while continuing to receive the user touch, detecting movement of the user touch from the first location to a second location on the touch-sensitive surface without a break in contact of the user touch on the touch-sensitive surface, wherein the second location is associated with the second paging affordance; and in response to detecting the user touch at the second location, displaying the second page of the user interface.

In some embodiments, a non-transitory computer-readable storage medium stores one or more programs, the one or more programs comprising instructions, which when executed by one or more processors of an electronic device with a display and a touch-sensitive surface, cause the device to: display a first page of a user interface and a first set of paging affordances, wherein the first set of paging affordances comprises a first paging affordance that includes a focus selector, and wherein the first paging affordance corresponds to the first page of the user interface; receive a user touch at a first location on the touch-sensitive surface, wherein the first location is associated with the first set of paging affordances; in response to receiving the user touch at the first location, replace display of the first set of paging affordances with display of a second set of paging affordances, wherein the second set of paging affordances comprises a second paging affordance that corresponds to a second page of the user interface; while continuing to receive the user touch, detect movement of the user touch from the first location to a second location on the touch-sensitive surface without a break in contact of the user touch on the touch-sensitive surface, wherein the second location is associated with the second paging affordance; and in response to detecting the user touch at the second location, display the second page of the user interface.

In some embodiments, a transitory computer-readable storage medium stores one or more programs, the one or more programs comprising instructions, which when executed by one or more processors of an electronic device with a display and a touch-sensitive surface, cause the device to: display a first page of a user interface and a first set of paging affordances, wherein the first set of paging affordances comprises a first paging affordance that includes a focus selector, and wherein the first paging affordance corresponds to the first page of the user interface; receive a user touch at a first location on the touch-sensitive surface, wherein the first location is associated with the first set of paging affordances; in response to receiving the user touch at the first location, replace display of the first set of paging affordances with display of a second set of paging affordances, wherein the second set of paging affordances comprises a second paging affordance that corresponds to a second page of the user interface; while continuing to receive the user touch, detect movement of the user touch from the first location to a second location on the touch-sensitive surface without a break in contact of the user touch on the touch-sensitive surface, wherein the second location is associated with the second paging affordance; and in response to detecting the user touch at the second location, display the second page of the user interface.

In some embodiments, an electronic device comprises: a display; a touch-sensitive surface; one or more processors; a memory; and one or more programs, wherein the one or more programs are stored in the memory and configured to be executed by the one or more processors, the one or more programs including instructions for: displaying a first page of a user interface and a first set of paging affordances, wherein the first set of paging affordances comprises a first paging affordance that includes a focus selector, and wherein the first paging affordance corresponds to the first page of the user interface; receiving a user touch at a first location on the touch-sensitive surface, wherein the first location is associated with the first set of paging affordances; in response to receiving the user touch at the first location, replacing display of the first set of paging affordances with display of a second set of paging affordances, wherein the second set of paging affordances comprises a second paging affordance that corresponds to a second page of the user interface; while continuing to receive the user touch, detecting movement of the user touch from the first location to a second location on the touch-sensitive surface without a break in contact of the user touch on the touch-sensitive surface, wherein the second location is associated with the second paging affordance; and in response to detecting the user touch at the second location, displaying the second page of the user interface.

In some embodiments, an electronic device comprises: a display; a touch-sensitive surface; means for displaying a first page of a user interface and a first set of paging affordances, wherein the first set of paging affordances comprises a first paging affordance that includes a focus selector, and wherein the first paging affordance corresponds to the first page of the user interface; means for receiving a user touch at a first location on the touch-sensitive surface, wherein the first location is associated with the first set of paging affordances; means for, responsive to receiving the user touch at the first location, replacing display of the first set of paging affordances with display of a second set of paging affordances, wherein the second set of paging affordances comprises a second paging affordance that corresponds to a second page of the user interface; means for, while continuing to receive the user touch, detecting movement of the user touch from the first location to a second location on the touch-sensitive surface without a break in contact of the user touch on the touch-sensitive surface, wherein the second location is associated with the second paging affordance; and means for, responsive to detecting the user touch at the second location, displaying the second page of the user interface.

In some embodiments, a device comprises: a displaying unit; a touch-sensitive surface unit; a processing unit coupled to the displaying unit and the touch-sensitive surface unit, the processing unit configured to: display, on the displaying unit, a first page of a user interface and a first set of paging affordances, wherein the first set of paging affordances comprises a first paging affordance that includes a focus selector, and wherein the first paging affordance corresponds to the first page of the user interface; receive a user touch at a first location on the touch-sensitive surface unit, wherein the first location is associated with the first set of paging affordances; in response to receiving the user touch at the first location, replace display of the first set of paging affordances with display of a second set of paging affordances, wherein the second set of paging affordances comprises a second paging affordance that corresponds to a second page of the user interface; while continuing to receive the user touch, detect movement of the user touch from the first location to a second location on the touch-sensitive surface unit without a break in contact of the user touch on the touch-sensitive surface unit, wherein the second location is associated with the second paging affordance; and in response to detecting the user touch at the second location, display the second page of the user interface.

In some embodiments, a method is performed at an electronic device with a display and a touch-sensitive surface. The method includes: displaying a first page, of a plurality of pages, of a user interface and a first set of paging affordances, wherein the first set of paging affordances comprises a first paging affordance that includes a focus selector, and wherein the first paging affordance corresponds to the first page of the user interface; receiving a user touch at a first location on the touch-sensitive surface, the first location corresponding to the first set of paging affordances; in response to receiving the user touch at the first location, replacing display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, detecting movement of the user touch from the first location to a second location on the touch-sensitive surface without breaking contact with the touch-sensitive surface, wherein the second location is associated with the second paging affordance; and in response to detecting the user touch at the second location: replacing display if the first page with a second page of the plurality of pages; and updating the second set of paging affordances, wherein the updating comprises removing the focus selector from the first paging affordance of the set and displaying a second paging affordance of the set of paging affordances with the focus selector.

In some embodiments, a non-transitory computer-readable storage medium stores one or more programs, the one or more programs comprising instructions, which when executed by one or more processors of an electronic device with a display and a touch-sensitive surface, cause the device to: display a first page, of a plurality of pages, of a user interface and a first set of paging affordances, wherein the first set of paging affordances comprises a first paging affordance that includes a focus selector, and wherein the first paging affordance corresponds to the first page of the user interface; receive a user touch at a first location on the touch-sensitive surface, the first location corresponding to the first set of paging affordances; in response to receiving the user touch at the first location, replace display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, detect movement of the user touch from the first location to a second location on the touch-sensitive surface without breaking contact with the touch-sensitive surface, wherein the second location is associated with the second paging affordance; and in response to detecting the user touch at the second location: replace display if the first page with a second page of the plurality of pages; and update the second set of paging affordances, wherein the updating comprises removing the focus selector from the first paging affordance of the set and displaying a second paging affordance of the set of paging affordances with the focus selector.

In some embodiments, a transitory computer-readable storage medium stores one or more programs, the one or more programs comprising instructions, which when executed by one or more processors of an electronic device with a display and a touch-sensitive surface, cause the device to: display a first page, of a plurality of pages, of a user interface and a first set of paging affordances, wherein the first set of paging affordances comprises a first paging affordance that includes a focus selector, and wherein the first paging affordance corresponds to the first page of the user interface; receive a user touch at a first location on the touch-sensitive surface, the first location corresponding to the first set of paging affordances; in response to receiving the user touch at the first location, replace display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, detect movement of the user touch from the first location to a second location on the touch-sensitive surface without breaking contact with the touch-sensitive surface, wherein the second location is associated with the second paging affordance; and in response to detecting the user touch at the second location: replace display if the first page with a second page of the plurality of pages; and update the second set of paging affordances, wherein the updating comprises removing the focus selector from the first paging affordance of the set and displaying a second paging affordance of the set of paging affordances with the focus selector.

In some embodiments, an electronic device comprises: a display; a touch-sensitive surface; one or more processors; a memory; and one or more programs, wherein the one or more programs are stored in the memory and configured to be executed by the one or more processors, the one or more programs including instructions for: displaying a first page, of a plurality of pages, of a user interface and a first set of paging affordances, wherein the first set of paging affordances comprises a first paging affordance that includes a focus selector, and wherein the first paging affordance corresponds to the first page of the user interface; receiving a user touch at a first location on the touch-sensitive surface, the first location corresponding to the first set of paging affordances; in response to receiving the user touch at the first location, replacing display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, detecting movement of the user touch from the first location to a second location on the touch-sensitive surface without breaking contact with the touch-sensitive surface, wherein the second location is associated with the second paging affordance; and in response to detecting the user touch at the second location: replacing display if the first page with a second page of the plurality of pages; and updating the second set of paging affordances, wherein the updating comprises removing the focus selector from the first paging affordance of the set and displaying a second paging affordance of the set of paging affordances with the focus selector.

In some embodiments, an electronic device comprises: a display; a touch-sensitive surface; means for displaying a first page, of a plurality of pages, of a user interface and a first set of paging affordances, wherein the first set of paging affordances comprises a first paging affordance that includes a focus selector, and wherein the first paging affordance corresponds to the first page of the user interface; means for receiving a user touch at a first location on the touch-sensitive surface, the first location corresponding to the first set of paging affordances; means for, responsive to receiving the user touch at the first location, replacing display of the first set of paging affordances with display of a second set of paging affordances, wherein the second set of paging affordances comprises a first paging affordance that includes a focus selector, and wherein the first paging affordance corresponds to the first page of the user interface; means for, while continuing to receive the user touch, detecting movement of the user touch from the first location to a second location on the touch-sensitive surface without breaking contact with the touch-sensitive surface, wherein the second location is associated with the second paging affordance; and responsive to detecting the user touch at the second location: means for replacing display if the first page with a second page of the plurality of pages; and means for updating the second set of paging affordances, wherein the updating comprises removing the focus selector from the first paging affordance of the set and displaying a second paging affordance of the set of paging affordances with the focus selector.

In some embodiments, a device comprises: a displaying unit; a touch-sensitive surface unit; a processing unit coupled to the displaying unit and the touch-sensitive unit, the processing unit is configured to: display, on the displaying unit, a first page, of a plurality of pages, of a user interface and a first set of paging affordances, wherein the first set of paging affordances comprises a first paging affordance that includes a focus selector, and wherein the first paging affordance corresponds to the first page of the user interface; receive a user touch at a first location on the touch-sensitive surface unit, the first location corresponding to the first set of paging affordances; responsive to receiving the user touch at the first location, replace display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, detect movement of the user touch from the first location to a second location on the touch-sensitive surface unit without breaking contact with the touch-sensitive surface, wherein the second location is associated with the second paging affordance; and responsive to detecting the user touch at the second location: replace display if the first page with a second page of the plurality of pages; and update the second set of paging affordances, wherein the updating comprises removing the focus selector from the first paging affordance of the set and displaying a second paging affordance of the set of paging affordances with the focus selector.

In some embodiments, a method is performed at an electronic device with a display. The method includes: receiving a first user input; in response to receiving the first user input, displaying, on the display, a dictation user interface; receiving a second user input; in response to receiving the second user input, replacing display of the dictation user interface with display of a first emoji graphical object; receiving a first user swipe gesture input at a location on the touch-sensitive surface associated with the first emoji graphical object; in response to receiving the first user swipe gesture input, replacing display of the first emoji graphical object with display of a second emoji graphical object; receiving a second user swipe gesture input at the touch-sensitive surface; and in response to receiving the second user swipe gesture input, displaying a set of recently accessed emoji graphical objects.

In some embodiments, a non-transitory computer-readable storage medium stores one or more programs, the one or more programs comprising instructions, which when executed by one or more processors of an electronic device with a display and a touch-sensitive surface, cause the device to: receive a first user input; in response to receiving the first user input, display, on the display, a dictation user interface; receive a second user input; in response to receiving the second user input, replace display of the dictation user interface with display of a first emoji graphical object; receive a first user swipe gesture input at a location on the touch-sensitive surface associated with the first emoji graphical object; in response to receiving the first user swipe gesture input, replace display of the first emoji graphical object with display of a second emoji graphical object; receive a second user swipe gesture input at the touch-sensitive surface; and in response to receiving the second user swipe gesture input, display a set of recently accessed emoji graphical objects.

In some embodiments, a transitory computer-readable storage medium stores one or more programs, the one or more programs comprising instructions, which when executed by one or more processors of an electronic device with a display and a touch-sensitive surface, cause the device to: receive a first user input; in response to receiving the first user input, display, on the display, a dictation user interface; receive a second user input; in response to receiving the second user input, replace display of the dictation user interface with display of a first emoji graphical object; receive a first user swipe gesture input at a location on the touch-sensitive surface associated with the first emoji graphical object; in response to receiving the first user swipe gesture input, replace display of the first emoji graphical object with display of a second emoji graphical object; receive a second user swipe gesture input at the touch-sensitive surface; and in response to receiving the second user swipe gesture input, display a set of recently accessed emoji graphical objects.

In some embodiments, an electronic device comprises: a display; a touch-sensitive surface; one or more processors; a memory; and one or more programs, wherein the one or more programs are stored in the memory and configured to be executed by the one or more processors, the one or more programs including instructions for: receiving a first user input; in response to receiving the first user input, displaying, on the display, a dictation user interface; receiving a second user input; in response to receiving the second user input, replacing display of the dictation user interface with display of a first emoji graphical object; receiving a first user swipe gesture input at a location on the touch-sensitive surface associated with the first emoji graphical object; in response to receiving the first user swipe gesture input, replacing display of the first emoji graphical object with display of a second emoji graphical object; receiving a second user swipe gesture input at the touch-sensitive surface; and in response to receiving the second user swipe gesture input, displaying a set of recently accessed emoji graphical objects.

In some embodiments, an electronic device comprises: a display; a touch-sensitive surface; means for receiving a first user input; means for, responsive to receiving the first user input, displaying, on the display, a dictation user interface; means for receiving a second user input; means for, responsive to receiving the second user input, replacing display of the dictation user interface with display of a first emoji graphical object; means for receiving a first user swipe gesture input at a location on the touch-sensitive surface associated with the first emoji graphical object; means for, responsive to receiving the first user swipe gesture input, replacing display of the first emoji graphical object with display of a second emoji graphical object; means for receiving a second user swipe gesture input at the touch-sensitive surface; and means for, responsive to receiving the second user swipe gesture input, displaying a set of recently accessed emoji graphical objects.

In some embodiments, a device comprises: a displaying unit; a touch-sensitive surface unit; a processing unit coupled to the displaying unit and the touch-sensitive surface unit, the processing unit is configured to: receive a first user input; in response to receiving the first user input, display, on the displaying unit, a dictation user interface; receive a second user input; responsive to receiving the second user input, replace display of the dictation user interface with display of a first emoji graphical object; receive a first user swipe gesture input at a location on the touch-sensitive surface unit associated with the first emoji graphical object; in response to receiving the first user swipe gesture input, replace display of the first emoji graphical object with display of a second emoji graphical object; receive a second user swipe gesture input at the touch-sensitive surface unit; and in response to receiving the second user swipe gesture input, display a set of recently accessed emoji graphical objects.

In some embodiments, a method is performed at an electronic device with a touch-sensitive display. The method comprises: displaying a keyboard and a text entry interface, the text entry interface comprising a character insertion point; detecting a touch user input with a first characteristic intensity at a first location on the touch-sensitive display, the first location associated with the keyboard and corresponding to a first character; determining a first characteristic intensity of the touch user input at the first location; in accordance with a determination that the first characteristic intensity of the touch user input does not exceed an intensity threshold, displaying a preview of the first character on the touch-sensitive display; and in accordance with a determination that the first characteristic intensity of the touch user input at the first location exceeds the intensity threshold, displaying the first character at the character insertion point on the touch-sensitive display.

In some embodiments, a non-transitory computer-readable storage medium stores one or more programs, the one or more programs comprising instructions, which when executed by one or more processors of an electronic device with a touch-sensitive display, cause the device to: display a keyboard and a text entry interface, the text entry interface comprising a character insertion point; detect a touch user input with a first characteristic intensity at a first location on the touch-sensitive display, the first location associated with the keyboard and corresponding to a first character; determine a first characteristic intensity of the touch user input at the first location; in accordance with a determination that the first characteristic intensity of the touch user input does not exceed an intensity threshold, display a preview of the first character on the touch-sensitive display; and in accordance with a determination that the first characteristic intensity of the touch user input at the first location exceeds the intensity threshold, display the first character at the character insertion point on the touch-sensitive display.

In some embodiments, a transitory computer-readable storage medium stores one or more programs, the one or more programs comprising instructions, which when executed by one or more processors of an electronic device with a touch-sensitive display, cause the device to: display a keyboard and a text entry interface, the text entry interface comprising a character insertion point; detect a touch user input with a first characteristic intensity at a first location on the touch-sensitive display, the first location associated with the keyboard and corresponding to a first character; determine a first characteristic intensity of the touch user input at the first location; in accordance with a determination that the first characteristic intensity of the touch user input does not exceed an intensity threshold, display a preview of the first character on the touch-sensitive display; and in accordance with a determination that the first characteristic intensity of the touch user input at the first location exceeds the intensity threshold, display the first character at the character insertion point on the touch-sensitive display.

In some embodiments, an electronic device comprises: a touch-sensitive display; one or more processors; a memory; and one or more programs, wherein the one or more programs are stored in the memory and configured to be executed by the one or more processors, the one or more programs including instructions for: displaying a keyboard and a text entry interface, the text entry interface comprising a character insertion point; detecting a touch user input with a first characteristic intensity at a first location on the touch-sensitive display, the first location associated with the keyboard and corresponding to a first character; determining a first characteristic intensity of the touch user input at the first location; in accordance with a determination that the first characteristic intensity of the touch user input does not exceed an intensity threshold, displaying a preview of the first character on the touch-sensitive display; and in accordance with a determination that the first characteristic intensity of the touch user input at the first location exceeds the intensity threshold, displaying the first character at the character insertion point on the touch-sensitive display.

In some embodiments, an electronic device comprises: a touch-sensitive display; means for displaying a keyboard and a text entry interface, the text entry interface comprising a character insertion point; means for detecting a touch user input with a first characteristic intensity at a first location on the touch-sensitive display, the first location associated with the keyboard and corresponding to a first character; means for determining a first characteristic intensity of the touch user input at the first location; means, in accordance with a determination that the first characteristic intensity of the touch user input does not exceed an intensity threshold, for displaying a preview of the first character on the touch-sensitive display; and means, in accordance with a determination that the first characteristic intensity of the touch user input at the first location exceeds the intensity threshold, for displaying the first character at the character insertion point on the touch-sensitive display.

In some embodiments, an electronic device comprises: a touch-sensitive display unit; and a processing unit coupled to the touch-sensitive display, the processing unit configured to: display a keyboard and a text entry interface, the text entry interface comprising a character insertion point; detect a touch user input with a first characteristic intensity at a first location on the touch-sensitive display, the first location associated with the keyboard and corresponding to a first character; determine a first characteristic intensity of the touch user input at the first location; in accordance with a determination that the first characteristic intensity of the touch user input does not exceed an intensity threshold, display a preview of the first character on the touch-sensitive display; and in accordance with a determination that the first characteristic intensity of the touch user input at the first location exceeds the intensity threshold, display the first character at the character insertion point on the touch-sensitive display.

In some embodiments, a method is performed at an electronic device with a display and a touch-sensitive surface. The method comprises: displaying a user interface including a set of one or more affordances; while displaying the user interface, receiving a user input on the touch-sensitive surface; determining a characteristic intensity of the user input; and in accordance with a determination that the characteristic intensity of the user input exceeds an intensity threshold: determining whether a contextual affordance is available for the user interface; in accordance with a determination that the contextual affordance is available, displaying the contextual affordance; and in accordance with a determination that the contextual affordance is not available, displaying a visual indication that the contextual affordance is not available for the user interface.

In some embodiments, a non-transitory computer-readable storage medium stores one or more programs, the one or more programs comprising instructions, which when executed by one or more processors of an electronic device with a display and a touch-sensitive surface, cause the device to: display a user interface including a set of one or more affordances; while displaying the user interface, receive a user input on the touch-sensitive surface; determine a characteristic intensity of the user input; and in accordance with a determination that the characteristic intensity of the user input exceeds an intensity threshold: determine whether a contextual affordance is available for the user interface; in accordance with a determination that the contextual affordance is available, display the contextual affordance; and in accordance with a determination that the contextual affordance is not available, display a visual indication that the contextual affordance is not available for the user interface.

In some embodiments, a transitory computer-readable storage medium stores one or more programs, the one or more programs comprising instructions, which when executed by one or more processors of an electronic device with a display and a touch-sensitive surface, cause the device to: display a user interface including a set of one or more affordances; while displaying the user interface, receive a user input on the touch-sensitive surface; determine a characteristic intensity of the user input; and in accordance with a determination that the characteristic intensity of the user input exceeds an intensity threshold: determine whether a contextual affordance is available for the user interface; in accordance with a determination that the contextual affordance is available, display the contextual affordance; and in accordance with a determination that the contextual affordance is not available, display a visual indication that the contextual affordance is not available for the user interface.

In some embodiments, an electronic device comprises: a display; a touch-sensitive surface; one or more processors; a memory; and one or more programs, wherein the one or more programs are stored in the memory and configured to be executed by the one or more processors, the one or more programs including instructions for: displaying a user interface including a set of one or more affordances; while displaying the user interface, receiving a user input on the touch-sensitive surface; determining a characteristic intensity of the user input; and in accordance with a determination that the characteristic intensity of the user input exceeds an intensity threshold: determining whether a contextual affordance is available for the user interface; in accordance with a determination that the contextual affordance is available, displaying the contextual affordance; and in accordance with a determination that the contextual affordance is not available, displaying a visual indication that the contextual affordance is not available for the user interface.

In some embodiments, an electronic device comprises: a display; a touch-sensitive surface; means for displaying a user interface including a set of one or more affordances; means for, while displaying the user interface, receiving a user input on the touch-sensitive surface; means for determining a characteristic intensity of the user input; and means, in accordance with a determination that the characteristic intensity of the user input exceeds an intensity threshold, for: determining whether a contextual affordance is available for the user interface; in accordance with a determination that the contextual affordance is available, displaying the contextual affordance; and in accordance with a determination that the contextual affordance is not available, displaying a visual indication that the contextual affordance is not available for the user interface.

In some embodiments, an electronic device comprises: a display unit configured to display a graphic user interface; a touch-sensitive surface unit configured to detect intensity of contacts; and a processing unit coupled to the display and the touch-sensitive surface, the processing unit configured to: enable display a user interface including a set of one or more affordances; while enabling display of the user interface, receive a user input on the touch-sensitive surface; determine a characteristic intensity of the user input; and in accordance with a determination that the characteristic intensity of the user input exceeds an intensity threshold: determine whether a contextual affordance is available for the user interface; in accordance with a determination that the contextual affordance is available, enable display of the contextual affordance; and in accordance with a determination that the contextual affordance is not available, enable display of a visual indication that the contextual affordance is not available for the user interface.

In some embodiments, a system includes: a display; means for receiving a user input; means responsive to receiving the user input for: identifying a most recently accessed user input technique of a set of user input techniques; identifying a least recently accessed user input technique of the set of user input techniques; displaying, on the display, a user input interface of the most recently accessed user input technique; and displaying, on the display, a first affordance associated with a user input interface of the least recently accessed user input technique.

In some embodiments, a system includes: a display; means for displaying a portion of a set of information; means for receiving user input associated with the set of information; means, responsive to receiving the user input associated with the set of information, for scrolling the set of information on the display; means for determining whether a scroll attribute satisfies a threshold criteria; and means, in accordance with a determination that the scroll attribute satisfies the threshold criteria, for displaying an index object.

In some embodiments, a system includes: a display; means for receiving a user input associated with a messaging input interface; means, responsive to receiving user input associated with a messaging input interface, for displaying an emoji graphical object; means for receiving a first user input associated with the emoji graphical object; means, responsive to receiving the first user input associated with the emoji graphical object, for changing a first visual aspect of the emoji graphical object, wherein the change in the first visual aspect is based on the first user input; means for receiving recipient information; and means for transmitting the emoji graphical object, including the changed first visual aspect, to a recipient associated with the received recipient information.

In some embodiments, a system includes: a display; a touch-sensitive surface; means for displaying a first page of a user interface and a first set of paging affordances, wherein the first set of paging affordances comprises a first paging affordance that includes a focus selector, and wherein the first paging affordance corresponds to the first page of the user interface; means for receiving a user touch at a first location on the touch-sensitive surface, wherein the first location is associated with the first set of paging affordances; means for in response to receiving the user touch at the first location, replacing display of the first set of paging affordances with display of a second set of paging affordances, wherein the second set of paging affordances comprises a second paging affordance that corresponds to a second page of the user interface; while continuing to receive the user touch, means for detecting movement of the user touch from the first location to a second location on the touch-sensitive surface without a break in contact of the user touch on the touch-sensitive surface, wherein the second location is associated with the second paging affordance; and means, responsive to detecting the user touch at the second location, for displaying the second page of the user interface.

In some embodiments, a system includes: a display; a touch-sensitive surface; means for displaying a first page, of a plurality of pages, of a user interface and a first set of paging affordances, wherein the first set of paging affordances comprises a first paging affordance that includes a focus selector, and wherein the first paging affordance corresponds to the first page of the user interface; means for receiving a user touch at a first location on the touch-sensitive surface, the first location corresponding to the first set of paging affordances; means, responsive to receiving the user touch at the first location, for replacing display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, means for detecting movement of the user touch from the first location to a second location on the touch-sensitive surface without breaking contact with the touch-sensitive surface, wherein the second location is associated with the second paging affordance; and means, responsive to detecting the user touch at the second location, for: replacing display if the first page with a second page of the plurality of pages; and updating the second set of paging affordances, wherein the updating comprises removing the focus selector from the first paging affordance of the set and displaying a second paging affordance of the set of paging affordances with the focus selector.

In some embodiments, a system includes: a display; a touch-sensitive surface; means for receiving a first user input; means, responsive to receiving the first user input, for displaying, on the display, a dictation user interface; means for receiving a second user input; means, responsive to receiving the second user input, for replacing display of the dictation user interface with display of a first emoji graphical object; means for receiving a first user swipe gesture input at a location on the touch-sensitive surface associated with the first emoji graphical object; means, responsive to receiving the first user swipe gesture input, for replacing display of the first emoji graphical object with display of a second emoji graphical object; means for receiving a second user swipe gesture input at the touch-sensitive surface; and means, responsive to receiving the second user swipe gesture input, for displaying a set of recently accessed emoji graphical objects.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for receiving user input, thereby increasing the effectiveness, efficiency, and user satisfaction with such devices. Such methods and interfaces may complement or replace other methods for receiving user input.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 7 is a flow diagram illustrating an exemplary process for receiving user input in accordance with some embodiments.

FIG. 9 is a flow diagram illustrating an exemplary process for receiving user input associated with a scrollable list in accordance with some embodiments.

FIG. 12 is a flow diagram illustrating an exemplary process for manipulating an emoji graphical object in accordance with some embodiments.

FIGS. 14A-14B are flow diagrams illustrating exemplary processes for transitioning between various pages in accordance with some embodiments.

FIG. 16 is a flow diagram illustrating an exemplary process for receiving user input in accordance with some embodiments.

FIG. 24 is a flow diagram illustrating an exemplary process for receiving user input in accordance with some embodiments.

DESCRIPTION OF EMBODIMENTS

Figure 1A:
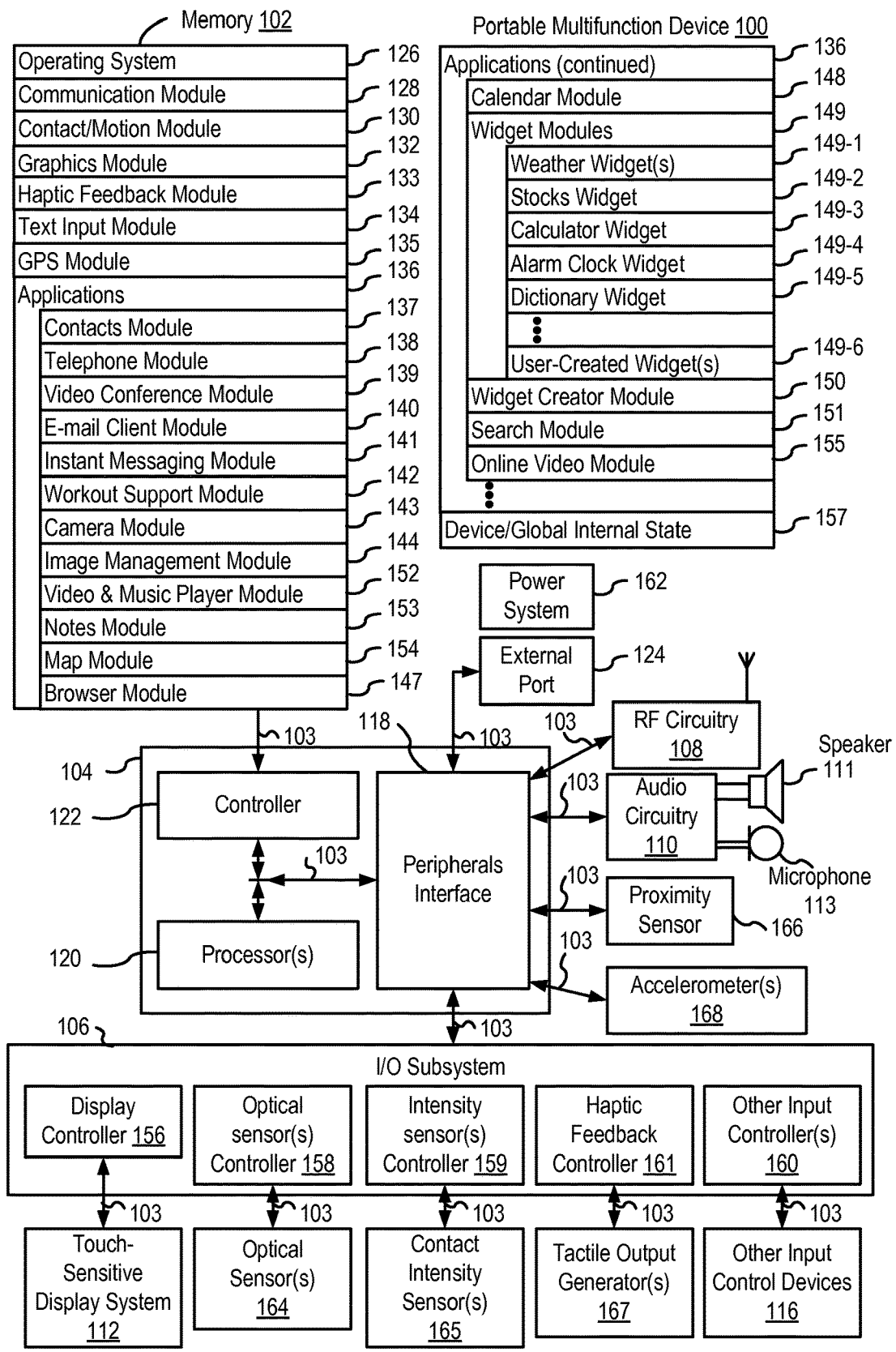
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for electronic devices that provide efficient interfaces for receiving user input. For example, ease of use for selection of an item from a list, entering textual input, and selection of a particular page of a document contribute to the efficiency of user access and input. Such techniques can reduce the cognitive burden on a user who uses messaging, music, and other applications, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for receiving user input. FIGS. 6A-6D, 8, 11, 13, 15A-15B, and 17A-17D illustrate exemplary user interfaces for receiving user input. The user interfaces in the figures are also used to illustrate the processes described below, including the processes in FIGS. 7, 9, 10, 12, 14A-14B, and 16.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
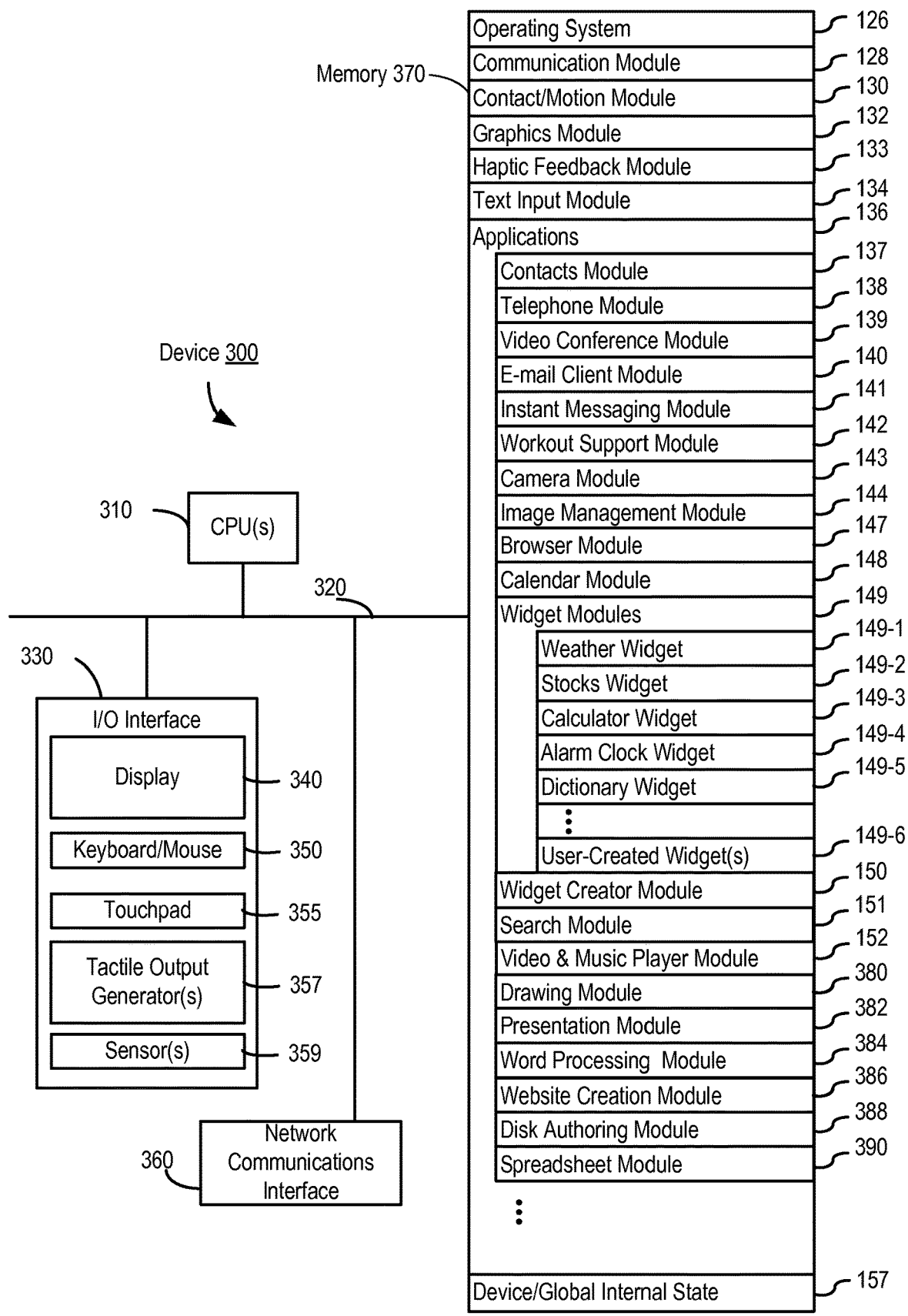
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
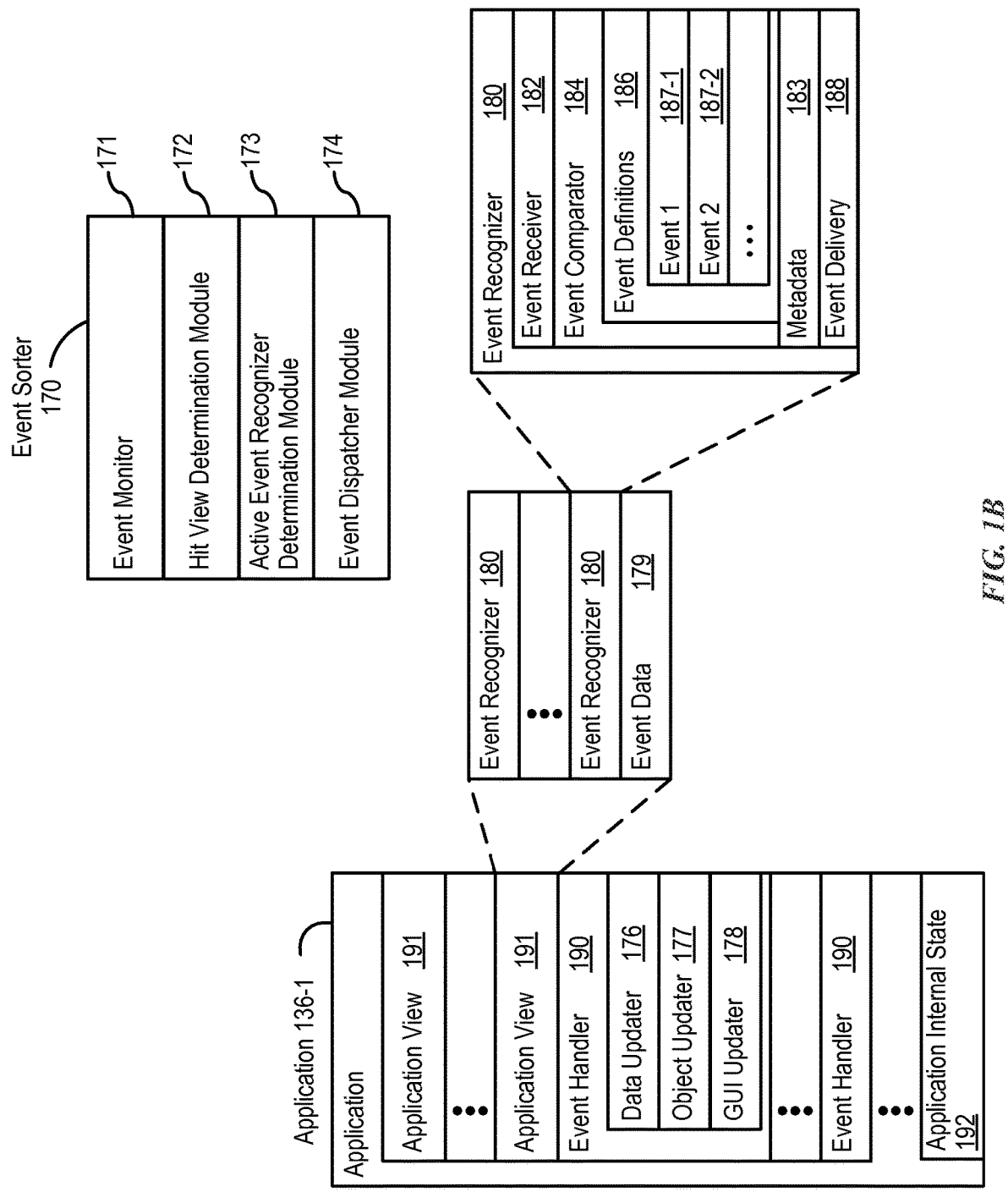
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
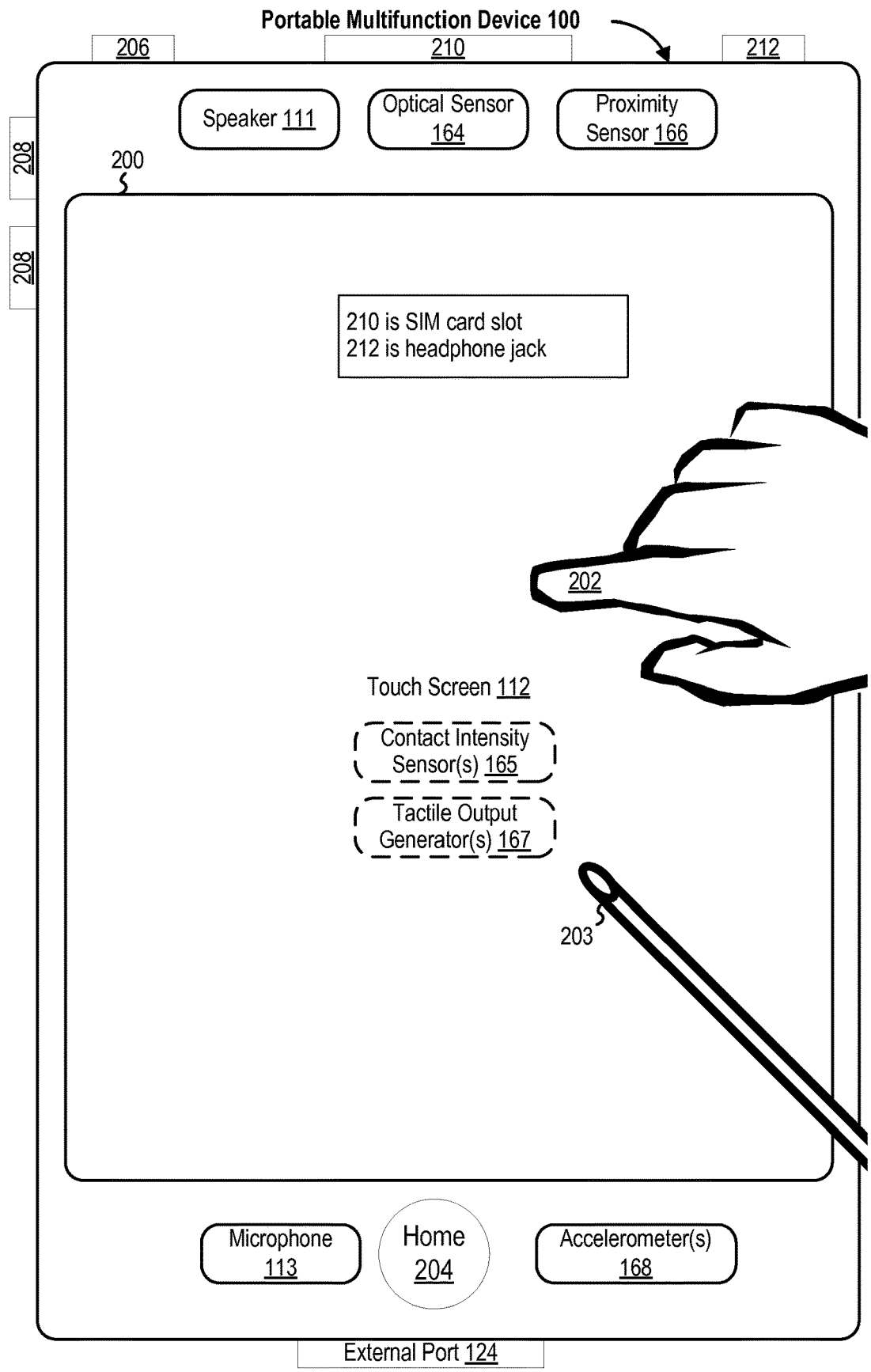
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that is, optionally, implemented on, for example, portable multifunction device 100.

Figure 4A:
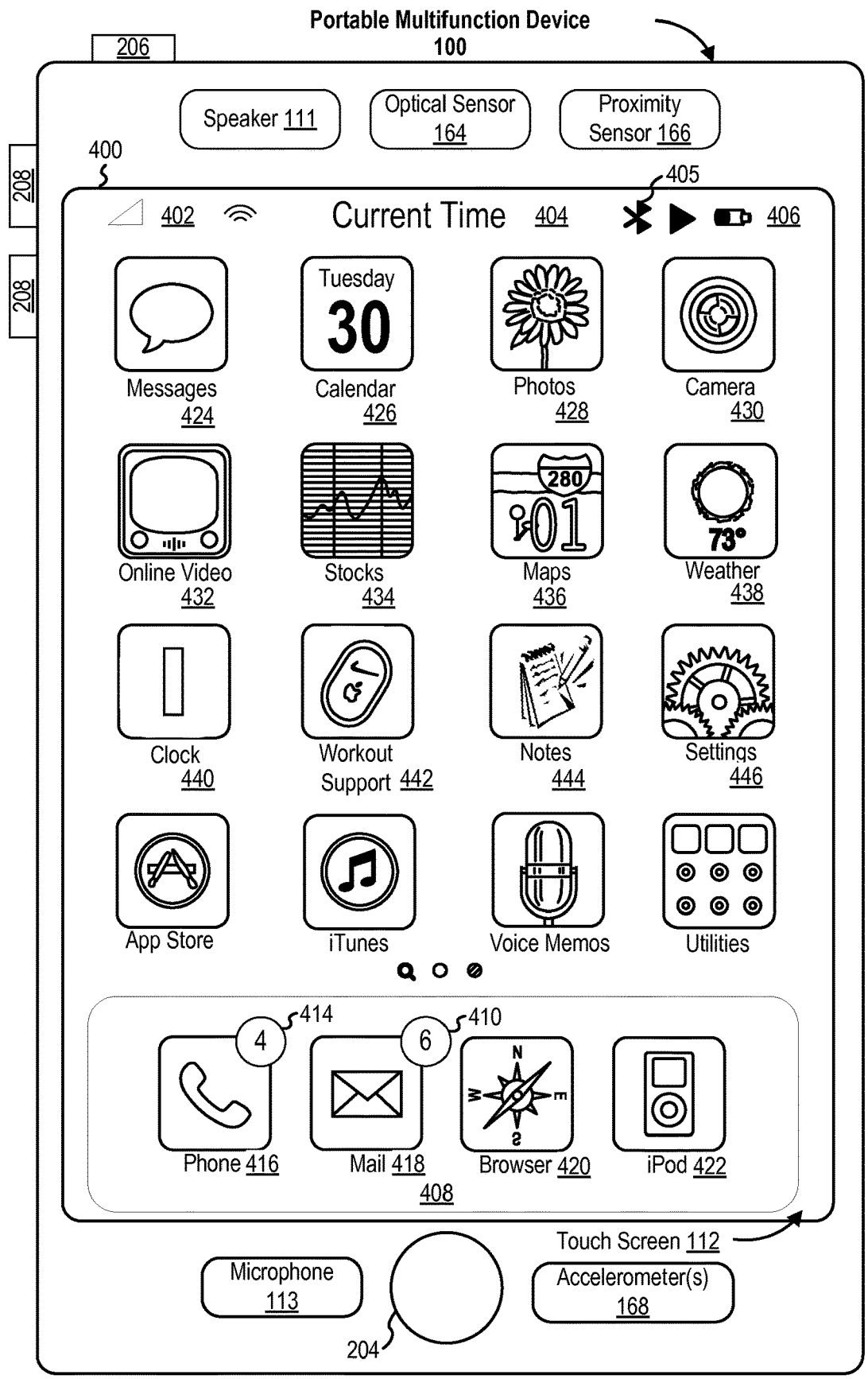
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
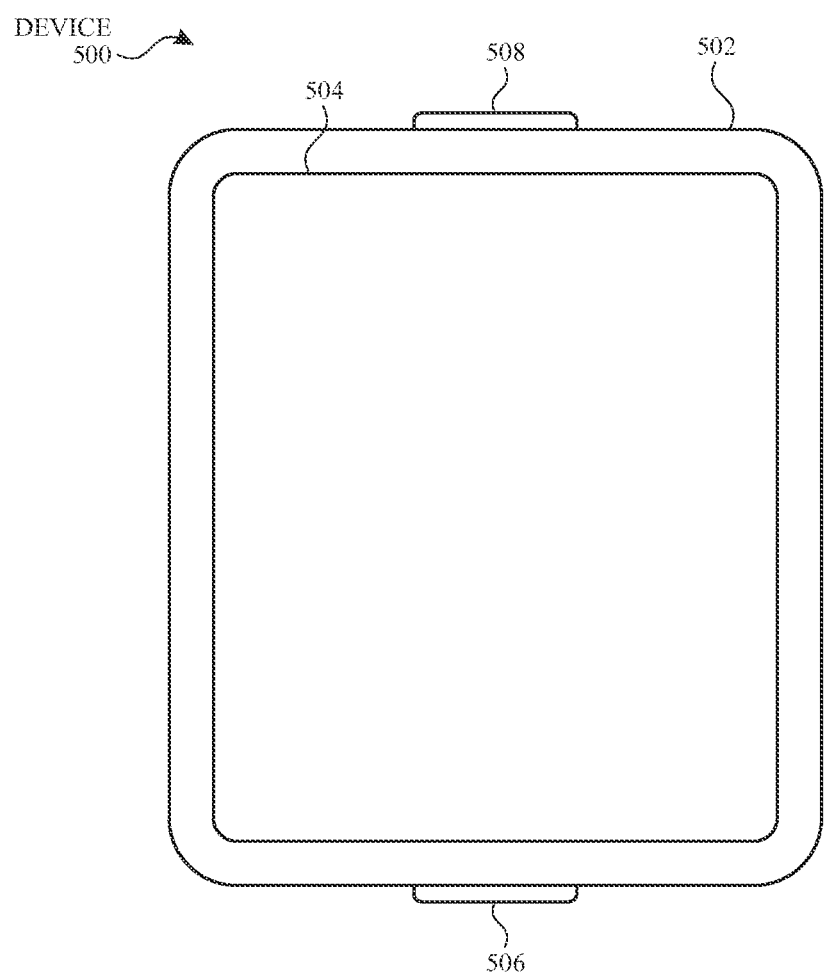
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
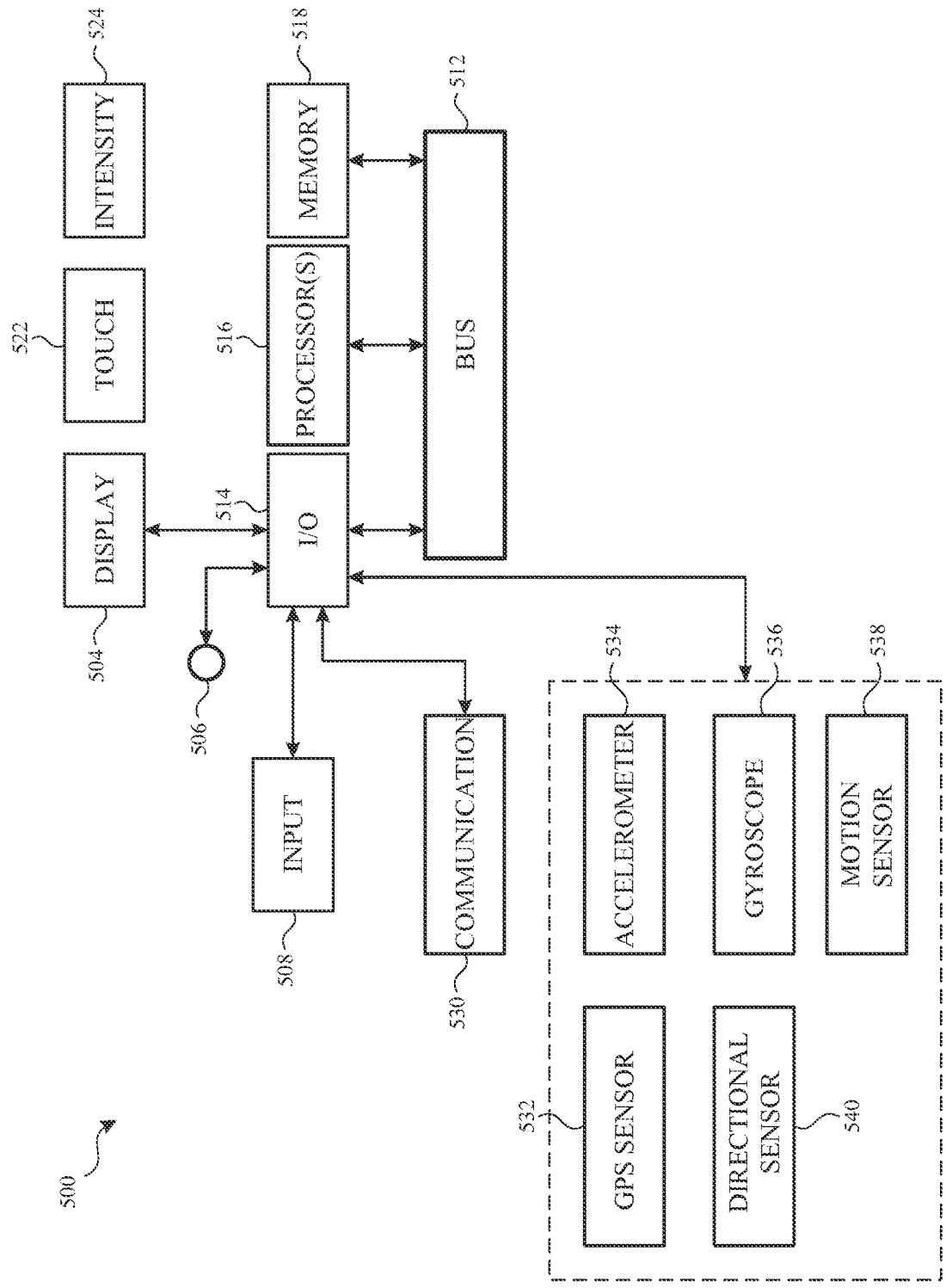
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700 (FIG. 7), 900 (FIG. 9), 1000 (FIG. 10), 1200 (FIG. 12), 1400 (FIG. 14A), 1420 (FIG. 14B), and 1600 (FIG. 16). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5D:
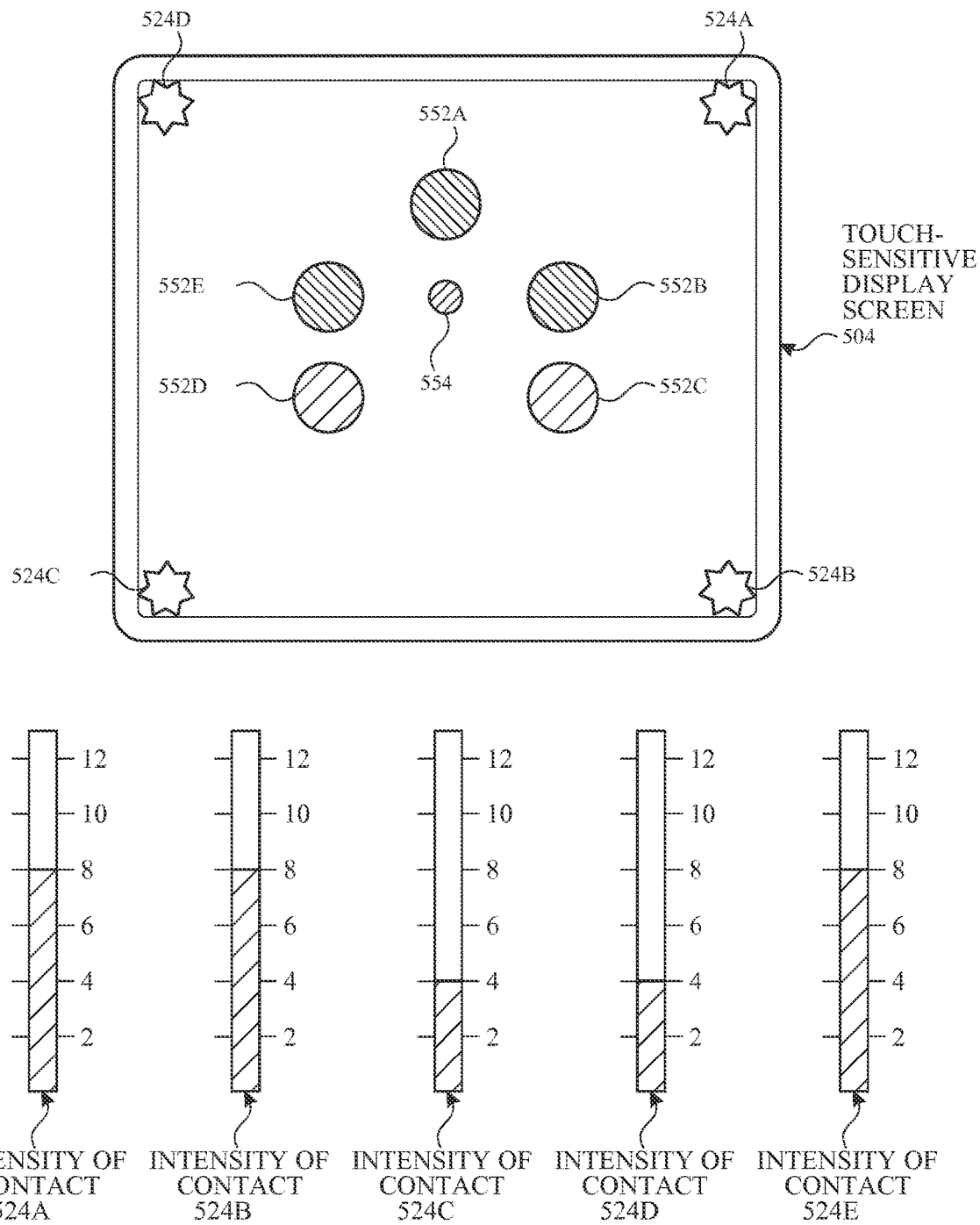

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented, for example, on an electronic device, such as multifunction device 100, 300, and/or 500, to improve a user's experience in providing user input. The illustrated user interface screens optionally include an illustrated finger with an optional arrow illustrating movement of the finger. The illustrated finger and corresponding arrow are typically not part of the displayed user interface, but are provided to aid in the interpretation of the figures.

FIGS. 6A-6D illustrate exemplary user interfaces for receiving user input using an electronic device, in accordance with some embodiments. In some embodiments, the electronic device is device 500. In some embodiments, the electronic device has a display (e.g., 112, 340, 504), a touch-sensitive surface (e.g., 112, 355, 504), and a rotatable input mechanism (e.g., 506).

Figure 6A:
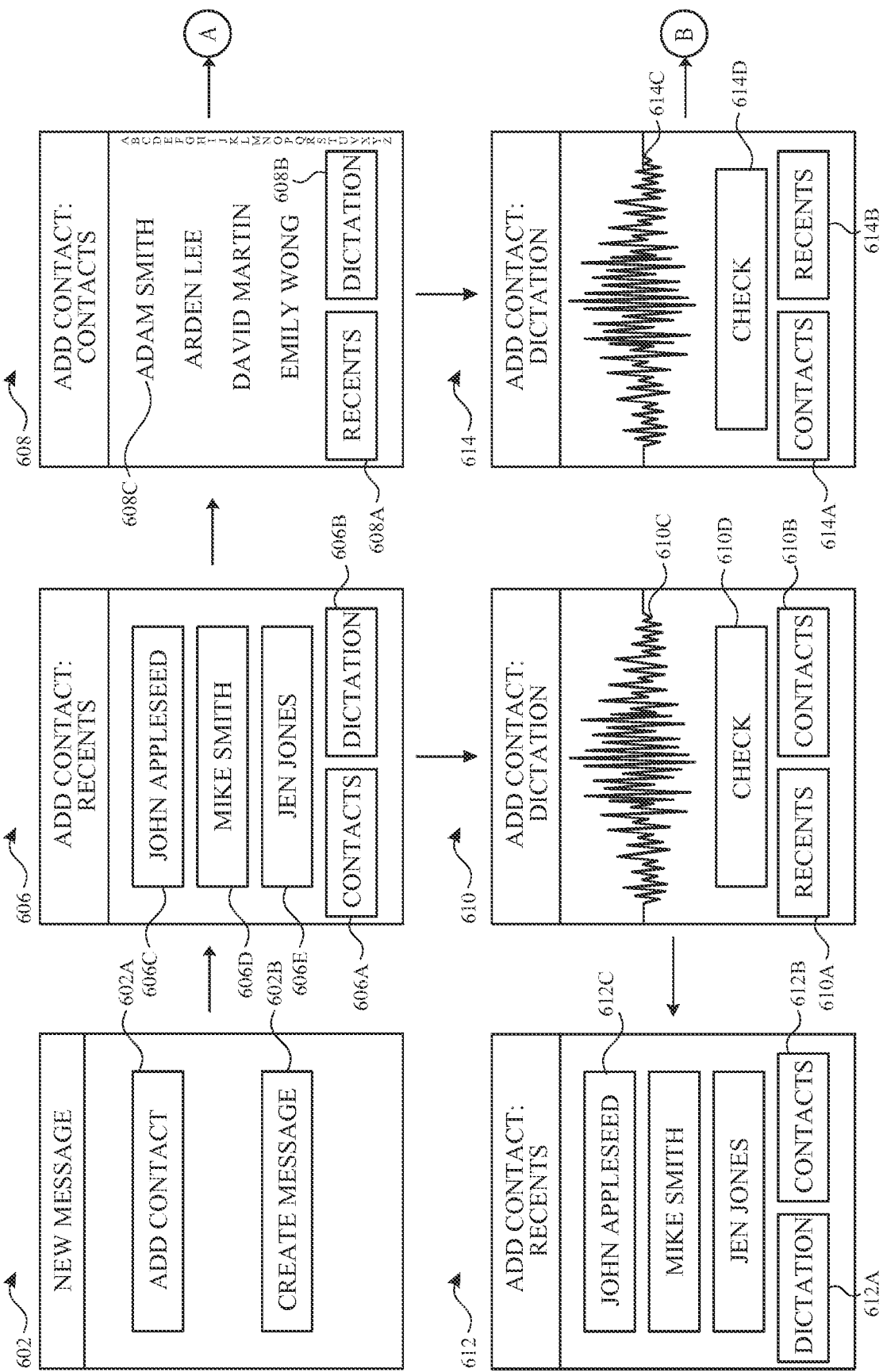
FIGS. 6A-6D illustrate exemplary user interfaces for receiving user input in accordance with some embodiments.

In FIG. 6A, user interface screen 602 displays an add contact affordance 602A and a create message affordance 602B. User interface screen 602 may be displayed, for example, when a user requests to create a new iMessage®, SMS message, electronic mail, or the like. The device receives a user input (e.g., user taps the add contact affordance 602A). In response to receiving the user input, the device identifies a most recently accessed user input technique of a set of user input techniques (e.g., the last input technique the user used when adding a new contact, which may be the user's preference, such as a recent contacts list). In some examples, recently accessed means recently used to add a contact address to a message. In other examples, recently accessed means recently displayed on the display. By determining which user input technique of various accessible user input techniques a user has accessed most recently, the device can make an educated determination as to what user input technique the user is likely to want to use again—the most recently accessed user input technique.

At user interface screen 606, the device displays a user input interface of the most recently accessed user input technique (e.g., the user interface for selecting a contact). In this example, the most recently accessed user input technique is the recent contacts functionality with affordances 606C-606E. User interface screen 606 displays recent contacts 606C-606E with which the user has had communication with (e.g., send a message to or received a message from). Thus, because the user used the recent contacts functionality the previous time that the user added a contact to a message (e.g., the most recently accessed user input technique), the device displays the user interface corresponding to this functionality.

The device also identifies a least recently accessed user input technique of the set of user input techniques (e.g., the technique the user has not used in a while). In this example, the least recently accessed user input technique is the dictation functionality. For example, this is the user input technique that the user does not favor and therefore rarely accesses. The device displays, on the display, a first affordance associated with a user input interface of the least recently accessed user input technique (e.g., affordance 606B, that when activated, causes display of a user interface for the user input technique least recently displayed). Thus, in this example, the affordance at the bottom right of the display provides the user with access to the least recently accessed user input technique.

In accordance with some embodiments, the device identifies a second-most recently accessed user input technique of the set of user input techniques (e.g., the technique used prior to the currently displayed technique). The device displays a second affordance associated with a user input interface of the second-most recently accessed user input technique (e.g., an affordance 606A, that when activated, causes display of a user interface for the user input technique most recently displayed prior to the currently displayed user input technique). In user interface screen 606, the affordance 606A displayed at the bottom left of the display provides the user with access to the second-most recently accessed user input technique, which is the all contacts functionality.

In accordance with some embodiments, the user input interface of the most recently accessed user input technique comprises a selection affordance associated with the most recently accessed user input technique (e.g., an affordance 606C, 606D, 606E, for selecting content from among a plurality of content or an affordance for starting and/or ending an audio recording). At user interface screen 606, activating one of affordance 606C-606E causes the device to add contact information corresponding to the activated affordance as a recipient to the new message. As will be understood, by providing affordances to communicate with recent correspondents the device saves the user keystrokes that might otherwise be required to enter a name or navigate a contact list. Further, by providing a more efficient interface, the device can conserve power, for example, by activating the display for less time.

In accordance with some embodiments, the most recently accessed user input technique, the least recently accessed user input technique, and the second-most recently accessed user input technique are different techniques of the set of user input techniques. In accordance with some embodiments, the most recently accessed user input technique, the least recently accessed user input technique, and the second-most recently accessed user input technique are selected from the group comprising a recent contacts functionality, an all contacts functionality, and a dictation functionality (e.g., the most recent user input technique is a recent contacts functionality, the least recent user input technique is a dictation functionality, the second-most recent user input technique is an all contacts functionality, as in user interface screen 606).

In accordance with some embodiments, the most recently accessed user input technique, the least recently accessed user input technique, and the second-most recently accessed user input technique are selected from the group comprising a suggested replies functionality, an emoji functionality, and a dictation functionality (e.g., the most recent user input technique is a suggested replies mode, the least recent user input technique is an emoji mode, the second-most recent user input technique is a dictation mode).

In accordance with some embodiments, the set of user input techniques is a closed set of predetermined input techniques. In accordance with some embodiments, a quantity of user input techniques of the set of user input techniques is predetermined. In accordance with some embodiments, the first affordance provides an indication of the least recently accessed user input technique (e.g., the affordance 606B includes a label of "Dictation," in user interface screen 606). In accordance with some embodiments, the second affordance provides an indication of the second-most recently accessed user input technique (e.g., the affordance 606A includes a label of "Contacts," in user interface screen 606).

In accordance with some embodiments, the first affordance (e.g., 606B), the second affordance (e.g., 606B), and the user input interface of the most recently accessed user input technique (e.g., 606C-606E) are concurrently displayed. This allows the user to provide input using the most recently accessed user input technique, or quickly switch over to the second-most recently accessed user input technique, or even switch over to the least recently accessed user input technique.

In accordance with some embodiments, the device receives user input associated with the first affordance (e.g., 606A) associated with the user input interface of the least recently accessed user input technique (e.g., the user taps on (or otherwise activates) the first affordance). In response to receiving user input associated with the first affordance, the device replaces display of the user input interface of the most recently accessed user input technique with display of the user input interface of the least recently accessed user input technique, as illustrated in user interface screen 610. Thus, at user interface screen 606, affordance 606A, when activated, causes user interface screen 610 to be displayed. Note that at user interface 610, the recent contacts functionality is now the second-most recently accessed technique, as illustrated by recent contacts affordance 610A at the bottom left of the display. Similarly, the all contacts functionality is now the least recently accessed technique, and therefore the corresponding affordance (e.g., 610B) for the all contacts functionality is displayed at bottom right of user interface screen 610. The dictation functionality becomes the most recently accessed technique, and therefore a user interface for the dictation functionality is displayed (e.g., 610C and 610D).

Returning to user interface screen 606, in accordance with some embodiments, the device receives user input associated with the first affordance associated with the user input interface of the least recently accessed user input technique (e.g., the user taps on (or otherwise activates) the first affordance). In response to receiving user input associated with the first affordance, the device replaces display of the user input interface of the most recently accessed user input technique with display of the user input interface of the least recently accessed user input technique, and the device replaces display of the first affordance associated with the user input interface of the least recently accessed user input technique with display of a third affordance associated with the user input interface of the most recently accessed user input technique, and the device replaces display of the second affordance associated with the user input interface of the second-most recently accessed user input technique with display of a fourth affordance associated with the user input interface of the most recently accessed user input technique. Thus, the user interface transitions to the dictation functionality, and affordance 610 corresponds to recent contacts functionality and affordance 610B corresponds to all contacts functionality.

Returning to user interface screen 606, if the user activates affordance 606A corresponding to all contacts functionality, the device displays user interface screen 608. At user interface screen 608, the user interface for the most recently accessed user input technique is displayed (e.g., 608C for all contacts functionality). Affordance 608A corresponds to the second most recently accessed user input technique (e.g., recent contacts functionality) and affordance 608B corresponds to the least recently accessed user input technique (e.g., dictation functionality).

Figure 6B:
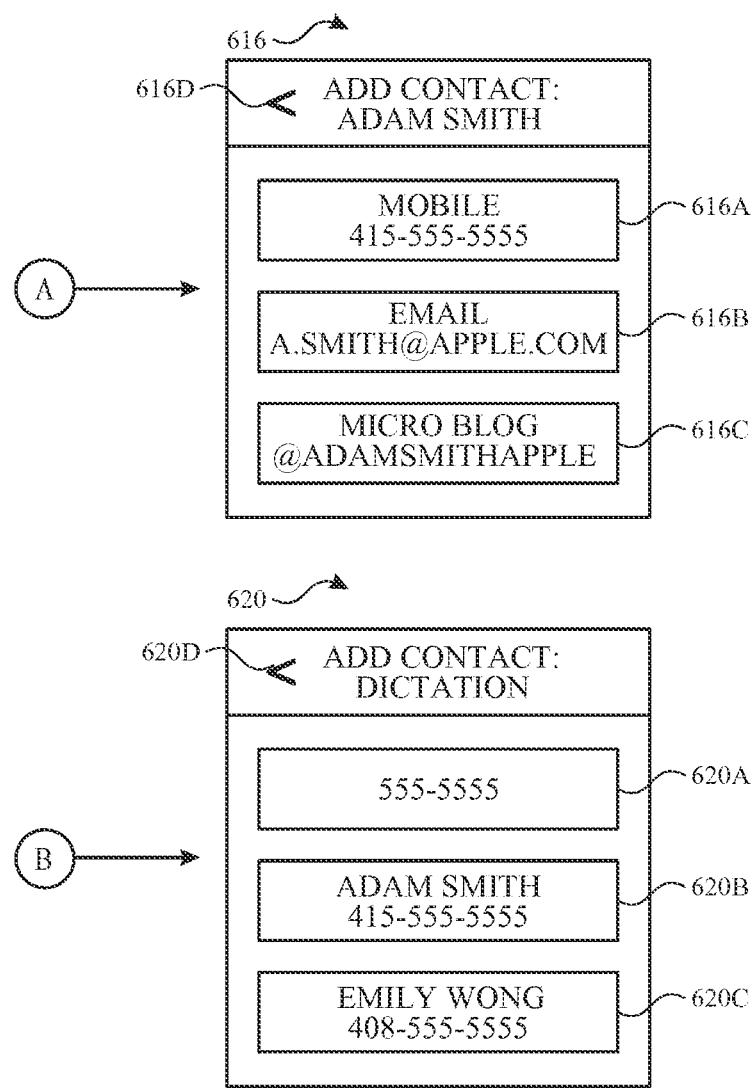
Figure 6C:
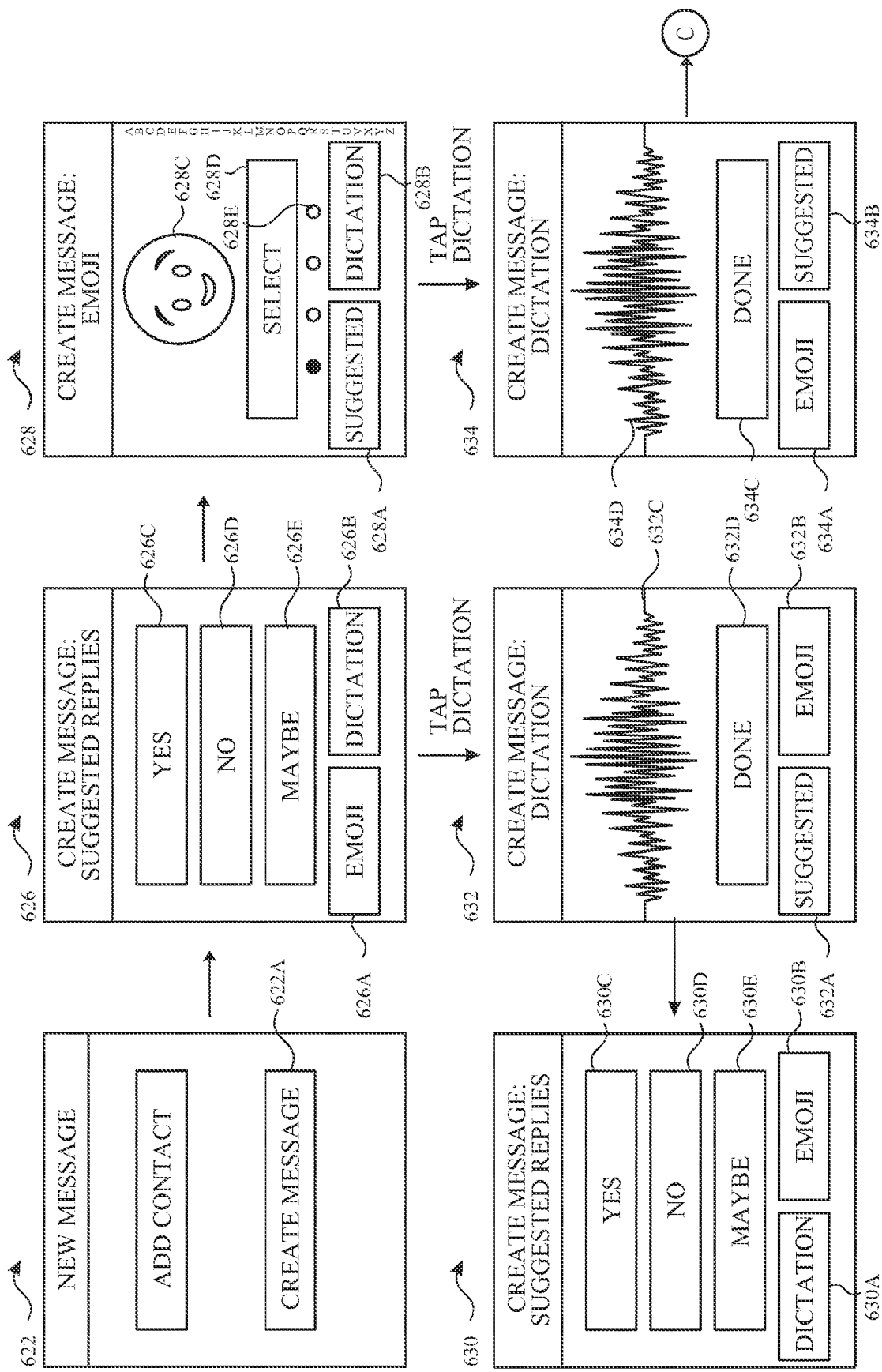
Figure 6D:
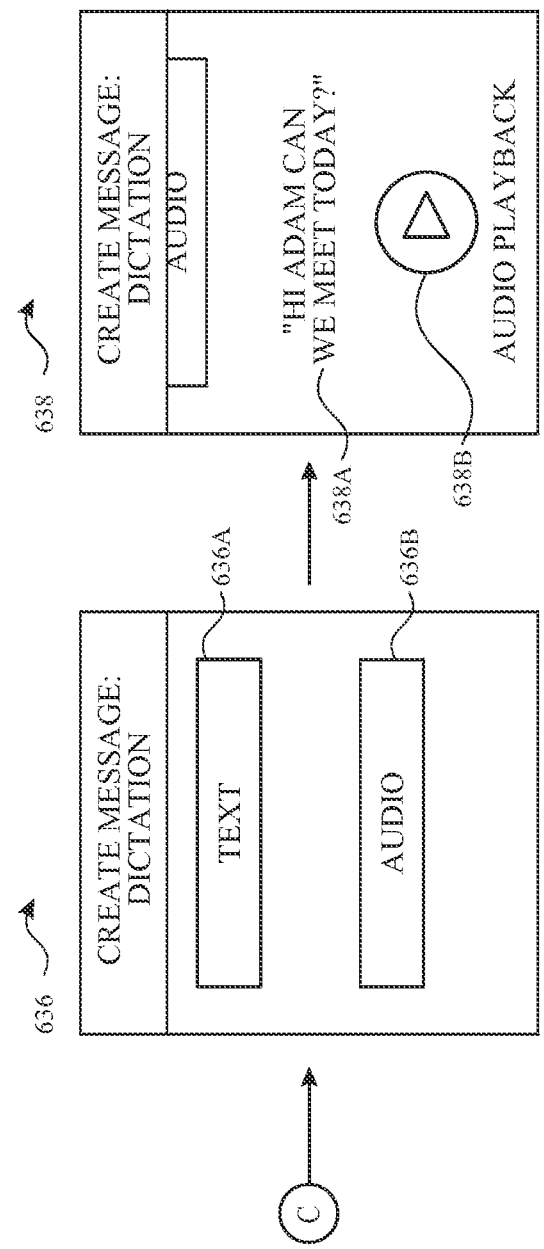

At user interface screen 608, if the user activates affordance 608C corresponding to the Adam Smith contact, the device displays user interface screen 616 of FIG. 6B. User interface screen 616 includes the contact information associated with the Adam Smith contact. For example, user interface screen 616 includes an affordance 616A for a mobile telephone number, affordance 616B for an electronic mail address, and affordance 616C for a micro blogging handle. Activating any of affordances 616A-C causes the device to add the corresponding contact information as recipient information in an electronic message. Activation of return affordance 616D cause the device to replace display of user interface screen 616 with user interface screen 608.

Returning to user interface screen 608, if the user activates affordance 608B corresponding to dictation functionality, the device displays user interface screen 614. At user interface screen 614, the user interface for the most recently accessed user input technique is displayed (e.g., 614C, 614D for dictation functionality). Affordance 614A corresponds to the second most recently accessed user input technique (e.g., all contacts functionality) and affordance 614B corresponds to the least recently accessed user input technique (e.g., recent contacts functionality).

At user interface screen 614, the device receives audio input. If the user activates affordance 614C, the device displays user interface screen 620 of FIG. 6B. The device transcribes the received audio input and displays all or a portion of the transcribed audio as affordance 620A. In this example, the transcribed audio input is "555-5555." User interface screen 620 includes an affordance 620B for contact information for Adam Smith, which corresponds to the transcribed audio, and an affordance 620C for contact information for Emily Wong, which also corresponds to the transcribed audio. Activating any of affordances 620A-C causes the device to add the corresponding contact information as recipient information in an electronic message. Activation of return affordance 620D cause the device to replace display of user interface screen 616 with user interface screen 614.

Returning to user interface screen 610, if the user activates affordance 610A corresponding to recent contacts functionality, the device displays user interface screen 612. At user interface screen 612, the user interface for the most recently accessed user input technique is displayed (e.g., 614C for recent contacts functionality). Affordance 612A corresponds to the second most recently accessed user input technique (e.g., dictation functionality) and affordance 612B corresponds to the least recently accessed user input technique (e.g., all contacts functionality). Note that user interface screen 612 differs from user interface screen 606 because of the path taken to accessing user interface screen 612.

After (or before) a user adds contact information as recipients to an electronic message (e.g., by activating affordance 602A of user interface screen 602), the user may create the body of the electronic message (e.g., by activating the create message affordance 602B). User interface screen 622, which corresponds to user interface screen 602, includes a create message affordance 622A. At user interface screen 622, if the user activates affordance 622A, the device displays user interface screen 626 of FIG. 6C.

At user interface screen 626, the user interface for the most recently accessed user input technique is displayed (e.g., 626C-626E for suggested replies functionality). Affordance 626A corresponds to the second most recently accessed user input technique (e.g., emoji functionality) and affordance 626B corresponds to the least recently accessed user input technique (e.g., dictation functionality).

Different techniques may be used to produce suggested replies (also known as "suggested responses"). In one example, the device determines whether a received message contains an interrogatory. This determination may be based on the determination that the received message contains the verbiage "are you" at the beginning of the received message and a question mark at the end of the received message. Based on determining that the received message contains an interrogatory, the one or more suggested responses may include "yes," "no," and "maybe."

In another example, the received message may state "beef or chicken?" As before, the device may determine that the message contains an interrogatory (based on at least the use of the question mark in the message). In addition, the device may recognize the interrogatory is one that contains alternative choices, based on the appearance of the word "or" in the received message. In this case, the device may parse the words immediately before and after the word "or". Accordingly, the one or more suggested responses may include "beef" and "chicken".

Techniques for determining suggested replies may be found, for example, in related U.S. Provisional Patent Application Ser. No. 62/005,958, entitled "Canned Answers in Messages," filed May 30, 2014, the entire disclosure of which is incorporated herein by reference.

At user interface screen 626, the device receives user activation of one of the affordances 626C-626E. In accordance with receiving the user activation, the device adds the corresponding suggested reply to the body of the electronic message (e.g., the content of an SMS or the body of an electronic mail message). As will be understood, by providing affordances to add suggested responses the device saves the user keystrokes that might otherwise be required to enter a name or navigate a contact list. Further, by providing a more efficient interface, the device can conserve power, for example, by activating the display for less time.

Returning to user interface screen 626, if the user activates affordance 626A corresponding to emoji functionality, the device displays user interface screen 628. At user interface screen 628, the user interface for the most recently accessed user input technique is displayed (e.g., 628C, 628D, 628E for emoji functionality). Affordance 628A corresponds to the second most recently accessed user input technique (e.g., suggest replies functionality) and affordance 628B corresponds to the least recently accessed user input technique (e.g., dictation functionality).

At user interface screen 628, if the user activates affordance 628B corresponding to dictation functionality, the device displays user interface screen 634. At user interface screen 634, the user interface for the most recently accessed user input technique is displayed (e.g., 634C, 634D for dictation functionality). Affordance 634A corresponds to the second most recently accessed user input technique (e.g., emoji functionality) and affordance 634B corresponds to the least recently accessed user input technique (e.g., suggested replies functionality).

At user interface screen 634, the device receives audio input. If the user activates affordance 634C, the device displays user interface screen 636 of FIG. 6D. The device transcribes the received audio input. The device displays a text affordance 636A and an audio affordance 636B. The text affordance 636A, when activated, causes the device to add the transcribed audio input to the body of the electronic message. The audio affordance 636B, when activated, causes the device to add the received audio input as the body of the electronic message (e.g., as an audio file). The device receives a scroll input and the display user interface 636 scrolls, as shown in user interface screen 638. At user interface screen 638, the device displays the transcribed audio input 636A and an affordance 638B for playing back the record received audio input. This allows the user to see the transcribed text for accuracy and make a determination as to whether the transcribed text or the audio recording should be sent to recipients of the electronic message.

Returning to user interface screen 626, if the user activates affordance 626B corresponding to dictation functionality, the device displays user interface screen 632. At user interface screen 632, the user interface for the most recently accessed user input technique is displayed (e.g., 632C, 632D for dictation functionality). Affordance 632A corresponds to the second most recently accessed user input technique (e.g., suggest replies functionality) and affordance 632B corresponds to the least recently accessed user input technique (e.g., emoji functionality). Note that user interface screen 632 differs from user interface screen 634 because of the path taken to accessing the two user interfaces.

At user interface 632, if the user activates affordance 632A corresponding to suggested replies functionality, the device displays user interface screen 630. At user interface screen 630, the user interface for the most recently accessed user input technique is displayed (e.g., 630C-630E for suggested replies functionality). Affordance 630A corresponds to the second most recently accessed user input technique (e.g., dictation functionality) and affordance 630B corresponds to the least recently accessed user input technique (e.g., emoji functionality). Note that user interface screen 630 differs from user interface screen 626 because of the path taken to access user interface screen 630.

Transcribing the received audio input (e.g., speech) can be done several ways, including: (1) locally, by the electronic device, (2) remotely, where the electronic device transmits (e.g., via WiFi or Bluetooth) the user input representing speech (or data that is based on the user input representing speech) to an external device (e.g., a cellular phone or laptop), the external device locally transcribes the user input, and the electronic device receives the transcribed speech from the external device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to an external device (e.g., a cellular phone or laptop), the external device transmits the user input to a server, the server transcribes the user input, the external device receives the transcribed speech from the server, and the electronic device receives the transcribed speech from the external device. The device adds the transcribed speech as response information for the electronic conversation. For example, the transcription can be performed using speech-to-text and/or automatic speech recognition using a virtual assistant. At user interface screen 646, the conversation 646A has been updated to reflect the addition of "Sure! I'll sent it soon." in the field 646B. Thus, the user can provide audio input to enter response information for an electronic conversation. Send affordance 646C, when enabled and activated, causes the response information (e.g., the transcribed speech) to be transmitted to the recipient(s) of the conversation. Once the reply is sent, a notification 648 indicating that the reply has been sent is displayed.

An example of a virtual assistant is described in Applicants' U.S. Utility application Ser. No. 12/987,982 for "Intelligent Automated Assistant," filed Jan. 10, 2011, the entire disclosure of which is incorporated herein by reference.

FIG. 7 is a flow diagram illustrating method 700 for receiving user input in accordance with some embodiments. In some embodiments, method 700 may be performed at an electronic device with a display (e.g., 112, 340, 504), a touch-sensitive surface (e.g., 112, 355, 504), and a rotatable input mechanism (e.g., 506). Some operations in method 700 may be combined, the order of some operations may be changed, and some operations may be omitted.

In some embodiments, the touch-sensitive surface (e.g., 112, 355, 504) is capable of detecting intensity of touch contacts. In some embodiments, method 700 may be performed at an electronic device with a display and a touch-sensitive surface (e.g., 112, 355, 504) that is able to determine a substitute (proxy) for the force or pressure of a contact on the touch-sensitive surface. Exemplary devices that may perform method 700 include devices 100, 300, and 500 (FIGS. 1A, 3, and 5A).

Method 700 provides an intuitive way to receive user input. The method reduces the cognitive burden on a user when entering information using a device, thereby creating a more efficient human-machine interface. For battery-operated computing devices, enabling a user to enter information faster and more efficiently conserves power and increases the time between battery charges.

At block 702, a user input is received. At block 704, in response to receiving the user input, blocks 706-712 are performed. At block 706, a most recently accessed user input technique of a set of user input techniques is identified. At block 708, a least recently accessed user input technique of the set of user input techniques is identified. At block 710, a user input interface of the most recently accessed user input technique is displayed on the display. At block 712, a first affordance associated with a user input interface of the least recently accessed user input technique is displayed on the display.

In accordance with some embodiments, the user input interface of the most recently accessed user input technique comprises a selection affordance (e.g., 606C, 626C) associated with the most recently accessed user input technique.

In accordance with some embodiments, in response to receiving the user input, a second-most recently accessed user input technique of the set of user input techniques is identified, and a second affordance associated with a user input interface of the second-most recently accessed user input technique is displayed on the display.

In accordance with some embodiments, the most recently accessed user input technique, the least recently accessed user input technique, and the second-most recently accessed user input technique are different techniques of the set of user input techniques.

In accordance with some embodiments, the most recently accessed user input technique, the least recently accessed user input technique, and the second-most recently accessed user input technique are selected from the group comprising a recent contacts functionality, an all contacts functionality, and a dictation functionality.

In accordance with some embodiments, the most recently accessed user input technique, the least recently accessed user input technique, and the second-most recently accessed user input technique are selected from the group comprising a suggested replies functionality, an emoji functionality, and a dictation functionality.

In accordance with some embodiments, the set of user input techniques is a closed set of predetermined input techniques. In accordance with some embodiments, a quantity of user input techniques of the set of user input techniques is predetermined. In accordance with some embodiments, the first affordance provides an indication of the least recently accessed user input technique. In accordance with some embodiments, the second affordance provides an indication of the second-most recently accessed user input technique. In accordance with some embodiments, the first affordance, the second affordance, and the user input interface of the most recently accessed user input technique are concurrently displayed.

In accordance with some embodiments, user input associated with the first affordance associated with the user input interface of the least recently accessed user input technique is received. In response to receiving user input associated with the first affordance, display of the user input interface of the most recently accessed user input technique is replaced with display of the user input interface of the least recently accessed user input technique.

In accordance with some embodiments, user input associated with the first affordance associated with the user input interface of the least recently accessed user input technique is received. In response to receiving user input associated with the first affordance: display of the user input interface of the most recently accessed user input technique is replaced with display of the user input interface of the least recently accessed user input technique; display of the first affordance associated with the user input interface of the least recently accessed user input technique is replaced with display of a third affordance associated with the user input interface of the most recently accessed user input technique; and display of the second affordance associated with the user input interface of the second-most recently accessed user input technique is replaced with display of a fourth affordance associated with the user input interface of the most recently accessed user input technique.

Note that details of the processes described above with respect to method 700 (FIG. 7) are also applicable in an analogous manner to the methods described below. For example, method 900 (FIG. 9), method 1000 (FIG. 10), method 1200 (FIG. 12), method 1400 (FIG. 14A), method 1420 (FIG. 14B), and method 1600 (FIG. 16) may include one or more of the characteristics of the various methods described above with reference to method 700. For brevity, these details are not repeated below.

It should be understood that the particular order in which the operations in FIG. 7 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may be incorporated with one another. Thus, the techniques described with respect to method 700 may be relevant to method 900 (FIG. 9), method 1000 (FIG. 10), method 1200 (FIG. 12), method 1400 (FIG. 14A), method 1420 (FIG. 14B), method 1600 (FIG. 16).

Figure 8:
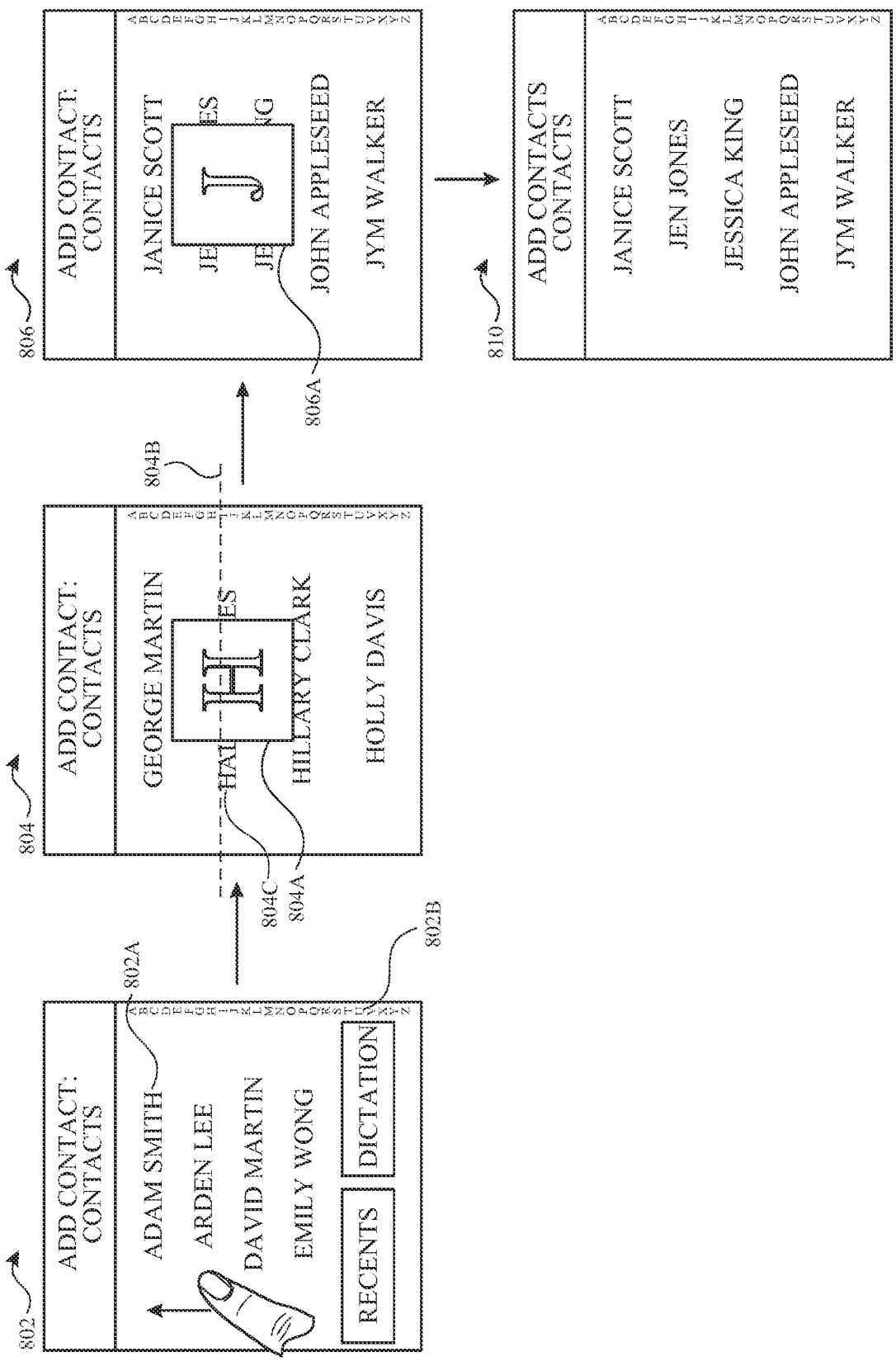
FIG. 8 illustrates exemplary user interfaces for receiving user input associated with a scrollable list in accordance with some embodiments.

FIG. 8 illustrates exemplary user interfaces for receiving user input associated with a scrollable list in accordance with some embodiments. In some embodiments, the electronic device is device 500. The electronic device has a display (e.g., 112, 340, 504). The electronic device may also include a touch-sensitive surface (e.g., 112, 355, 504) and a rotatable input mechanism (e.g., 506). Under certain conditions, it may be difficult for a user to quickly and efficiently determine the scrolling progress made when the user scrolls through a list of items on a display. Thus, it may be helpful to display an index object, which provides an indication of the scrolling progress.

At user interface 802, a portion of a set of information is displayed (e.g., a portion of a list of contacts; 802A and other names). In this example, the elements of the set of information (e.g., the contacts in the list of contacts) are in alphabetical order, with "Adam Smith" 802A displayed at the top of the set of information. The device receives user input associated with the set of information (e.g., the user performs a finger swipe on the displayed set of information, the user turns a rotatable input mechanism, or the user swipes upward or downward along index bar 802B.). In response to receiving the user input associated with the set of information, the device scrolls the set of information on the display. The device determines whether a scroll attribute (e.g., the speed, acceleration, duration of the scroll; the speed, acceleration, duration of the user input) satisfies a threshold criteria (e.g., scrolling is above a threshold scrolling speed, acceleration is above a threshold acceleration, scroll duration is longer than a threshold scroll duration; user input is above a threshold speed or threshold acceleration, user input duration is longer than a threshold duration), In accordance with a determination that the scroll attribute satisfies the threshold criteria (e.g., the scrolling is above the threshold scrolling speed, the user input is above the threshold speed), the device displays an index object 804A, as illustrated in user interface screen 804.

In accordance with some embodiments, the index object 804A fully or partially overlays at least a portion of the set of information, as illustrated in user interface screen 804. By overlaying the portion of the set of information, does user does not need to direct their attention to a different portion of the display to see the index object 804A. Thus, a user that is watching the set of information scroll on the display can easily see index object 804A when it is displayed as an overlay.

In accordance with some embodiments, the scroll attribute is an attribute of scrolling (e.g., the speed, acceleration, duration of the scroll) of the set of information. Thus, for example, index object 804A is displayed when the set of information exceeds a particular scrolling speed. In accordance with some embodiments, the scroll attribute is an attribute (e.g., the speed, acceleration, duration of the scroll) of the user input. Thus, for example, index object 804A is displayed when the user input exceeds a particular speed, such as an upward swipe that exceeds a particular speed or a rotation of the rotatable input mechanism that exceeds a particular rotation speed. Similarly, in some embodiments, the threshold criteria is based on one or more of exceeding a threshold speed, exceeding a threshold velocity, and exceeding a threshold duration.

In accordance with some embodiments, the electronic device includes a touch-sensitive surface, and the user input is a swipe touch on the touch-sensitive surface (e.g., a vertical swipe or flick on the set of information to scroll the set of information). In accordance with some embodiments, the electronic device includes a rotatable input mechanism, and the user input is a rotation of the rotatable input mechanism (e.g., the user rotates the rotatable input mechanism to scroll the list of information).

In some embodiments, in accordance with a determination that the scroll attribute does not satisfy the threshold criteria, the device does not display (or stops displaying) the index object (e.g., 804A, 806A) fully or partially overlaying the set of information. Thus, when the user provides input to scroll the set of information, the index object may not appear if, for example, the scroll speed does not exceed a threshold scroll speed. Similarly, when the index object is being displayed, the device may stop displaying the index object when the scroll speed no longer exceeds the threshold scroll speed. For example, in user interface 806, as the scroll speed of the set of information reduces, the device may stop displaying index object 806A, as illustrated in user interface screen 810. In some examples, the set of information may continue to scroll, though the index object 806A is no longer displayed, when the scroll attribute no longer satisfies the threshold criteria. In some example, the threshold criteria (e.g., a first threshold scroll speed) for displaying the index object may be different than the threshold criteria (e.g., a second threshold scroll speed) for stopping display of the index object.

In accordance with some embodiments, the index object 804A, 806A comprises an index (e.g., a single alphabetical character or a single numeric character; "H" in 804A, "J" in 806A) based on one or more currently displayed information of the set of information (e.g., based on the character position used for alphabetically sorting the set of information; the first letter of the first names in user interface screen 804, "H"). Thus, the index indicates to the user what portion of the set of information is currently being displayed.

In accordance with some embodiments, the device determines whether an index update attribute of the set of information satisfies an overlay update criteria (e.g., has an item in the set of information reached a threshold location on the display). For example, the device may determine whether a first name with a first letter different than the letter currently displayed in the index has exceeded a threshold (overlay update criteria). In user interface 804, the index update attribute is the vertical location of the top "H" name 804C. Because the name 804C has reached the threshold location (displayed for explanation purposes only, not a part of the user interface), the device determines that the overlay update criteria is satisfied (e.g., location of the list has sufficiently changed to necessitate an update in the index). In accordance with a determination that the index update attribute of the set of information satisfies the index update criteria, the device updates display of a visual aspect of the index object (e.g., updating the index object to reflect the letter corresponding to the portion of the list being displayed). Thus, as the set of information scrolls, the device updates the displayed letter/character of the index object (e.g., 804A "H" updated to 806A "J") to reflect the position of the set of information (e.g., transition from "H" names in 804 to "J" names in 806).

In accordance with some embodiments, the set of information is collated (e.g., all the "A" names are together, all the "B" names are together, etc.). In accordance with some embodiments, the set of information is displayed in alphabetical order (or reverse alphabetical order, or numeric order).

In accordance with some embodiments, the user input associated with the set of information comprises a first direction (e.g., upward or downward swipe on the touch-sensitive surface, clockwise rotation or counter-clockwise rotation of the rotatable input mechanism), and scrolling at least a portion of the set of information on the display comprises scrolling at least a portion of the set of information on the display in a second direction. The second direction is based on the first direction. Thus, the set of information scrolls in a direction requested by the user.

These techniques for displaying an index object may be used for various software applications and for various types of sets of information. In accordance with some embodiments, the set of information comprises a plurality of contacts (e.g., names, email addresses, and/or telephone numbers). In accordance with some embodiments, the set of information comprises a list of contacts (e.g., names, email addresses, and/or telephone numbers). In accordance with some embodiments, the set of information comprises a plurality (or list) of media attributes (e.g., the names of songs, audio recordings, videos, books, newspaper articles, websites, and/or email subjects; the artist of songs, audio recordings, and/or videos; the authors of books, newspaper articles, websites, and/or email).

FIG. 9 is a flow diagram illustrating method 900 for receiving user input associated with a scrollable list in accordance with some embodiments. In some embodiments, method 900 may be performed at an electronic device with a display (e.g., 112, 340, 504). The electronic device may also include a touch-sensitive surface (e.g., 112, 355, 504) and a rotatable input mechanism (e.g., 506). In some embodiments, the touch-sensitive surface (e.g., 112, 355, 504) is capable of detecting intensity of touch contacts. In some embodiments, method 900 may be performed at an electronic device with a touch-sensitive surface (e.g., 112, 355, 504) that is able to determine a substitute (proxy) for the force or pressure of a contact on the touch-sensitive surface. Exemplary devices that may perform method 900 include devices 100, 300, and 500 (FIGS. 1A, 3, and 5A). Some operations in method 900 may be combined, the order of some operations may be changed, and some operations may be omitted.

Under certain conditions, it may be difficult for a user to quickly and efficiently determine the scrolling progress made when the user scrolls through a list of items on a display. Thus, it may be helpful to display an index object, which provides an indication of the scrolling progress. Method 900 provides an intuitive way to scroll through a list based on user input. The method reduces the cognitive burden on a user when scrolling through a list using a device, thereby creating a more efficient human-machine interface. For battery-operated computing devices, enabling a user to scroll information faster and more efficiently conserves power and increases the time between battery charges.

At block 902, a portion of a set of information is displayed (e.g., 802A and other names of user interface 802).

At block 904, user input associated with the set of information is received (e.g., user swipes on the displayed set or user turns a rotatable input mechanism).

At block 906, in response to receiving the user input associated with the set of information, the set of information is scrolled on the display.

At block 908, it is determined whether a scroll attribute (e.g., the speed, acceleration, duration of the scroll; the speed, acceleration, duration of the user input) satisfies a threshold criteria (e.g., scrolling is above a threshold scrolling speed, acceleration is above a threshold acceleration, scroll duration is longer than a threshold scroll duration; user input is above a threshold speed or threshold acceleration, user input duration is longer than a threshold duration).

At block 910, in accordance with a determination that the scroll attribute satisfies the threshold criteria (e.g., the scrolling is fast, the user input is fast), an index object (e.g., 804A, 806A) is displayed.

In accordance with some embodiments, the index object (e.g., 804A, 806A) fully or partially overlays at least a portion of the set of information. In accordance with some embodiments, the scroll attribute is an attribute of scrolling (e.g., the speed, acceleration, duration of the scroll) of the set of information. In accordance with some embodiments, the scroll attribute is an attribute (e.g., the speed, acceleration, duration of the scroll) of the user input. In accordance with some embodiments, the threshold criteria is based on one or more of exceeding a threshold speed, exceeding a threshold velocity, and exceeding a threshold duration.

In accordance with some embodiments, at the electronic device with a touch-sensitive surface, the user input is a swipe contact touch on the touch-sensitive surface (e.g., a vertical swipe on the set of information to scroll the set of information). In accordance with some embodiments, at the electronic device with a rotatable input mechanism, the user input is a rotation of the rotatable input mechanism (e.g., the user rotates the rotatable input mechanism to scroll the list of information).

In accordance with some embodiments, at block 914, in accordance with a determination that the scroll attribute does not satisfy the threshold criteria, the index object (e.g., 804A, 806A) fully or partially overlaying the set of information is not displayed (or stops being displayed; e.g., as illustrated in 810).

In accordance with some embodiments, the index object (e.g., 804A, 806A) comprises an index (e.g., a single alphabetical character or a single numeric character) based on one or more currently displayed information of the set of information (e.g., based on the character position used for alphabetically sorting the set of information).

In accordance with some embodiments, it is determined whether an index update attribute of the set of information (e.g., position of 804C) satisfies an overlay update criteria (e.g., has an item in the set of information reached a threshold location 804B on the display). In accordance with a determination that the index update attribute of the set of information satisfies the index update criteria, display of a visual aspect of the index object is updated (e.g., updating the index object 804A/806A to reflect the letter corresponding to the portion of the list being displayed).

In accordance with some embodiments, the set of information is collated. In accordance with some embodiments, the set of information is displayed in alphabetical order.

In accordance with some embodiments, the user input associated with the set of information comprises a first direction (e.g., upward or downward swipe on the touch-sensitive surface, clockwise rotation or counter-clockwise rotation of the rotatable input mechanism), and scrolling at least a portion of the set of information on the display comprises scrolling at least a portion of the set of information on the display in a second direction, where the second direction is based on the first direction.

In accordance with some embodiments, the set of information comprises a plurality of contacts (e.g., names, email addresses, and/or telephone numbers). In accordance with some embodiments, the set of information comprises a list of contacts (e.g., names, email addresses, and/or telephone numbers). In accordance with some embodiments, the set of information comprises a plurality (or list) of media attributes (e.g., the names of songs, audio recordings, videos, books, newspaper articles, websites, and/or email subjects; the artist of songs, audio recordings, and/or videos; the authors of books, newspaper articles, websites, and/or email).

Note that details of the processes described above with respect to method 900 (FIG. 9) are also applicable in an analogous manner to the methods described above and below. For example, method 700 (FIG. 7), method 1000 (FIG. 10), method 1200 (FIG. 12), method 1400 (FIG. 14A), method 1420 (FIG. 14B), and method 1600 (FIG. 16) may include one or more of the characteristics of the various methods described above with reference to method 900. For brevity, these details are not repeated below.

It should be understood that the particular order in which the operations in FIG. 9 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may be incorporated with one another. Thus, the techniques described with respect to method 900 may be relevant to method 700 (FIG. 7), method 1000 (FIG. 10), method 1200 (FIG. 12), method 1400 (FIG. 14A), method 1420 (FIG. 14B), and method 1600 (FIG. 16).

Figure 10:
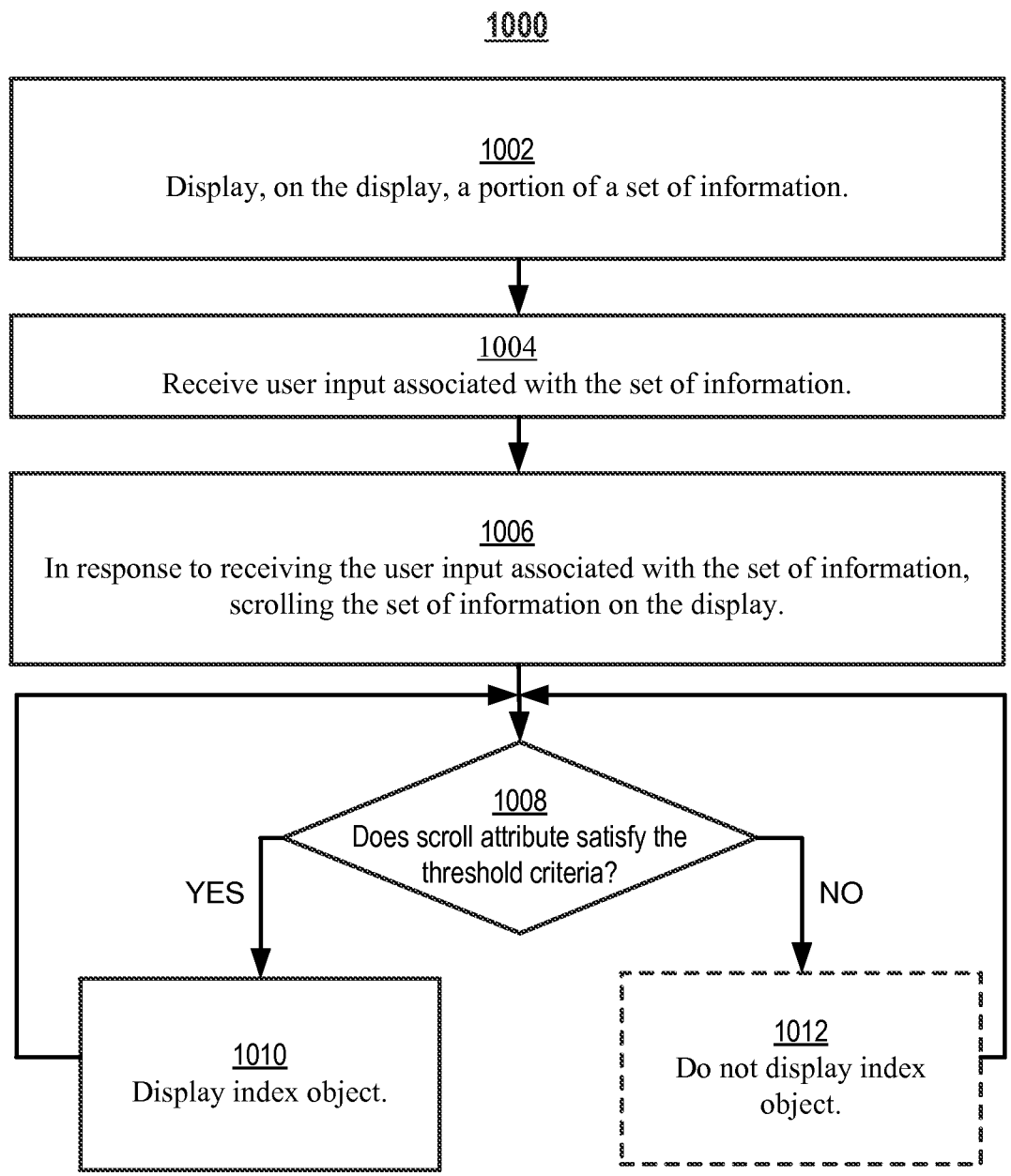
FIG. 10 is a flow diagram illustrating an exemplary process for receiving user input associated with a scrollable list in accordance with some embodiments.

FIG. 10 is a flow diagram illustrating method 1000 for receiving user input associated with a scrollable list in accordance with some embodiments. In some embodiments, method 1000 may be performed at an electronic device with a display (e.g., 112, 340, 504). The electronic device may also include a touch-sensitive surface (e.g., 112, 355, 504) and a rotatable input mechanism (e.g., 506). In some embodiments, the touch-sensitive surface (e.g., 112, 355, 504) is capable of detecting intensity of touch contacts. In some embodiments, method 900 may be performed at an electronic device with a display and a touch-sensitive surface (e.g., 112, 355, 504) that is able to determine a substitute (proxy) for the force or pressure of a contact on the touch-sensitive surface. Exemplary devices that may perform method 1000 include devices 100, 300, and 500 (FIGS. 1A, 3, and 5A). Some operations in method 1000 may be combined, the order of some operations may be changed, and some operations may be omitted.

Under certain conditions, it may be difficult for a user to quickly and efficiently determine the scrolling progress made when the user scrolls through a list of items on a display. Thus, it may be helpful to display an index object, which provides an indication of the scrolling progress. Method 1000 provides an intuitive way to scroll through a list based on user input. The method reduces the cognitive burden on a user when scrolling through a list using a device, thereby creating a more efficient human-machine interface. For battery-operated computing devices, enabling a user to scroll information faster and more efficiently conserves power and increases the time between battery charges.

At block 1002, a portion of a set of information is displayed (e.g., 802A and other names of user interface 802).

At block 1004, user input associated with the set of information is received (e.g., user swipes on the displayed set or user turns a rotatable input mechanism).

At block 1006, in response to receiving the user input associated with the set of information, the set of information is scrolled on the display.

At block 1008, it is determined whether a scroll attribute (e.g., the speed, acceleration, duration of the scroll; the speed, acceleration, duration of the user input) satisfies a threshold criteria (e.g., scrolling is above a threshold scrolling speed, acceleration is above a threshold acceleration, scroll duration is longer than a threshold scroll duration; user input is above a threshold speed or threshold acceleration, user input duration is longer than a threshold duration).

At block 1010, in accordance with a determination that the scroll attribute satisfies the threshold criteria (e.g., the scrolling is fast, the user input is fast), an index object (e.g., 804A, 806A) is displayed.

Optionally, at block 1012, in some embodiments, in accordance with a determination that the scroll attribute does not satisfy the threshold criteria (e.g., the scrolling is slow, the user input is slow), the index object is not displayed (e.g., is not displayed or stops being displayed).

The determination at block 1008 may then be repeated.

Note that details of the processes described above with respect to method 1000 (FIG. 10) are also applicable in an analogous manner to the methods described above and below. For example, method 700 (FIG. 7), method 900 (FIG. 9), method 1200 (FIG. 12), method 1400 (FIG. 14A), method 1420 (FIG. 14B), and method 1600 (FIG. 16) may include one or more of the characteristics of the various methods described above with reference to method 1000. For brevity, these details are not repeated below.

It should be understood that the particular order in which the operations in FIG. 10 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may be incorporated with one another. Thus, the techniques described with respect to method 1000 may be relevant to method 700 (FIG. 7), method 900 (FIG. 9), method 1200 (FIG. 12), method 1400 (FIG. 14A), method 1420 (FIG. 14B), and method 1600 (FIG. 16).

Figure 11:
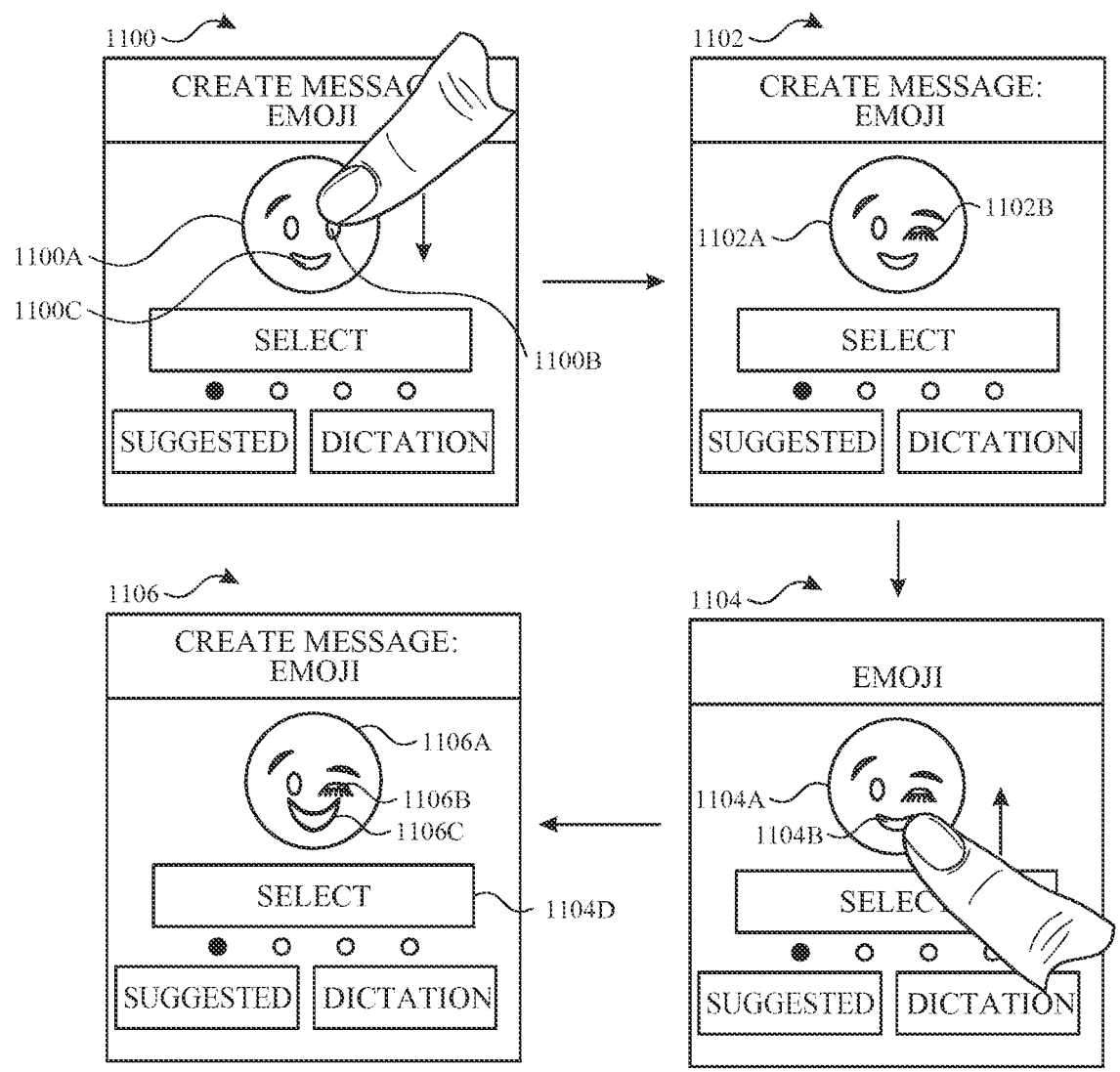
FIG. 11 illustrates exemplary user interfaces for manipulating an emoji graphical object in accordance with some embodiments.

FIG. 11 illustrates exemplary user interfaces for manipulating an emoji prior to sending the emoji to a recipient in accordance with some embodiments. In some embodiments, the electronic device is device 500. The electronic device has a display (e.g., 112, 340, 504). The electronic device may also include a touch-sensitive surface (e.g., 112, 355, 504) and a rotatable input mechanism (e.g., 506). A user may wish to express an emotion or provide a simple message (e.g., I'm happy or unhappy, yes or no) to a recipient. It may be difficult for the user to quickly and efficiently provide textual information to express the emotion or provide the message. Thus, it may be helpful to display an interactive emoji, which the user can manipulate to express the emotion or message. The manipulated emoji may then be sent to a recipient.

The device receives a user input. The user input may be associated with a messaging input interface. In response to receiving the user input, the device displays an emoji graphical object (e.g., 1100A), as illustrated in user interface screen 1100. The emoji graphical object 1100A includes several visual aspects, such as eyebrows, a right eye, a left eye 1100B, and a mouth 1100C.

At user interface 1100, the device receives a first user input associated with the emoji graphical object. For example, the device receives a swipe on the touch-sensitive surface or a rotation of the rotatable input mechanism. In the example of user interface 1100, the device receives a swipe down gesture on the left eye 1100B. In response to receiving the first user input associated with the emoji graphical object (e.g., the swipe down gesture on the left eye 1100B), the device changes a first visual aspect of the emoji graphical object. The change in the first visual aspect is based on the first user input (e.g., the swipe down gesture on the left eye 1100B causes the left eye to close or enter a winking state, as illustrated in user interface screen 1102). Thus, the user input on the left eye 1100B causes the left eye of emoji graphical object 1102A to become a closed or winking eye 1102B, as illustrated in user interface screen 1102.

In some embodiments, a touch gesture on the display may be used to change a particular visual aspect of the emoji graphical object. For example, when the device receives a smile touch gesture (e.g., a touch gesture in a "U" shape) at user interface screen 1100, the device changes the mouth 1100C of the emoji graphical object to indicate a smile. When the device receives a frown touch gesture (e.g., a touch gesture in an upside-down "U" shape), the device changes the mouth 1100C of the emoji graphical object to indicate a frown. The smile touch gesture and the frown touch gesture do not need to be at the location of the mouth 1100C. This allows the user to quickly modify a visual aspect of the emoji graphical object without requiring a high degree of precision of the location of the touch gesture. As will be understood, other gestures, such as tapping, may be used to change the emoji elements. For example, repeatedly tapping the same element can change it through various states.

The device receives recipient information (e.g., the user enters an email or iMessage® recipient). Once the user has manipulated the emoji graphical object to their liking and has provided the recipient information, the user can request that the emoji graphical object be sent to a recipient. The device transmits the emoji graphical object, including the changed first visual aspect, to a recipient associated with the received recipient information (e.g., send the altered emoji as a message).

In accordance with some embodiments, the device receives a second user input associated with the emoji graphical object (e.g., swipe/drag on the touch-sensitive surface or rotation of a rotatable input mechanism). In response to receiving the second user input associated with the emoji graphical object, the device changes (e.g. by animating the change) a second visual aspect of the emoji graphical object. The change in the second visual aspect is based on the second user input (e.g., a swipe up on a corner of a smiley's mouth make the smiley more happy). In accordance with some embodiments, the first visual aspect and the second visual aspect are different.

For example, at user interface screen 1104, a swipe up on a smiley's mouth 1104B (or a corner of a smiley's mouth) may make the smiley 1104A appear happier, as illustrated by mouth 1106C of user interface screen 1106. Note that the closed/winking eye 1106B of smiley 1106A persists, meaning that multiple visual aspects can be changed. Similarly, a swipe down on the mouth may make the smiley appear sadder. In some examples, different degrees of an up or down swipe cause the emoji graphical object to have correspondingly different degrees of a happy or sad mouth. Thus, the user can manipulate different visual aspects of the emoji graphical object by providing user input, prior to sending the emoji graphical object to the recipient.

In accordance with some embodiments, the electronic device includes a touch-sensitive surface, and the first user input associated with the emoji graphical object comprises a touch gesture at a location on the touch-sensitive surface associated with the first visual aspect of the emoji graphical object (e.g., the user performs a drag, swipe, or tap on the eye of the emoji).

In accordance with some embodiments, the electronic device includes a touch-sensitive surface configured to detect intensity of touches. The first user input associated with the emoji graphical object comprises a touch gesture having a characteristic intensity (e.g., the user tap has an intensity; hard press, light touch or a resting contact). In response to receiving the first user input and in accordance with a determination that the characteristic intensity exceeds an intensity threshold (e.g., the touch gesture is a hard press), the device changes the first visual aspect of the emoji graphical object comprises changing a first feature of the emoji graphical object (e.g., changing the size or color of the emoji).

In accordance with some embodiments, in response to receiving the first user input and in accordance with a determination that the characteristic intensity does not exceed the intensity threshold (e.g., the touch gesture is not a hard press), changing the first visual aspect of the emoji graphical object comprises changing a second feature of the emoji graphical object different than the first feature (e.g., changing the expression or orientation of the emoji). Thus, a touch gesture can change different features of the emoji graphical object based on the characteristic intensity of the touch.

In accordance with some embodiments, the electronic device includes a rotatable input mechanism. The first user input associated with the emoji graphical object comprises a rotation of the rotatable input mechanism (e.g., rotates the rotatable input mechanism to change the shape of the eye).

In accordance with some embodiments, at the electronic device includes a touch-sensitive surface and a rotatable input mechanism. The first user input associated with the emoji graphical object comprises a touch gesture at a location on the touch-sensitive surface associated with the first visual aspect of the emoji graphical object and a rotation of the rotatable input mechanism (e.g., the user taps or taps and holds on the eye of the emoji to identify the feature to change and rotates the rotatable input mechanism to cause the change of the identified feature).

In accordance with some embodiments, transmitting the emoji graphical object comprises transmitting the emoji graphical object in response to receiving a third user input associated with a selection affordance (e.g., the third user input, when activated, causes the emoji to be sent).

In accordance with some embodiments, prior to transmitting the emoji graphical object, the device adds the emoji graphical object to a message body in response to receiving a fourth user input (e.g., the fourth user input is associated with a selection affordance 1104D, which when activated, causes the emoji to be added to the body of a text message or email message).

In accordance with some embodiments, the emoji graphical object is an animated emoji graphical object (e.g., the emoji winks and/or the tongue of the emoji flops around). In accordance with some embodiments, changing the first visual aspect of the emoji graphical object comprises animating a change in the first visual aspect of the emoji graphical object (e.g., a swipe up on a corner of a smiley's mouth causes the mouth to get bigger/more happy). In some embodiments, the transmitted emoji can include additional information, such as the order in which the elements were changed, so that the emoji may be animated in the same fashion at the recipient device.

FIG. 12 is a flow diagram illustrating method 1200 for manipulating an emoji prior to sending the emoji to a recipient in accordance with some embodiments. In some embodiments, method 1200 may be performed at an electronic device with a display (e.g., 112, 340, 504). The electronic device may also include a touch-sensitive surface (e.g., 112, 355, 504) and a rotatable input mechanism (e.g., 506). In some embodiments, the touch-sensitive surface (e.g., 112, 355, 504) is capable of detecting intensity of touch contacts. In some embodiments, method 1200 may be performed at an electronic device with a touch-sensitive surface (e.g., 112, 355, 504) that is able to determine a substitute (proxy) for the force or pressure of a contact on the touch-sensitive surface. Exemplary devices that may perform method 1200 include devices 100, 300, and 500 (FIGS. 1A, 3, and 5A). Some operations in method 1200 may be combined, the order of some operations may be changed, and some operations may be omitted.

A user may wish to express an emotion or provide a simple message (e.g., I'm happy or unhappy, yes or no) to a recipient. It may be difficult for the user to quickly and efficiently provide textual information to express the emotion or provide the message. Thus, it may be helpful to display an interactive emoji, which the user can manipulate to express the emotion or message. The manipulated emoji may then be sent to a recipient. Method 1200 provides an intuitive way to manipulate the emoji based on user input. The method reduces the cognitive burden on a user preparing a message using a device, thereby creating a more efficient human-machine interface. For battery-operated computing devices, enabling a user to prepare a message faster and more efficiently conserves power and increases the time between battery charges.

At block 1202, a user input is received. At block 1204, in response to receiving the user input, an emoji graphical object (e.g., 1100A) is displayed. At block 1206, a first user input associated with the emoji graphical object (e.g., 1100A) is received.

At block 1208, in response to receiving the first user input associated with the emoji graphical object (e.g., 1100A), a first visual aspect (e.g., 1102B) of the emoji graphical object (e.g., 1102A) is changed. The change in the first visual aspect (e.g., 1102B) is based on the first user input.

At block 1210, recipient information is received. At block 1212, the emoji graphical object is transmitted, including the changed first visual aspect (e.g., 1102B), to a recipient associated with the received recipient information.

In accordance with some embodiments, a second user input associated with the emoji graphical object (e.g., 1104A) is received (e.g., swipe/drag on the touch-sensitive surface or rotation of a rotatable input mechanism). In response to receiving the second user input associated with the emoji graphical object (e.g., 1104A), a second visual aspect (e.g., 1104B) of the emoji graphical object is changed (e.g., 1106C). The change in the second visual aspect (e.g., 1106C) is based on the second user input (e.g., a swipe up on a corner of a smiley's mouth make the smiley more happy). In accordance with some embodiments, the first visual aspect (e.g., 1100B, 1102B, 1106B) and the second visual aspect (e.g., 1100C, 1104B, 1106C) are different.

In accordance with some embodiments, at the electronic device with a touch-sensitive surface, the first user input associated with the emoji graphical object (e.g., 1100A) comprises a touch gesture at a location on the touch-sensitive surface associated with the first visual aspect (e.g., 1100B) of the emoji graphical object (e.g., the user performs a drag, swipe, or tap on the eye of the emoji).

In accordance with some embodiments, at the electronic device with a touch-sensitive surface configured to detect intensity of touches, the first user input associated with the emoji graphical object comprises a touch gesture having a characteristic intensity (e.g., the user tap has an intensity; hard press, light touch or resting contact). In response to receiving the first user input and in accordance with a determination that the characteristic intensity exceeds an intensity threshold (e.g., the touch gesture is a hard press), changing the first visual aspect of the emoji graphical object comprises changing a first feature of the emoji graphical object (e.g., changing the size or color of the emoji, such as making the smiley face transition from yellow to red to indicate being mad or upset).

In accordance with some embodiments, in response to receiving the first user input and in accordance with a determination that the characteristic intensity does not exceed the intensity threshold (e.g., the touch gesture is not a hard press), changing the first visual aspect of the emoji graphical object comprises changing a second feature of the emoji graphical object different than the first feature (e.g., changing the expression or orientation of the emoji).

In accordance with some embodiments, at the electronic device with a rotatable input mechanism, the first user input associated with the emoji graphical object comprises a rotation of the rotatable input mechanism (e.g., the user rotates the rotatable input mechanism to change the shape of the eye).

In accordance with some embodiments, at the electronic device with a touch-sensitive surface and a rotatable input mechanism, the first user input associated with the emoji graphical object comprises a touch gesture at a location on the touch-sensitive surface associated with the first visual aspect of the emoji graphical object and a rotation of the rotatable input mechanism (e.g., the user taps or taps and holds on the eye of the emoji to identify the feature to change and rotates the rotatable input mechanism to cause the change of the identified feature). In some embodiments, the touch gesture and the rotation are received fully or at least partially concurrently.

In accordance with some embodiments, transmitting the emoji graphical object (e.g., 1106A) comprises transmitting the emoji graphical object (e.g., 1106A) in response to receiving a third user input associated with a selection affordance (e.g., the third user input is a send affordance).

In accordance with some embodiments, prior to transmitting the emoji graphical object (e.g., 1106A), the emoji graphical object is added to a message body in response to receiving a fourth user input (e.g., 1104D; the fourth user input is associated with a selection affordance; the emoji is added to the body of a text message or email message).

In accordance with some embodiments, the emoji graphical object (e.g., 1100A, 1102A, 1104A, 1106A) is an animated emoji graphical object (e.g., the emoji winks, the tongue of the emoji flops around). In accordance with some embodiments, changing the first visual aspect of the emoji graphical object comprises animating a change in the first visual aspect (e.g., 1100B, 1102B, 1104B, 1106C) of the emoji graphical object (e.g., a swipe up on a corner of a smiley's mouth causes the mouth to animate into a bigger/more happy).

Note that details of the processes described above with respect to method 1200 (FIG. 12) are also applicable in an analogous manner to the methods described above and below. For example, method 700 (FIG. 7), method 900 (FIG. 9), method 1000 (FIG. 10), method 1400 (FIG. 14A), method 1420 (FIG. 14B), and method 1600 (FIG. 16) may include one or more of the characteristics of the various methods described above with reference to method 1200. For brevity, these details are not repeated below.

It should be understood that the particular order in which the operations in FIG. 12 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may be incorporated with one another. Thus, the techniques described with respect to method 1200 may be relevant to method 700 (FIG. 7), method 900 (FIG. 9), method 1000

(FIG. 10), method 1400 (FIG. 14A), method 1420 (FIG. 14B), and method 1600 (FIG. 16).

Figure 13:
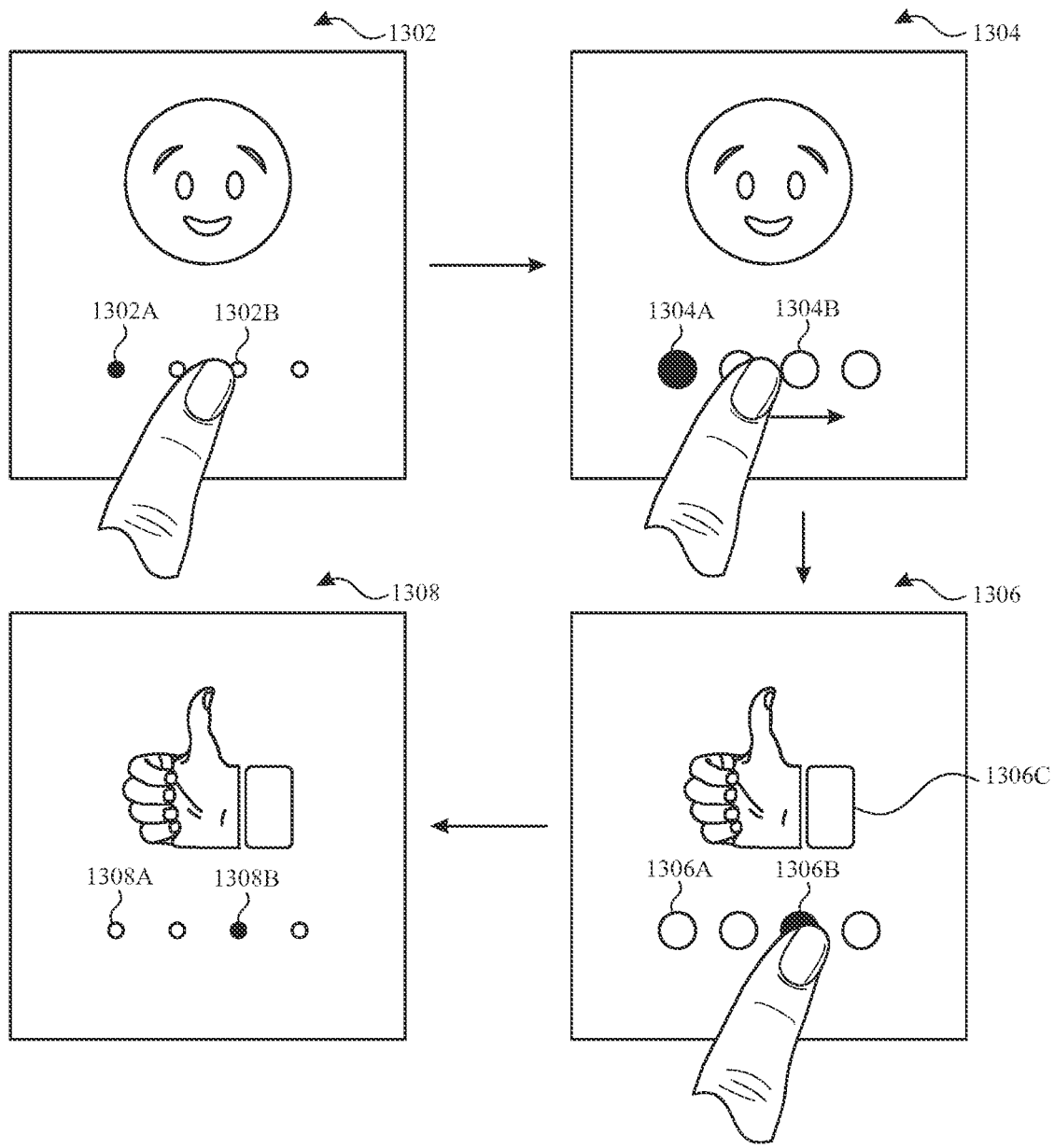
FIG. 13 illustrates exemplary user interfaces for transitioning between various pages in accordance with some embodiments.

FIG. 13 illustrates exemplary user interfaces for transitioning between various pages in accordance with some embodiments. In some embodiments, the electronic device is device 500. The electronic device has a display (e.g., 112, 340, 504) and a touch-sensitive surface (e.g., 112, 355, 504). The device may also have a rotatable input mechanism (e.g., 506). A user may wish to quickly switch between non-sequential pages of a user interface of the device. Switching between pages, however, may require navigating a complex structure of menus or typing in the page number of the desired page. This is time consuming and not efficient. Thus, it may be helpful to provide a technique that allows a user to precisely, quickly, and efficiently navigate between pages of a user interface. Precise, quick, and efficient techniques are now described.

At user interface 1302, the device displays a first page of a user interface (e.g., the smiley page depicted in user interface screen 1302) and a first set of paging affordances (e.g., paging affordances 1302A and 1302B). The first set of paging affordances (e.g., 1302A-B) comprises a first paging affordance (e.g., 1302A) that includes a focus selector (e.g., the paging dot 1302A is filled in). The first paging affordance (e.g., 1302) corresponds to the first page of the user interface (e.g., paging dot 1302 corresponds to the currently displayed smiley page of user interface screen 1302). In this example, the user interface has four pages, as illustrated by the four paging dots.

The device receives a user touch at a first location on the touch-sensitive surface, as illustrated in user interface screen 1302. The first location is associated with the first set of paging affordances (e.g., the touch is on top of the first set of paging affordances 1302A-B). In some examples, the touch exceeds a threshold duration.

In response to receiving the user touch at the first location, the device replaces display of the first set of paging affordances (e.g., 1302A-B) with display of a second set of paging affordances (e.g., 1304A-B), as illustrated in user interface screen 1304. For example, the device displays a larger set of paging dots or enlarges the existing set of paging dots. The second set of paging affordances (e.g., 1304A-B) comprises a second paging affordance (e.g., 1304B) that corresponds to a second page of the user interface (e.g., the second paging affordance 1304B does not correspond to the currently displayed smiley page illustrated in user interface screens 1302 and 1304, but rather to a different page). In this example, paging dot 1304A is an enlarged version of paging dot 1302A, both of which correspond to the first page of the user interface (e.g., the smiley page). At user interface screen 1304, the second paging affordance 1304B does not include a focus selector (e.g., the paging dot is not filled in).

While continuing to receive the user touch, the device detects movement of the user touch from the first location to a second location on the touch-sensitive surface without a break in contact of the user touch on the touch-sensitive surface (e.g., the user moves their finger without lifting their finger off the touch-sensitive surface), as illustrated in user interface screen 1306. The second location is associated with the second paging affordance (e.g., the finger is now at the location of paging dot 1304B, 1306B). For example, the user slides their finger over the second paging affordance (e.g., 1304B, 1306B) or user slides finger over the second paging affordance and lifts finger.

In response to detecting the user touch at the second location (e.g., at the location of paging dot 1306B), the device displays the second page of the user interface (e.g., the thumbs up page including a thumbs up emoji object 1306C). Thus, the user places their finger on paging affordances, the paging affordances get larger and/or move to a new location to allow the user to more easily see the paging affordances and so that that enlarged paging affordances are not covered by the users touch. When the user selects a paging affordance by moving their finger to that paging affordance, the page corresponding to the selecting paging affordance is displayed.

In accordance with some embodiments, the device detects a lift-off of the user touch from the touch-sensitive surface (e.g., the user breaks contact with the touch-sensitive surface) at the second location (e.g., after the user slides their finger over the second paging affordance, the user lifts their finger). In response to detecting the lift-off of the user touch at the second location, the device maintains display of the second page of the user interface. Thus, once the desired page of the user interface is displayed, the user can remove their finger from the touch-sensitive surface to continue accessing the desired page.

In accordance with some embodiments, while continuing to receive the user touch, detecting a characteristic intensity (e.g., maximum intensity) of the user touch at the second location on the touch-sensitive surface and detecting a subsequent lift-off of the user touch from the touch-sensitive surface (e.g., the user slides their finger over the second paging affordance or the user slides their finger over the second paging affordance and lifts finger). In accordance with a determination that the characteristic intensity exceeds an intensity threshold (e.g., the user performed a hard press at the second location), maintaining display of the second page of the user interface (e.g., maintaining display of the second page subsequent to the lift-off of the user touch if the user has committed to the page using a hard press). Thus, the user has performed a hard press to commit to a particular page.

In accordance with some embodiments, in accordance with a determination that the characteristic intensity does not exceed the intensity threshold (e.g., it was not a hard press), the device replaces display of the second page of the user interface (e.g., the thumbs up page) with display of the first page of the user interface (e.g., the smiley page). In this example, the device determines that the movement of the finger was for a preview request. Because the user did not commit to the page by performing a hard press, the device replaces the second page with the originally displayed first page after the user has lifted their finger off the touch-sensitive surface.

In accordance with some embodiments, in response to detecting the user touch at the second location, the device updates the second paging affordance 1306B to include a focus selector (e.g., the second paging dot 1306B is filled in), as illustrated in user interface screen 1306.

In accordance with some embodiments, displaying the second page of the user interface comprises replacing display of the first page of the user interface with display of the second page of the user interface. Thus, the smiley page of user interface screens 1302 and 1304 is replaced with the thumbs up page of user interface screens 1306 and 1308. In accordance with some embodiments, the first page of the user interface and the second page of the user interface are different.

In accordance with some embodiments, displaying the second set of paging affordances comprises displaying an enlarged version of the first set of paging affordances.

In accordance with some embodiments, displaying the second set of paging affordances comprises an animation of the first set of paging affordances enlarging (e.g., display of the second set of paging affordances result from the first set of paging affordances getting bigger). In other examples, display of the second set of paging affordances result from a translation of the first set of paging affordances (e.g., the first set of paging dots move to a different location on the display).

In accordance with some embodiments, each paging affordance in the second set of paging affordances is associated with a corresponding page of the user interface.

In another embodiment, at user interface 1302, the device displays a first page (e.g., the smiley page depicted in user interface screen 1302), of a plurality of pages, of a user interface and a first set of paging affordances (e.g., 1302A-1302B). The first set of paging affordances comprises a first paging affordance (e.g., 1302A) that includes a focus selector (e.g., is filled in). The first paging affordance (e.g., 1302A) corresponds to the first page of the user interface (e.g., the smiley page illustrated in user interface screens 1302 and 1304).

The device receives a user touch at a first location on the touch-sensitive surface, the first location corresponding to the first set of paging affordances (e.g., the user touches and holds at the paging affordances 1302A-B, as illustrated in user interface screen 1302). In response to receiving the user touch at the first location, the device replaces display of the first set of paging affordances (e.g., 1302A-B) with display of a second set of paging affordances (e.g., 1304A-B), wherein the second set of paging affordances (e.g., 1304A-1304B) comprises a first paging affordance (e.g., 1304A) that includes a focus selector (e.g., is filled in), and wherein the first paging affordance (e.g., 1304A) corresponds to the first page of the user interface (e.g., the smiley page illustrated in user interface screens 1302 and 1304).

While continuing to receive the user touch, the device detects movement of the user touch from the first location to a second location on the touch-sensitive surface without breaking contact with the touch-sensitive surface, wherein the second location is associated with the second paging affordance. In response to detecting the user touch at the second location, the device replaces display if the first page (e.g., the smiley page) with a second page (e.g., the thumbs up page) of the plurality of pages, and updates the second set of paging affordances (e.g., updated affordances 1304A-1304B to affordances 1306A-1306B), wherein the updating comprises removing the focus selector from the first paging affordance of the set (e.g., removing the filled in portion of 1304A) and displaying a second paging affordance of the set of paging affordances with the focus selector (e.g., 1306B is filled in).

In accordance with some embodiments, the device detects a lift-off of the user touch from the touch-sensitive surface (e.g., the user breaks contact with the touch-sensitive surface) at the second location (e.g., after the user slides their finger over the second paging affordance, the user lifts their finger). In response to detecting the lift-off of the user touch at the second location, the device maintains display of the second page of the user interface. Thus, once the desired page of the user interface is displayed, the user can remove their finger from the touch-sensitive surface to continue accessing the desired page. This technique does not provide a preview mode.

In accordance with some embodiments, while continuing to receive the user touch, detecting a characteristic intensity (e.g., maximum intensity) of the user touch at the second location on the touch-sensitive surface and detecting a subsequent lift-off of the user touch from the touch-sensitive surface (e.g., the user slides their finger over the second paging affordance or the user slides their finger over the second paging affordance and lifts finger). In accordance with a determination that the characteristic intensity exceeds an intensity threshold (e.g., the user performed a hard press at the second location), maintaining display of the second page of the user interface (e.g., maintaining display of the second page subsequent to the lift-off of the user touch if the user has committed to the page using a hard press). Thus, the user has performed a hard press to commit to a particular page.

In accordance with some embodiments, the first page of the user interface and the second page of the user interface are different. In accordance with some embodiments, displaying the second set of paging affordances comprises displaying an enlarged version of the first set of paging affordances.

In accordance with some embodiments, displaying the second set of paging affordances comprises an animation of the first set of paging affordances enlarging (e.g., display of the second set of paging affordances result from the first set of paging affordances getting bigger). In other examples, display of the second set of paging affordances result from a translation of the first set of paging affordances (e.g., the first set of paging dots move to a different location on the display).

In accordance with some embodiments, each paging affordance in the second set of paging affordances is associated with a corresponding page of the user interface.

FIGS. 14A-B are flow diagrams illustrating methods 1400 and 1420 for transitioning between various pages in accordance with some embodiments. In some embodiments, methods 1400 and 1420 may be performed at an electronic device with a display (e.g., 112, 340, 504) and a touch-sensitive surface (e.g., 112, 355, 504). The electronic device may also include a rotatable input mechanism (e.g., 506). In some embodiments, the touch-sensitive surface (e.g., 112, 355, 504) is capable of detecting intensity of touch contacts. In some embodiments, methods 1400 and 1420 may be performed at an electronic device with a touch-sensitive surface (e.g., 112, 355, 504) that is able to determine a substitute (proxy) for the force or pressure of a contact on the touch-sensitive surface. Exemplary devices that may perform methods 1400 and 1420 include devices 100, 300, and 500 (FIGS. 1A, 3, and 5A). Some operations in methods 1400 may be combined, the order of some operations may be changed, and some operations may be omitted. Some operations in methods 1420 may be combined, the order of some operations may be changed, and some operations may be omitted.

A user may wish to quickly switch between non-sequential pages of a user interface of the device. Switching between pages, however, may require navigating a complex structure of menus or typing in the page number of the desired page. This is time consuming and not efficient. Thus, it may be helpful to provide a technique that allows a user to precisely, quickly, and efficiently navigate between pages of a user interface with fewer gestures or keystrokes. Precise, quick, and efficient techniques are now described.

Methods 1400 and 1420 provide intuitive ways to transition between various pages of a user interface. The method reduces the cognitive burden on a user transitioning between pages on a device, thereby creating a more efficient human-machine interface. For battery-operated computing devices, enabling a user to transition between pages faster and more efficiently conserves power and increases the time between battery charges.

FIG. 14A is a flow diagram illustrating method 1400 for transitioning between various pages in accordance with some embodiments. At block 1402, a first page of a user interface (e.g., the smiley page of user interface screen 1302) and a first set of paging affordances (e.g., 1302A-1302B), wherein the first set of paging affordances comprises a first paging affordance (e.g., 1302A) that includes a focus selector, and wherein the first paging affordance (e.g., 1302A) corresponds to the first page of the user interface (e.g., the smiley page of user interface screen 1302).

At block 1404, a user touch is received at a first location on the touch-sensitive surface, wherein the first location is associated with the first set of paging affordances (e.g., as illustrated in user interface screen 1302).

At block 1406, in response to receiving the user touch at the first location, display of the first set of paging affordances (e.g., 1302A-1302B) is replaced with display of a second set of paging affordances (e.g., 1304A-1304B; display a larger set of paging dots or enlarge the existing set of paging dots), wherein the second set of paging affordances (e.g., 1304A-1304B) comprises a second paging affordance (e.g., 1304B) that corresponds to a second page of the user interface (e.g., 1304B corresponds to a thumbs up page).

At block 1408, while continuing to receive the user touch, movement is detected of the user touch from the first location to a second location on the touch-sensitive surface without a break in contact of the user touch on the touch-sensitive surface (e.g., the user does not lift their finger off the touch-sensitive surface), wherein the second location is associated with the second paging affordance (e.g., the user slides their finger over the second paging affordance 1306B or user slides their finger over the second paging affordance 1306B and lifts their finger).

At block 1410, in response to detecting the user touch at the second location, the second page of the user interface is displayed (e.g., the thumbs up page illustrated in user interface screen 1306 and 1308).

In accordance with some embodiments, a lift-off of the user touch is detected from the touch-sensitive surface (e.g., the user breaks contact with the touch-sensitive surface) at the second location (e.g., the user slides finger over the second paging affordance and lifts finger). In response to detecting the lift-off of the user touch at the second location, display of the second page of the user interface is maintained (e.g., maintaining display of the second page subsequent to the lift-off of the user touch).

In accordance with some embodiments, while continuing to receive the user touch, a characteristic intensity of the user touch is detected at the second location on the touch-sensitive surface and a subsequent lift-off of the user touch is detected from the touch-sensitive surface (e.g., the user slides finger over the second paging affordance or user slides finger over the second paging affordance and lifts finger). In accordance with a determination that the characteristic intensity exceeds an intensity threshold (e.g. user performed a hard press), display is maintained of the second page of the user interface (e.g., maintaining display of the second page subsequent to the lift-off of the user touch if the user has committed to the page using a hard press).

In accordance with some embodiments, in accordance with a determination that the characteristic intensity does not exceed the intensity threshold (e.g., not a hard press), display of the second page of the user interface is replaced with display of the first page of the user interface (e.g., this was a preview request, replace the second page with the originally displayed first page).

In accordance with some embodiments, in response to detecting the user touch at the second location, the second paging affordance is updated to include a focus selector (e.g., the second paging affordance becomes filled in).

In accordance with some embodiments, displaying the second page of the user interface comprises replacing display of the first page of the user interface with display of the second page of the user interface.

In accordance with some embodiments, displaying the second set of paging affordances comprises displaying an enlarged version of the first set of paging affordances.

In accordance with some embodiments, the first page of the user interface and the second page of the user interface are different.

In accordance with some embodiments, displaying the second set of paging affordances comprises an animation of the first set of paging affordances enlarging (e.g., display of the second set of paging affordances result from the first set of paging affordances getting bigger). In other examples, display of the second set of paging affordances result from a translation of the first set of paging affordances (e.g., the first set of paging dots move to a different location on the display).

In accordance with some embodiments, each paging affordance in the second set of paging affordances is associated with a corresponding page of the user interface.

FIG. 14B is a flow diagram illustrating method 1420 for transitioning between various pages in accordance with some embodiments. At block 1422, a first page (e.g., the smiley page depicted in user interface screen 1302), of a plurality of pages, of a user interface and a first set of paging affordances (e.g., 1302A-1302B) are displayed. The first set of paging affordances comprises a first paging affordance (e.g., 1302A) that includes a focus selector (e.g., is filled in). The first paging affordance (e.g., 1302A) corresponds to the first page of the user interface (e.g., the smiley page illustrated in user interface screens 1302 and 1304).

At block 424, a user touch is received at a first location on the touch-sensitive surface, the first location corresponding to the first set of paging affordances (e.g., the user touches and holds at the paging affordances 1302A-B, as illustrated in user interface screen 1302).

At block 1426, in response to receiving the user touch at the first location, display of the first set of paging affordances (e.g., 1302A-1302B) is replaced with display of a second set of paging affordances (e.g., 1304A-1304B), wherein the second set of paging affordances (e.g., 1304A-B) comprises a first paging affordance (e.g., 1304A) that includes a focus selector (e.g., is filled in), and wherein the first paging affordance (e.g., 1304A) corresponds to the first page of the user interface (e.g., the smiley page illustrated in user interface screens 1302 and 1304).

At block 1428, while continuing to receive the user touch, movement is detected of the user touch from the first location to a second location on the touch-sensitive surface without breaking contact with the touch-sensitive surface, wherein the second location is associated with the second paging affordance.

At block 1430, in response to detecting the user touch at the second location, blocks 1432 and 1434 are performed. At block 1432, display if the first page (e.g., the smiley page) is replaced with a second page (e.g., the thumbs up page) of the plurality of pages. At block 1434, the second set of paging affordances (e.g., updated affordances 1304A-1304B to affordances 1306A-1306B) is updated, wherein the updating comprises removing the focus selector from the first paging affordance of the set (e.g., removing the filled in portion of 1304A) and displaying a second paging affordance of the set of paging affordances with the focus selector (e.g., 1306B is filled in).

In accordance with some embodiments, a lift-off of the user touch is detected from the touch-sensitive surface (e.g., the user breaks contact with the touch-sensitive surface) at the second location (e.g., the user slides finger over the second paging affordance and lifts finger). In response to detecting the lift-off of the user touch at the second location, display of the second page of the user interface is maintained (e.g., maintaining display of the second page subsequent to the lift-off of the user touch).

In accordance with some embodiments, while continuing to receive the user touch, a characteristic intensity of the user touch is detected at the second location on the touch-sensitive surface and a subsequent lift-off of the user touch is detected from the touch-sensitive surface (e.g., the user slides finger over the second paging affordance or user slides finger over the second paging affordance and lifts finger). In accordance with a determination that the characteristic intensity exceeds an intensity threshold (e.g. user performed a hard press), display is maintained of the second page of the user interface (e.g., maintaining display of the second page subsequent to the lift-off of the user touch if the user has committed to the page using a hard press).

In accordance with some embodiments, displaying the second set of paging affordances comprises displaying an enlarged version of the first set of paging affordances.

In accordance with some embodiments, the first page of the user interface and the second page of the user interface are different.

In accordance with some embodiments, displaying the second set of paging affordances comprises an animation of the first set of paging affordances enlarging (e.g., display of the second set of paging affordances result from the first set of paging affordances getting bigger). In other examples, display of the second set of paging affordances result from a translation of the first set of paging affordances (e.g., the first set of paging dots move to a different location on the display).

In accordance with some embodiments, each paging affordance in the second set of paging affordances is associated with a corresponding page of the user interface.

Note that details of the processes described above with respect to methods 1400 and 1420 (FIGS. 14A-14B) are also applicable in an analogous manner to the methods described above and below. For example, method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may include one or more of the characteristics of the various methods described above with reference to methods 1400 and 1420. For brevity, these details are not repeated below.

It should be understood that the particular order in which the operations in FIGS. 14A-14B have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may be incorporated with one another. Thus, the techniques described with respect to method 1400 and 1420 may be relevant to method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16).

Figure 15A:
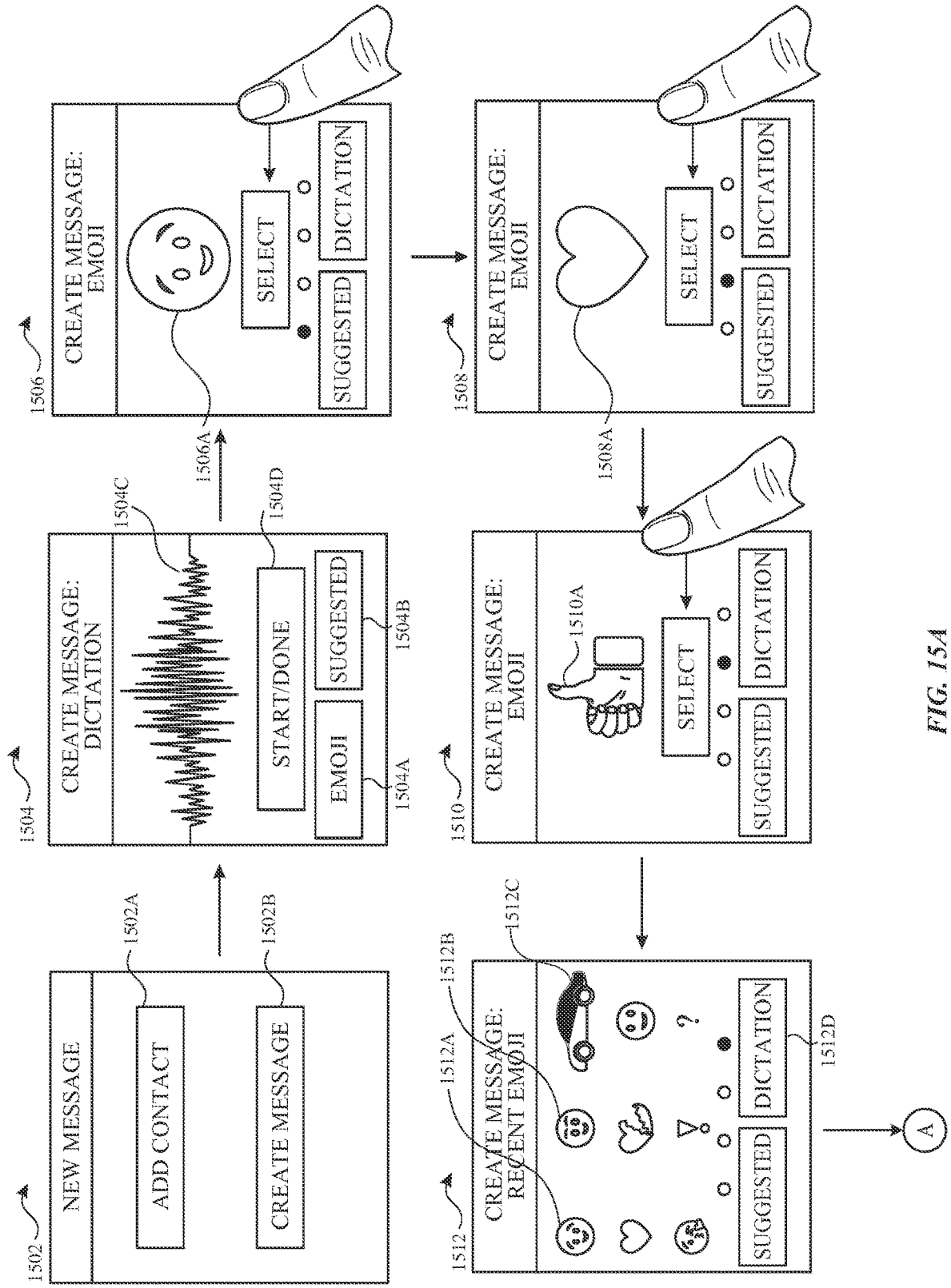
FIGS. 15A-15B illustrate exemplary user interfaces for receiving user input in accordance with some embodiments.
Figure 15B:
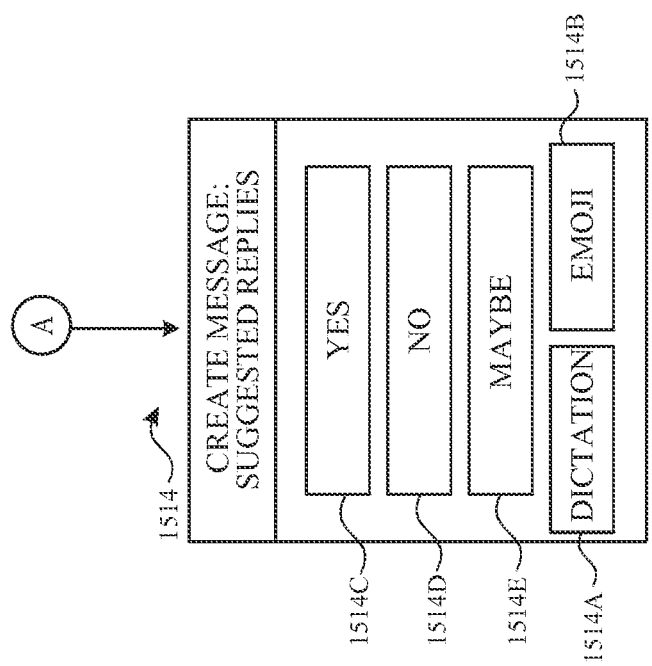

FIGS. 15A-15B illustrate exemplary user interfaces for receiving user input using an electronic device, in accordance with some embodiments. In some embodiments, the electronic device is device 500. In some embodiments, the electronic device has a display (e.g., 112, 340, 504), a touch-sensitive surface (e.g., 112, 355, 504), and a rotatable input mechanism (e.g., 506).

A user may wish to select from among different user interfaces for entering a message body or reply, such as in an iMessage®, SMS, or electronic mail message. Switching among the various user interfaces, however, may require navigating a complex structure of menus. This is time consuming and not efficient. Thus, it may be helpful to provide a method that allows a user to precisely, quickly, and efficiently switch among various user interfaces. Precise, quick, and efficient techniques are now described.

In accordance with some embodiments, as illustrated in user interface screen 1502, the device displays an add contact affordance 1502A (e.g., to add a contact to a new or existing message) and a create message affordance 1502B (e.g., to add content to a new or existing message).

The device receives a first user input (e.g., (1) the user taps on create message affordance 1502 or (2) the user is already in the create message interface and taps on a dictation affordance). In response to receiving the first user input, the device displays, on the display, a dictation user interface, as illustrated in user interface screen 1504. The dictation user interface may include a waveform 1504C (e.g., the position of the waveform 1504C is such that it appears to emanate from a physical button of the device) and an affordance 1504D for starting and ending a dictation mode. User interface screen 1504 also includes an emoji affordance 1504A, which, when activated, causes display of an emoji user interface, and a suggested responses affordance 1504B, which, when activated, causes display of a suggested responses user interface.

The device receives a second user input (e.g., user taps on emoji affordance 1504A). In response to receiving the second user input, the device replaces display of the dictation user interface (e.g., as illustrated in user interface screen 1504) with display of a first emoji graphical object (e.g., smiley 1506A of an emoji user interface illustrated in user interface screen 1506). User interface screen 1506 also includes the suggested responses affordance, which, when activated, causes display of an emoji user interface, and a dictation affordance, which, when activated, causes display of the dictation user interface.

At user interface screen 1506, the device receives a first user swipe gesture input at a location on the touch-sensitive surface associated with the first emoji graphical object (e.g., the user swipes to the next emoji page; a swipe left gesture). In response to receiving the first user swipe gesture input, the device replaces display of the first emoji graphical object (e.g., the smiley 1506A) with display of a second emoji graphical object (e.g., the heart 1508A), as illustrated in user interface screen 1508.

In some examples, one or more additional swipes result in displaying additional emoji graphical objects, prior to arriving at a set of recently accessed emoji graphical objects. In some examples, an additional swipe results in results in arriving at the set of recently accessed emoji graphical objects. In particular, the device receives a second user swipe gesture input at the touch-sensitive surface (e.g., user swipes to get to recent emoji; swipe can be on second emoji graphical object (heart) or third emoji graphical object (thumbs up/down)). In response to receiving the second user swipe gesture input, the device displays (e.g., by replacing display of the second or third emoji graphical object) a set of recently accessed emoji graphical objects 1512A-1512C (e.g., the emoji recents list), as illustrated in user interface screen 1512.

In accordance with some embodiments, the set of recently accessed emoji graphical objects 1512A-1512C comprises: one or more (or a plurality of) emoji graphical objects (e.g., 1512A, 1512B, 1512C), wherein the one or more emoji graphical objects are selected based on (and in some examples, a predetermined number of) emoji graphical objects recently accessed by an external electronic device (e.g., a device other than the electronic device displaying the user interface screens described above; the external electronic device may be the user's phone). Thus, the user's phone (the external electronic device) may be wirelessly linked with the electronic device. The user sends messages, such as iMessages® and electronic mail messages, using the external electronic device, which include emoji graphical objects. The electronic device receives information (e.g., directly from the external electronic device or indirectly) that identifies (a predetermined number of) the emoji graphical objects most recently sent by the external electronic device and displays them in the recent emoji view, such as illustrated in user interface screen 1512.

In accordance with some embodiments, the set of recently accessed emoji graphical objects (e.g., 1512A-1512C) comprises: one or more (or a plurality of) visually manipulatable emoji graphical objects (e.g., emojis that can be manipulated to change their visual appearance), wherein the one or more visually manipulatable emoji graphical objects are selected based on (e.g., a predetermined number of) visually manipulatable emoji graphical objects recently accessed by a wirelessly linked external electronic device (e.g., the user's phone). Thus, the user's phone (e.g. the external electronic device) may be wirelessly linked with the electronic device. The user sends messages, such as iMessage®, SMS, and electronic mail messages, using the external electronic device, which include emoji graphical objects that have been visually manipulated. The electronic device receives information (e.g., from the external electronic device) that identifies a predetermined number of the manipulated emoji graphical objects most recently sent by the external electronic device and displays them in the recent emoji view, such as illustrated in user interface screen 1512.

In accordance with some embodiments, the device receives a third user input (e.g., user taps on the suggested replies affordance 1512D). In response to receiving the third user input, the device displays a suggested replies user input interface (e.g., a list of suggested responses 1514C, 1514D, and 1514E), as illustrated in user interface screen 1514 of FIG. 15B. The suggested replies user input interface includes one or more suggested responses (e.g., 1514C-E). User interface screen 1514 also includes a diction affordance 1514A, which, when activated, causes display of the dictation user interface, and an emoji affordance 1514B, which, when activated, causes display of the emoji user interface.

In accordance with some embodiments, at user interface screen 1514, the device receives user input representing a touch associated with a first suggested response (e.g., 1514C) of the one or more suggested responses (e.g., 1514C-1514E). In response to receiving user input representing the touch associated with the first suggested response (e.g., 1514C), the device adds the first suggested response as response information to an electronic message. For example, after user has selected affordance 1514C, the device may send the response to the recipient(s). The response information is transmitted to recipients, for example, (1) by direct wireless WiFi communication with a WiFi-enabled router, (2) by direct wireless cellular communication with a cellular base station, or (3) by using a companion device (such as a cellular telephone or laptop) as an intermediary and requesting that the companion device transmit the response information. The companion device also includes a user-accessible electronic message application and may be configured for accessing the electronic messages of the user of the electronic device.

In accordance with some embodiments, receiving a fourth user input (e.g., user taps on the dictation affordance 1514A or at user interface screens 1506, 1508, 1510, 1512). In response to receiving the fourth user input, displaying the dictation user interface.

In accordance with some embodiments, in accordance with some embodiments, the device receives user input representing speech (e.g., while at the dictation user interface). In response to receiving user input representing speech, the device transcribes the user input representing speech. Transcribing the speech can be done several ways, including: (1) locally, by the electronic device, (2) remotely, where the electronic device transmits (e.g., via WiFi or Bluetooth) the user input representing speech (or data that is based on the user input representing speech) to a companion device (e.g., a cellular phone or laptop), the companion device locally transcribes the user input, and the electronic device receives the transcribed speech from the companion device, (3) remotely, where the electronic device transmits (e.g., via WiFi or Bluetooth) the user input representing speech (or data that is based on the user input representing speech) to a server (e.g., a server connected over the Internet), the server transcribes the user input, and the electronic device receives the transcribed speech from the server (e.g., via WiFi or Bluetooth), or (4) remotely, where the electronic device transmits (e.g., via WiFi or Bluetooth) the user input representing speech (or data that is based on the user input representing speech) to a companion device (e.g., a cellular phone or laptop), the companion device transmits the user input to a server, the server transcribes the user input, the companion device receives the transcribed speech from the server, and the electronic device receives the transcribed speech from the companion device. In response to receiving user input representing speech, the device adds the transcribed speech to an electronic message (e.g., add the transcribed speech to an iMessage®, SMS or electronic mail message).

In accordance with some embodiments, the device receives a fifth user input (e.g., user taps on the "keyboard" affordance). In response to receiving the fifth user input, the device displays one or more keys of a keyboard (e.g. display a keyboard that allows user input to response information to be added to the electronic message, such as described in relation to FIGS. 17A-17D).

In accordance with some embodiments, at user interface screen 1508, the device receives a sixth user input, the sixth user input associated with the second emoji graphical object (e.g., swipe/drag on the touch-sensitive surface or rotation of a rotatable input mechanism). In response to receiving the sixth user input associated with the second emoji graphical object (e.g., 1508A), changing a first visual aspect of the second emoji graphical object, wherein the change in the first visual aspect is based on the sixth user input. For example, a swipe up on a corner of a smiley's mouth causes a different change (make smiley more happy) than a swipe down on a corner of the mouth (make smiley more sad).

In accordance with some embodiments, at user interface screen 1508, the device receives a third user swipe gesture input (e.g., prior to receiving the second swipe gesture, the device receives the third swipe gesture; user swipes to the next page). In response to receiving the third user swipe gesture input, replacing display of the second emoji graphical object (e.g., the heart 1508A) with display of a third emoji graphical object (e.g., the thumbs up 1510A).

In accordance with some embodiments, the device transmits an electronic message to a recipient, the electronic message including response information (e.g., send an emoji, text, dictated content as a message once the user has selected/entered the response information).

In accordance with some embodiments, the first emoji graphical object and the second emoji graphical object are different, and the first emoji graphical object and the second emoji graphical object are selected from the group comprising a smiley (e.g., a happy face, a sad face, an angry face), a heart (e.g., a heart, a broken heart, an animated beating heart), and a thumb signal (e.g., a thumbs up or thumbs down; user can manipulate thumb signal to switch between the two).

FIG. 16 is a flow diagram illustrating method 1600 for receiving user input using an electronic device, in accordance with some embodiments. In some embodiments, method 1600 may be performed at an electronic device with a display (e.g., 112, 340, 504) and a touch-sensitive surface (e.g., 112, 355, 504). The electronic device may also include a rotatable input mechanism (e.g., 506). In some embodiments, the touch-sensitive surface (e.g., 112, 355, 504) is capable of detecting intensity of touch contacts. In some embodiments, method 1600 may be performed at an electronic device with a touch-sensitive surface (e.g., 112, 355, 504) that is able to determine a substitute (proxy) for the force or pressure of a contact on the touch-sensitive surface. Exemplary devices that may perform method 1600 include devices 100, 300, and 500 (FIGS. 1A, 3, and 5A). Some operations in method 1600 may be combined, the order of some operations may be changed, and some operations may be omitted.

A user may wish to select from among different user interfaces for entering a message body or reply, such as in an iMessage®, SMS, or electronic mail message. Switching among the various user interfaces, however, may require navigating a complex structure of menus. This is time consuming and not efficient. Thus, it may be helpful to provide a method that allows a user to precisely, quickly, and efficiently switch among various user interfaces. Precise, quick, and efficient techniques are now described.

Method 1600 provides an intuitive way to switch among various user interfaces. The method reduces the cognitive burden on a user switching among various user interfaces, thereby creating a more efficient human-machine interface. For battery-operated computing devices, enabling a user to switch among various user interfaces faster and more efficiently conserves power and increases the time between battery charges.

At block 1602, a first user input is received. At block 1604, in response to receiving the first user input, a dictation user interface is displayed. At block 1606, a second user input is received. At block 1608, in response to receiving the second user input, display of the dictation user interface is replaced with display of a first emoji graphical object. At block 1610, a first user swipe gesture input is received at a location on the touch-sensitive surface associated with the first emoji graphical object. At block 1612, in response to receiving the first user swipe gesture input, replacing display of the first emoji graphical object with display of a second emoji graphical object. At block 1614, a second user swipe gesture input is received at the touch-sensitive surface. At block 1616, in response to receiving the second user swipe gesture input, displaying a set of recently accessed emoji graphical objects.

In accordance with some embodiments, the set of recently accessed emoji graphical objects comprises: one or more emoji graphical objects, wherein the one or more emoji graphical objects are selected based on emoji graphical objects recently accessed by an external electronic device.

In accordance with some embodiments, the set of recently accessed emoji graphical objects comprises: one or more visually manipulatable emoji graphical objects, wherein the one or more visually manipulatable emoji graphical objects are selected based on visually manipulatable emoji graphical objects recently accessed by a wirelessly linked external electronic device.

In accordance with some embodiments, the device receives a third user input. In response to receiving the third user input, the device displays a suggested replies user input interface. The suggested replies user input interface includes one or more suggested responses.

In accordance with some embodiments, the device receives user input representing a touch associated with a first suggested response of the one or more suggested responses. In response to receiving user input representing the touch associated with the first suggested response, the device adds the first suggested response as response information to an electronic message.

In accordance with some embodiments, the device receives a fourth user input. In response to receiving the fourth user input, the device displays the dictation user interface.

In accordance with some embodiments, the device receives user input representing speech. In response to receiving user input representing speech: the device transcribes the user input representing speech and adds the transcribed speech to an electronic message.

In accordance with some embodiments, the device receives a fifth user input. In response to receiving the fifth user input, the device displays one or more keys of a keyboard (e.g., such as the keyboards described in relation to FIGS. 17A-17D).

In accordance with some embodiments, the device receives a sixth user input, the sixth user input associated with the second emoji graphical object. In response to receiving the sixth user input associated with the second emoji graphical object, the device changes a first visual aspect of the second emoji graphical object, wherein the change in the first visual aspect is based on the sixth user input.

In accordance with some embodiments, the device receives a third user swipe gesture input. In response to receiving the third user swipe gesture input, the device replaces display of the second emoji graphical object with display of a third emoji graphical object.

In accordance with some embodiments, the device transmits an electronic message to a recipient, the electronic message including response information.

In accordance with some embodiments, the first emoji graphical object and the second emoji graphical object are different, and the first emoji graphical object and the second emoji graphical object are selected from the group comprising a smiley, a heart, and a thumb signal.

Note that details of the processes described above with respect to method 1600 (FIG. 16) are also applicable in an analogous manner to the methods described above. For example, method 700 (FIG. 7), method 900 (FIG. 9), method 1000 (FIG. 10), method 1200 (FIG. 12), method 1400 (FIG. 14A), and method 1420 (FIG. 14B) may include one or more of the characteristics of the various methods described above with reference to method 1600. For brevity, these details are not repeated below.

It should be understood that the particular order in which the operations in FIG. 16 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 700 (FIG. 7), method 900 (FIG. 9), method 1000 (FIG. 10), method 1200 (FIG. 12), method 1400 (FIG. 14A), method 1420 (FIG. 14B), and method 1600 (FIG. 16) may be incorporated with one another. Thus, the techniques described with respect to method 1600 may be relevant to method 700 (FIG. 7), method 900 (FIG. 9), method 1000 (FIG. 10), method 1200 (FIG. 12), method 1400 (FIG. 14A), and method 1420 (FIG. 14B).

FIGS. 17A-17D illustrate exemplary user interfaces for receiving user input using an electronic device, in accordance with some embodiments. In some embodiments, the electronic device is device 500. In some embodiments, the electronic device has a display (e.g., 112, 340, 504), a touch-sensitive surface (e.g., 112, 355, 504), and a rotatable input mechanism (e.g., 506).

A user may wish to enter text on a virtual keyboard for entering a message body or reply, such as in an iMessage®, SMS, or electronic mail message. Devices with small displays, however, do not provide sufficient real estate for a virtual QWERTY keyboard that is efficient. Thus, it may be helpful to provide a method that allows a user to precisely, quickly, and efficiently enter characters using a touch-based keyboard.

Figure 17A:
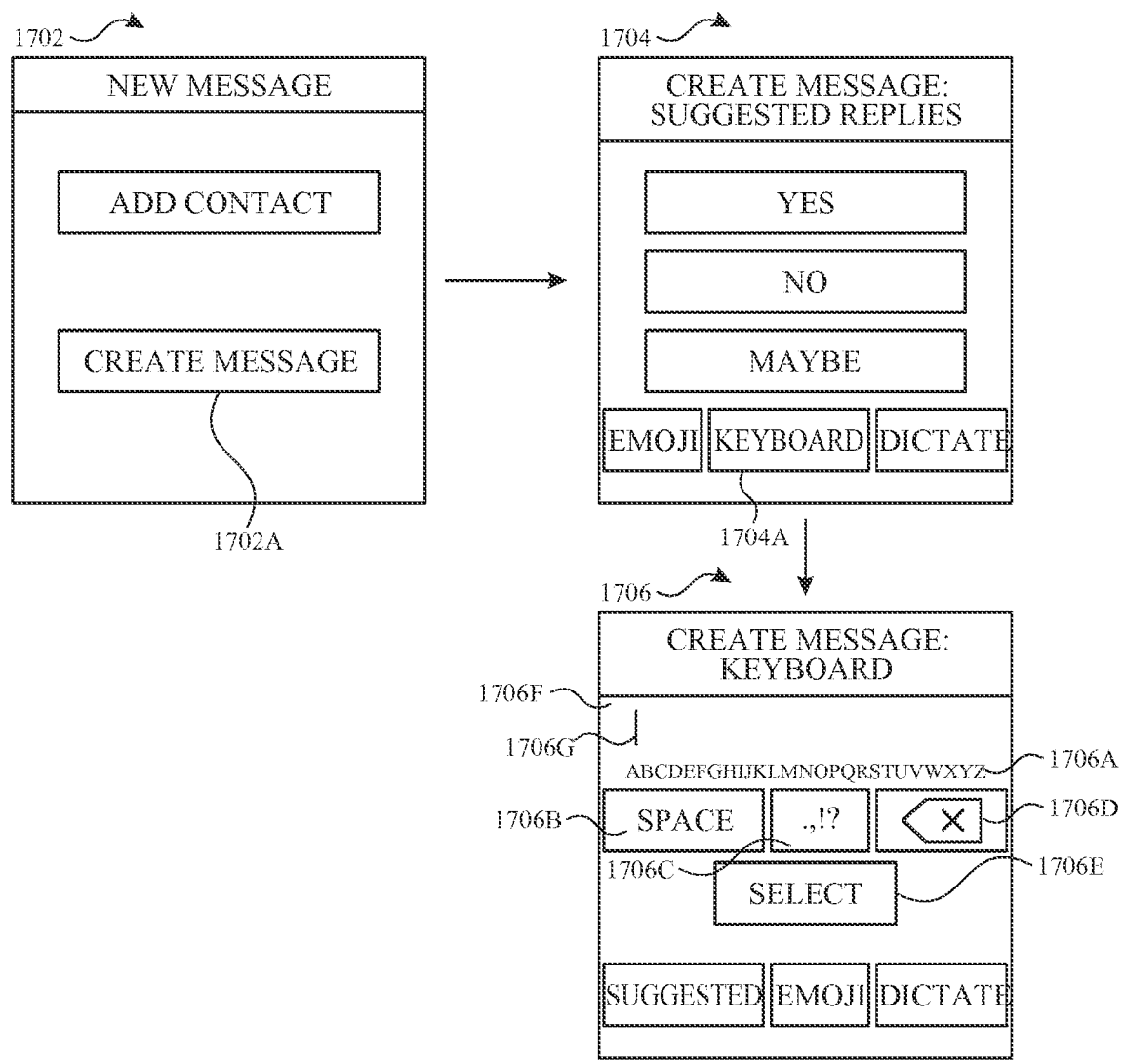
FIGS. 17A-17D illustrate exemplary user interfaces for receiving user input in accordance with some embodiments.
Figure 17B:
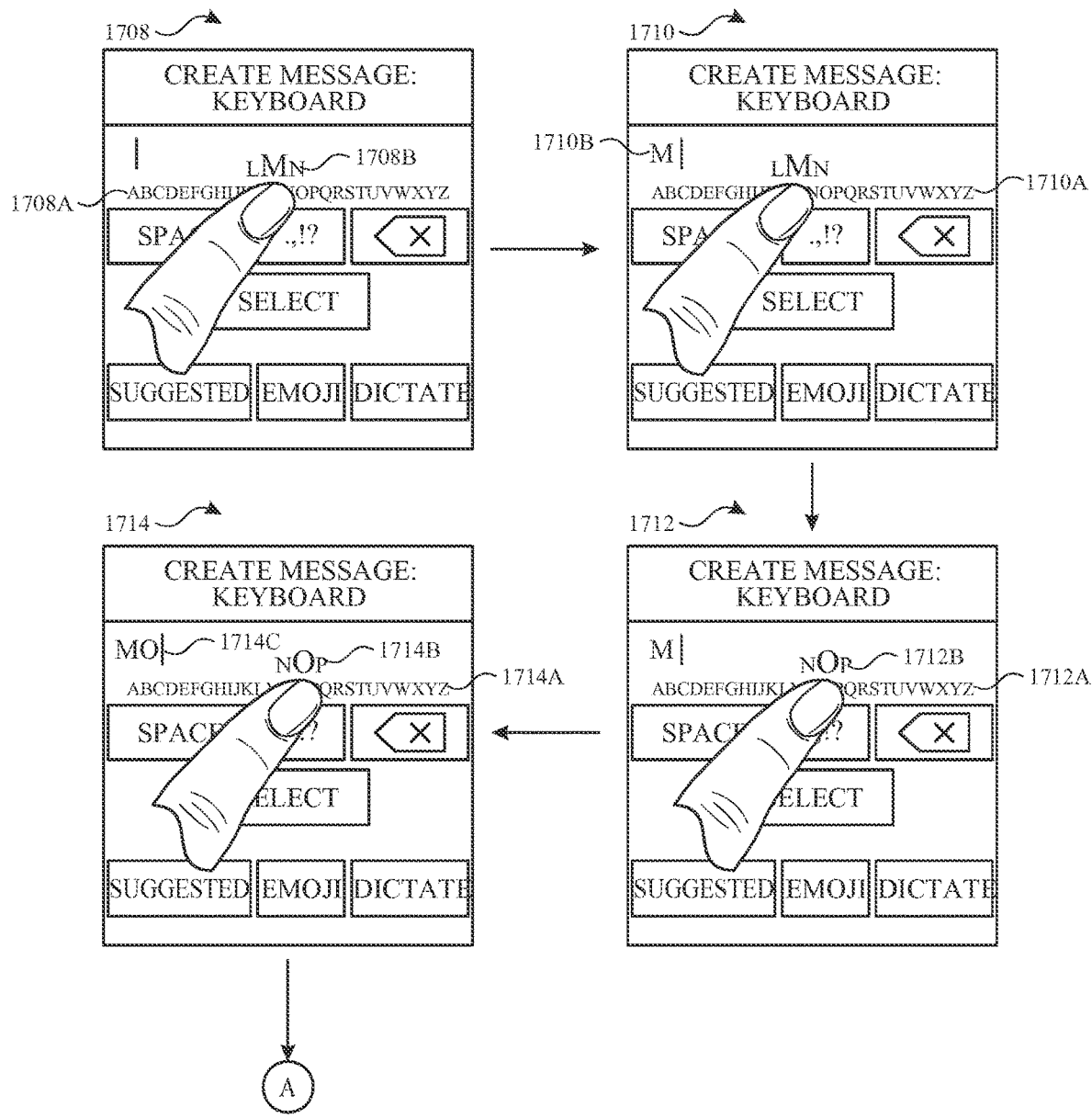
Figure 17C:
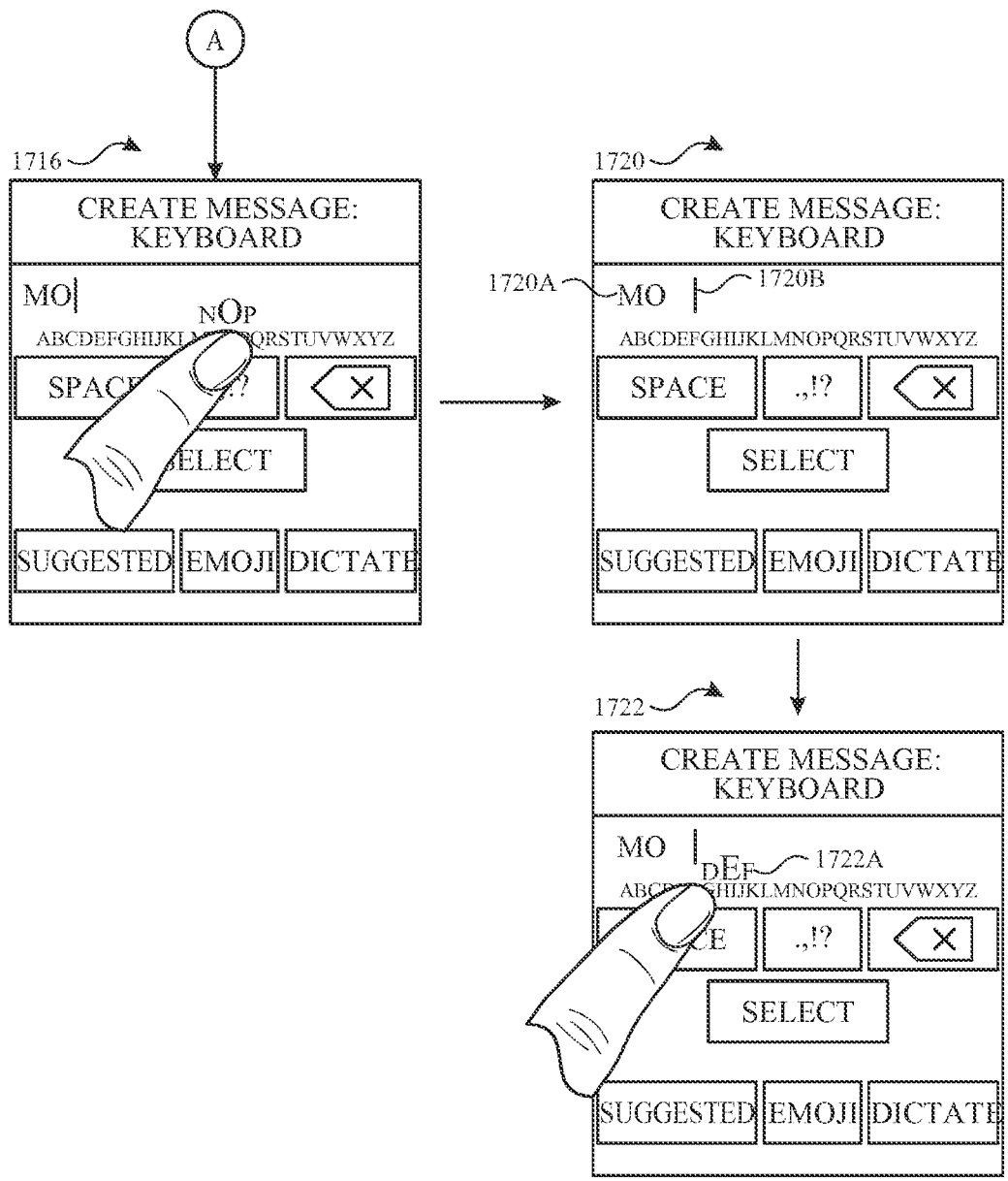

At FIG. 17A, user interface screen 1702 includes an affordance for adding recipients to a message and an affordance 1702A for adding a body to a message. When the user activates affordance 1702, the user is presented with user interface screen 1704. User interface screen 1704 includes a recently accessed user interface (e.g., the "yes", "no", "maybe" affordances for the suggested replies user interface), such as described in relation to FIGS. 6-7.

At user interface screen 1704, the keyboard affordance, when activated, causes display of a keyboard user interface, such as illustrated in user interface screen 1706.

At user interface screen 1706, the keyboard user interface includes a keyboard track 1706A. The keyboard track 1706A may be, for example, a row of characters, as illustrated in keyboard track 1706A. The row of characters 1706A may be the alphabet, arranged in alphabetical order. Affordance 1706B, when activated, inserts a whitespace into text being typed. Affordance 1706C, when activated, causes a display of a second keyboard track, which replaces the keyboard track 1706A. The second keyboard track may be a second row of characters that includes non-alphabetical characters, such as one or more of: ".", ",", "!", "?", "@", "&", "%", "$", "#", "{", "}", and "~". The second keyboard track uses a similar technique for input characters as the keyboard track 1706A, which is described below. Affordance 1706D, when activated, deletes a typed character (e.g., such as a backspace or delete function on a traditional hardware keyboard). Affordance 1706E, when activated, indicates the user has completed entering the text and, for example, causes the keyboard track 1706A to no longer be displayed. In some examples, the user interface includes a text insertion area 1706F with a cursor 1706G. The cursor may indicate, for example, where entered text will be inserted.

At user interface screen 1708, a user has placed a touch (e.g., a finger touch) on a location of the touch-sensitive surface that corresponds to the keyboard track 1708A. In response to detecting the touch, the device displays one or more preview characters 1708B. In this example, the one or more preview characters are "LMN". The preview characters are determined based on the location of the touch on the keyboard track 1708A. The preview characters may be larger than the characters of the keyboard track. This allows the keyboard track to be small, yet still allows the user to read which character is being previewed by the preview characters. The location of the preview characters 1708B is different than the location of the corresponding characters in the keyboard track 1708A. This allows the preview characters 1708C to be visible while the user has placed a finger or other touch at the location of the keyboard track 1708A.

The preview characters 1708B include an "L" character, an "M" character, and a "N" character. In this example, the size of the "M" (or middle character) is larger than the other characters, indicated it is the focus character. The focus character indicates to the user which character will be inserted if the selection is confirmed. In this example, the "M" character is the focus character and will be added at the point of insertion (e.g., at the cursor). The "L" and "N" characters are not focus characters, but provide the user with context. The "L" and "N" characters indicate to the user which characters will become the focus character if the user moves their finger along the keyboard track while not breaking contact (e.g., the finger contact) with the touch-sensitive surface. By scrubbing (e.g., sliding the users finger) along the keyboard track, different characters can be previewed and different characters become the focus character. When the focus character is the character that the user wants to insert, the user can initiate a hard press on the touch-sensitive screen, while continuing to contact the touch-sensitive surface. For example, the device displays "M" as the focus character. The device detects that a characteristic intensity of the touch exceeds an intensity threshold. In response to detecting that the characteristic intensity of the touch exceeds the intensity threshold, the device inserts the focus character at the point of insertion (e.g., at the location of the cursor), as illustrated in user interface screen 1710.

At user interface screen 1710, a character "M" 1710B has been inserted as a result of the user performing a hard press (e.g., exceeding the intensity threshold) while the finger touch was being detected on the character track 1710A and the "M" character was the focus character.

While continuing to not break contact with the touch-sensitive surface, the user slides their finger to the right along keyboard track 1712A, as shown in user interface screen 1712. As the user slides (e.g., scrubs) along keyboard track 1712A, the preview characters 1712B update to reflect the location of the user's touch on the keyboard track 1712A. In preview characters 1712B, the focus character is the "O" character, as indicated by being larger than the "N" or "P" characters of 1712B. Again, without breaking contact with the touch-sensitive surface, the user performs a hard press. The device detects that a characteristic intensity of the touch at the location on the keyboard track 1712A exceeds an intensity threshold. In response to detecting that the characteristic intensity of the touch exceeds the intensity threshold, the device inserts the focus character at the point of insertion (e.g., at the location of the cursor), as illustrated in user interface screen 1714.

At user interface screen 1714, the user has now entered "MO", all while not lifting their finger from the touch-sensitive surface (e.g., not breaking contact with the touch-sensitive surface).

In accordance with some embodiments, the user may enter a whitespace by lifting their finger. In accordance with some embodiments, the user may enter a whitespace by lifting their finger and replacing it back onto the keyboard track. Thus, for example, if the user wishes to enter a whitespace after "MO" displayed in user interface screen 1714, the user breaks contact with the touch-sensitive surface. In some embodiments, in accordance with a determination that the touch is no longer detected (e.g., the user is no longer touching the touch-sensitive surface), a whitespace is inserted at the point of insertion (e.g., cursor 1714). In some embodiments, in accordance with a determination that the touch (e.g., the touch used to insert "MO") is no longer detected and that a second touch is detected, a whitespace is inserted at the point of insertion (e.g., cursor 1714). In accordance with some embodiments, in accordance with a determination that the touch (e.g., the touch used to insert "MO") is no longer detected and that a second touch is detected within a predetermined period of time (e.g., the user lifts up their finger and then replaces their finger back on the touch-sensitive display in less than a predetermined period of time), a whitespace is inserted at the point of insertion (e.g., cursor 1714).

User interface screens 1716 and 1718 illustrate inserting a whitespace using the technique described above. At user interface screen 1716, the user has still not lifted their finger from the touch-sensitive surface. At user interface screen 1718, the device detects that the touch has been broken with the touch-sensitive surface. In response to detecting that the touch has been broken with the touch-sensitive surface, the device inserts a whitespace character, as illustrated by character "MO" 1720A (i.e., "MO<whitespace>") in user interface screen 1720. Typically, a whitespace character does not correspond to a visible mark on the display. However, the cursor 1720B may move (such as to the right) to indicate that a whitespace has been inserted at the point of insertion.

In some examples, a user can perform a swipe up to commit a character, rather than performing a hard press. In some examples, as illustrated in user interface screen 1724 of FIG. 17D, the keyboard track does not include all the characters of the alphabet. In some examples, the keyboard track includes various markers instead of the characters available for insertion. In some embodiments, the one or more preview characters consist of only a single character, which is the focus character, as shown in user interface screen 1724.

Figure 17D:
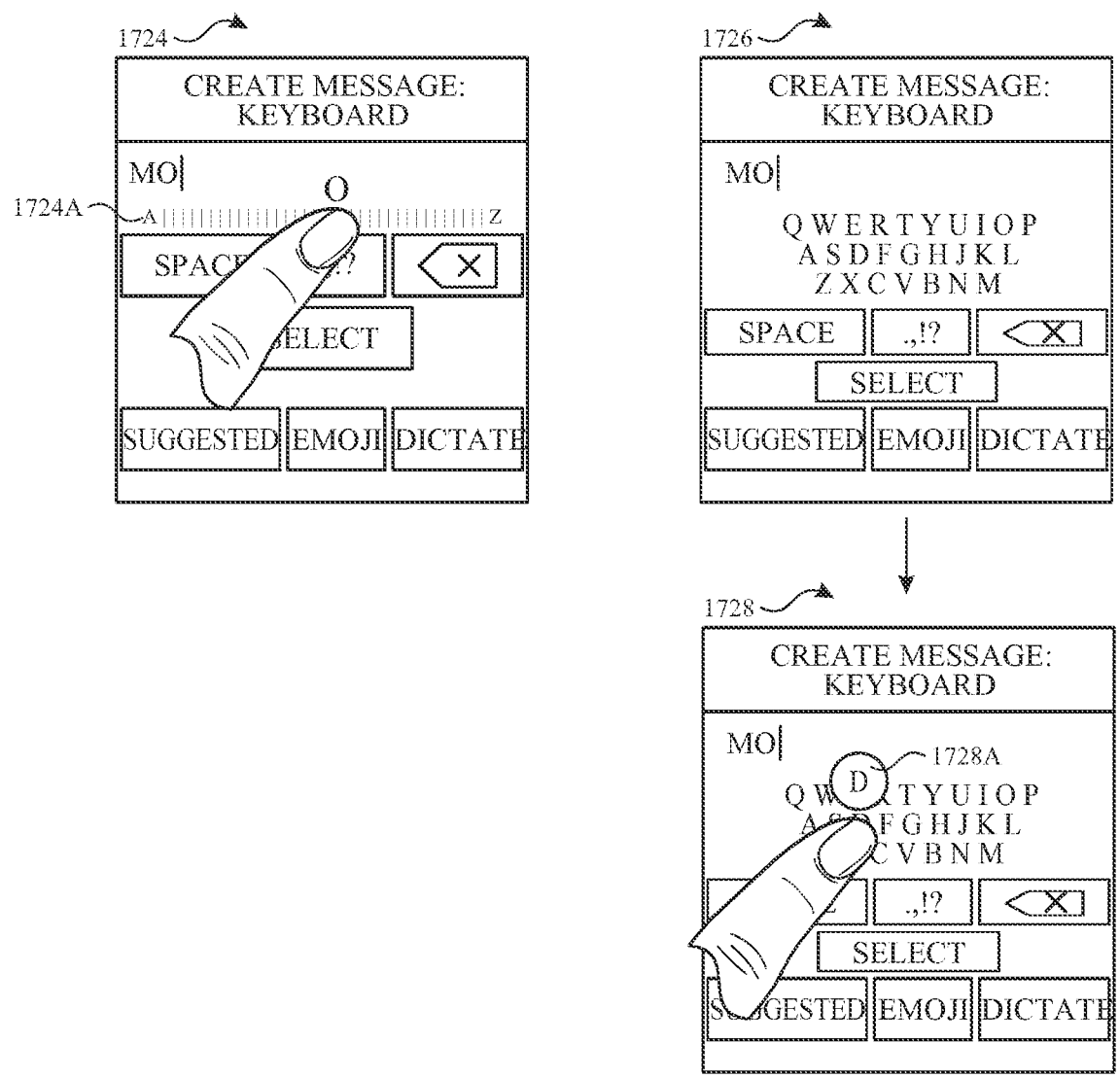

In accordance with some embodiments, the keyboard track has a QWERTY layout, such as illustrated in user interface screen 1726 and 1728 of FIG. 17D. Similar to the keyboard track discussed above, the QWERTY layout can be used by swiping over to the desired key (in the vertical and the horizontal direction) to cause a preview to be displayed. The preview 1728A may fully or partially overlap the keyboard, such as shown in user interface screen 1728. The user can commit the focus character (e.g., "D") in the preview by performing a hard press (characteristic intensity exceeds an intensity threshold). The user can enter a space by lifting their finger and replacing it on the touch-sensitive surface.

Figure 18:
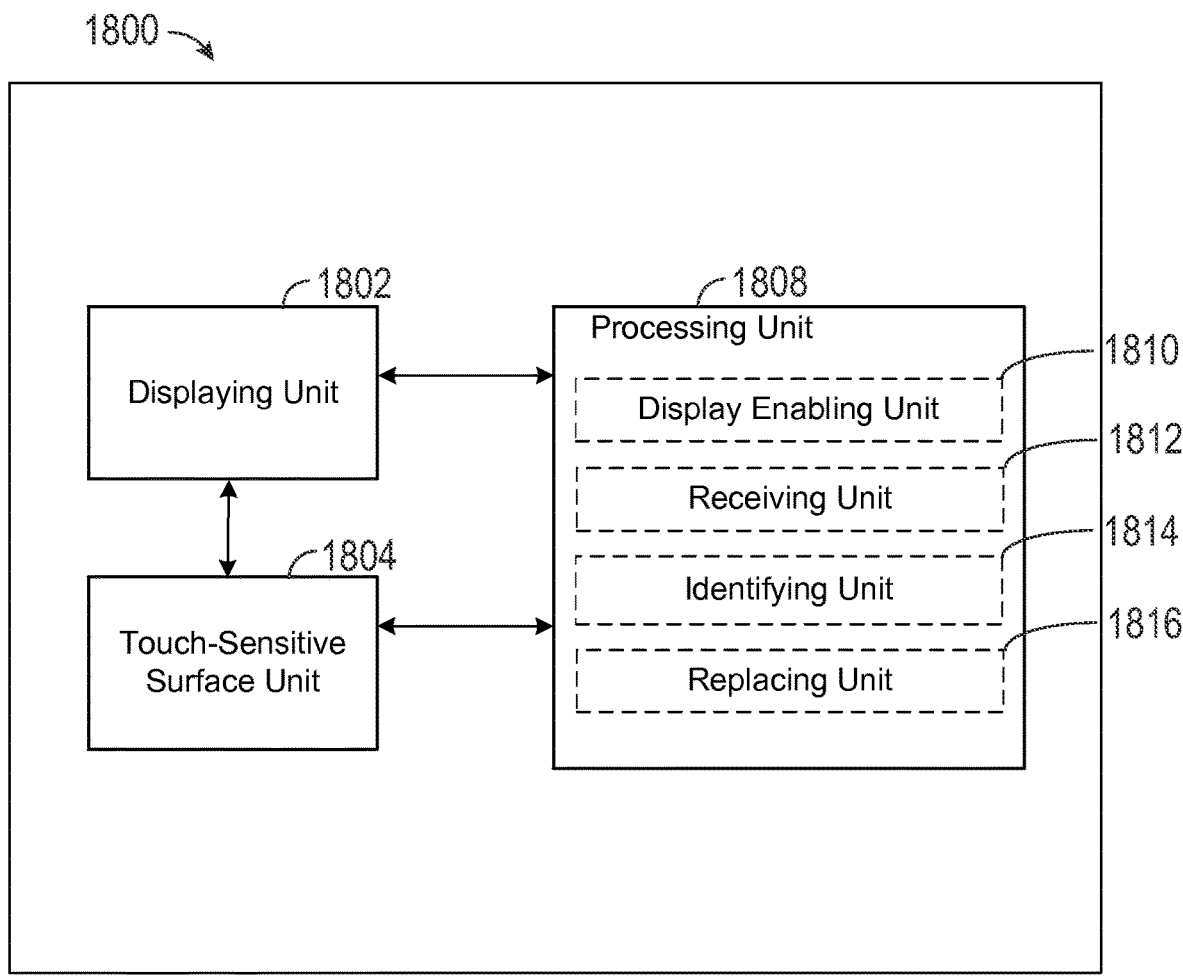
FIGS. 18-23 illustrate functional block diagrams in accordance with some embodiments.

In accordance with some embodiments, FIG. 18 shows an exemplary functional block diagram of an electronic device 1800 configured in accordance with the principles of the various described embodiments. In accordance with some embodiments, the functional blocks of electronic device 1800 are configured to perform the techniques described above. The functional blocks of the device 1800 are, optionally, implemented by hardware, software, or a combination of hardware and software to carry out the principles of the various described examples. It is understood by persons of skill in the art that the functional blocks described in FIG. 18 are, optionally, combined or separated into sub-blocks to implement the principles of the various described examples. Therefore, the description herein optionally supports any possible combination or separation or further definition of the functional blocks described herein.

As shown in FIG. 18, an electronic device 1800 includes a displaying unit 1802 configured to display graphical objects; a touch-sensitive surface unit 1804 configured to receive user gestures (e.g., touches); and a processing unit 1808 coupled to displaying unit 1802, touch-sensitive surface unit 1804. In some embodiments, the processing unit 1808 includes at least a display enabling unit 1810, a receiving unit 1812, an identifying unit 1814, and a replacing unit 1816.

The processing unit 1808 is configured to: in response to receiving the user input: identify (e.g., with receiving unit 1812) a most recently accessed user input technique of a set of user input techniques; identify (e.g., with identifying unit 1814) a least recently accessed user input technique of the set of user input techniques; display (e.g., with display enabling unit 1810), on the displaying unit 1802, a user input interface of the most recently accessed user input technique; and display (e.g., with display enabling unit 1810), on the displaying unit 1802, a first affordance associated with a user input interface of the least recently accessed user input technique.

In accordance with some embodiments, the user input interface of the most recently accessed user input technique may comprise a selection affordance associated with the most recently accessed user input technique.

In accordance with some embodiments, the processing unit 1808 may further be configured to: in response to receiving the user input: identify (e.g., with identifying unit 1814) a second-most recently accessed user input technique of the set of user input techniques; and display (e.g., with display enabling unit 1810), on the displaying unit 1802, a second affordance associated with a user input interface of the second-most recently accessed user input technique.

In accordance with some embodiments, the most recently accessed user input technique, the least recently accessed user input technique, and the second-most recently accessed user input technique are different techniques of the set of user input techniques.

In accordance with some embodiments, the most recently accessed user input technique, the least recently accessed user input technique, and the second-most recently accessed user input technique are selected from the group comprising a recent contacts functionality, an all contacts functionality, and a dictation functionality.

In accordance with some embodiments, the most recently accessed user input technique, the least recently accessed user input technique, and the second-most recently accessed user input technique are selected from the group comprising a suggested replies functionality, an emoji functionality, and a dictation functionality.

In accordance with some embodiments, the set of user input techniques is a closed set of predetermined input techniques.

In accordance with some embodiments, a quantity of user input techniques of the set of user input techniques is predetermined.

In accordance with some embodiments, the first affordance provides an indication of the least recently accessed user input technique.

In accordance with some embodiments, the second affordance provides an indication of the second-most recently accessed user input technique.

In accordance with some embodiments, the first affordance, the second affordance, and the user input interface of the most recently accessed user input technique are concurrently displayed.

In accordance with some embodiments, the processing unit 1808 is further configured to: receive (e.g., with receiving unit 1812) user input associated with the first affordance associated with the user input interface of the least recently accessed user input technique; and in response to receiving user input associated with the first affordance, the processing unit 1808 is further configured to replace (e.g., with replacing unit 1816) display of the user input interface of the most recently accessed user input technique with display of the user input interface of the least recently accessed user input technique.

In accordance with some embodiments, the processing unit is further configured to: receive (e.g., with receiving unit 1812) user input associated with the first affordance associated with the user input interface of the least recently accessed user input technique; and in response to receiving user input associated with the first affordance: replace (e.g., with replacing unit 1816) display of the user input interface of the most recently accessed user input technique with display of the user input interface of the least recently accessed user input technique; replace (e.g., with replacing unit 1816) display of the first affordance associated with the user input interface of the least recently accessed user input technique with display of a third affordance associated with the user input interface of the most recently accessed user input technique; and replace (e.g., with replacing unit 1816) display of the second affordance associated with the user input interface of the second-most recently accessed user input technique with display of a fourth affordance associated with the user input interface of the most recently accessed user input technique.

The operations described above with reference to FIG. 7 are, optionally, implemented by components depicted in FIGS. 1A-1B or FIG. 18. For example, receiving operation 702, identifying operations 706 and 708, and displaying operation 710 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 19:
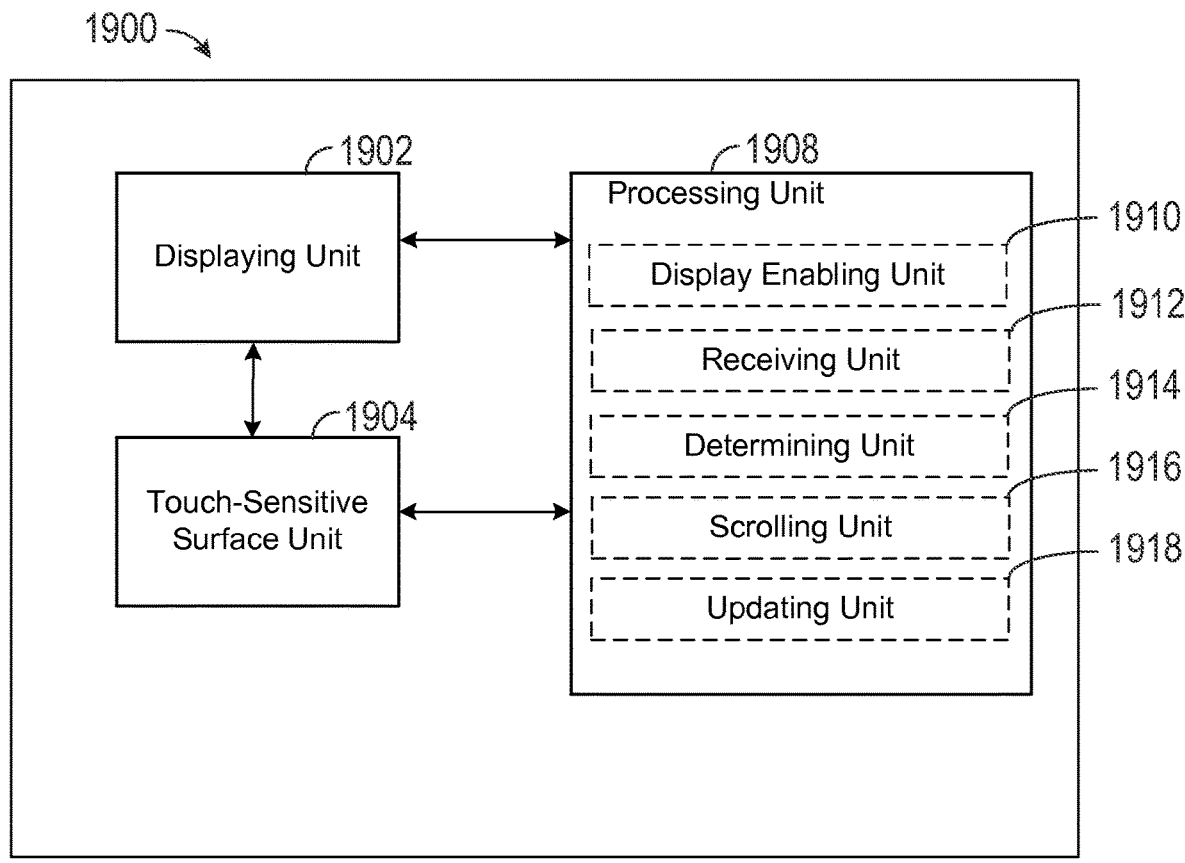

In accordance with some embodiments, FIG. 19 shows an exemplary functional block diagram of an electronic device 1900 configured in accordance with the principles of the various described embodiments. In accordance with some embodiments, the functional blocks of electronic device 1900 are configured to perform the techniques described above. The functional blocks of the device 1900 are, optionally, implemented by hardware, software, or a combination of hardware and software to carry out the principles of the various described examples. It is understood by persons of skill in the art that the functional blocks described in FIG. 19 are, optionally, combined or separated into sub-blocks to implement the principles of the various described examples. Therefore, the description herein optionally supports any possible combination or separation or further definition of the functional blocks described herein.

As shown in FIG. 19, an electronic device 1900 includes a displaying unit 1902 configured to display graphical objects; a touch-sensitive surface unit 1904 configured to receive user gestures (e.g., touches); and a processing unit 1908 coupled to displaying unit 1902, touch-sensitive surface unit 1904. In some embodiments, the processing unit 1908 includes at least a display enabling unit 1910, a receiving unit 1912, an determining unit 1914, a scrolling unit 1916, and an updating 1918.

The processing unit 1808 is configured to: display (e.g., with display enabling unit 1910), on the displaying unit 1902, a portion of a set of information; receive (e.g., with receiving unit user input associated with the set of information; in response to receiving the user input associated with the set of information, scroll (e.g., with scrolling unit 1918) the set of information on the displaying unit; determine (e.g., with determining unit 1914) whether a scroll attribute satisfies a threshold criteria; and in accordance with a determination that the scroll attribute satisfies the threshold criteria, display (e.g., with display enabling unit 1910) an index object.

In accordance with some embodiments, the index object fully or partially overlays at least a portion of the set of information.

In accordance with some embodiments, the scroll attribute is an attribute of scrolling of the set of information.

In accordance with some embodiments, the scroll attribute is an attribute of the user input.

In accordance with some embodiments, the threshold criteria is based on one or more of exceeding a threshold speed, exceeding a threshold velocity, and exceeding a threshold duration.

In accordance with some embodiments, the device comprises a touch-sensitive surface; and wherein the user input is a swipe touch on the touch-sensitive surface.

In accordance with some embodiments, the device comprises a rotatable input mechanism; and wherein the user input is a rotation of the rotatable input mechanism.

In accordance with some embodiments, the processing unit 1908 is further configured to: in accordance with a determination that the scroll attribute does not satisfy the threshold criteria, not display the index object fully or partially overlaying the set of information.

In accordance with some embodiments, the index object comprises an index based on one or more currently displayed information of the set of information.

In accordance with some embodiments, the processing unit 1908 is further configure to: determine (e.g., with determining unit 1914) whether an index update attribute of the set of information satisfies an overlay update criteria; and in accordance with a determination that the index update attribute of the set of information satisfies the index update criteria, update (e.g., with updating unit 1918) display of a visual aspect of the index object.

In accordance with some embodiments, the set of information is collated.

In accordance with some embodiments, the set of information is displayed in alphabetical order.

In accordance with some embodiments, the user input associated with the set of information comprises a first direction; and wherein the processing unit 1908 is further configured to: scroll (e.g., with scrolling unit 1916) at least a portion of the set of information on the displaying unit comprises scrolling at least a portion of the set of information on the displaying unit in a second direction, wherein the second direction is based on the first direction.

In accordance with some embodiments, the set of information comprises a plurality of contacts.

In accordance with some embodiments, the set of information comprises a list of contacts.

In accordance with some embodiments, the set of information comprises a plurality of media attributes.

The operations described above with reference to FIGS. 9 and 10 are, optionally, implemented by components depicted in FIGS. 1A-1B or FIG. 19. For example, displaying operation 902, receiving operation 904, and scrolling operation 906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20:
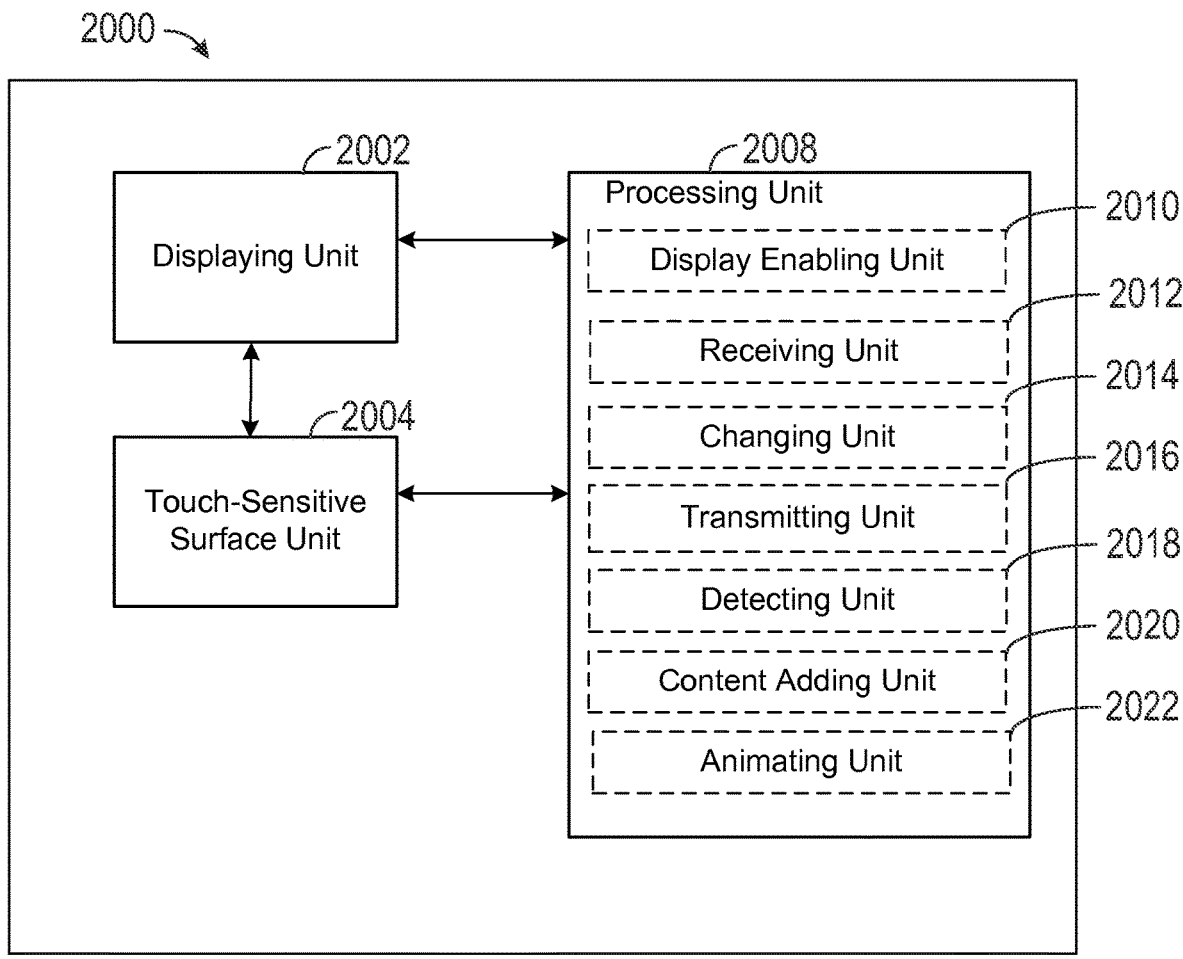

In accordance with some embodiments, FIG. 20 shows an exemplary functional block diagram of an electronic device 2000 configured in accordance with the principles of the various described embodiments. In accordance with some embodiments, the functional blocks of electronic device 2000 are configured to perform the techniques described above. The functional blocks of the device 2000 are, optionally, implemented by hardware, software, or a combination of hardware and software to carry out the principles of the various described examples. It is understood by persons of skill in the art that the functional blocks described in FIG. 20 are, optionally, combined or separated into sub-blocks to implement the principles of the various described examples. Therefore, the description herein optionally supports any possible combination or separation or further definition of the functional blocks described herein.

As shown in FIG. 20, an electronic device 2000 includes a displaying unit 2002 configured to display graphical objects; a touch-sensitive surface unit 2004 configured to receive user gestures (e.g., touches); and a processing unit 2008 coupled to displaying unit 2002, touch-sensitive surface unit 2004. In some embodiments, the processing unit 2008 includes at least a display enabling unit 2010, a receiving unit 2012, a changing unit 2014, a transmitting unit 2016, and a detecting 2018.

The processing unit 1808 is configured to: receive (e.g., with receiving unit 2012) a user input associated with a messaging input interface; in response to receiving user input associated with the messaging input interface, display (e.g., with display enabling unit), on the displaying unit 2002, an emoji graphical object; receive (e.g., with receiving unit 2012) a first user input associated with the emoji graphical object; in response to receiving the first user input associated with the emoji graphical object, change (e.g., with changing unit 2014) a first visual aspect of the emoji graphical object, wherein the change in the first visual aspect is based on the first user input; receive (e.g., with receiving unit 2012) recipient information; and transmit (e.g., with transmitting unit 2016) the emoji graphical object, including the changed first visual aspect, to a recipient associated with the received recipient information.

In accordance with some embodiments, the processing unit is further configured to: receive (e.g., with receiving unit 2012) a second user input associated with the emoji graphical object; and in response to receiving the second user input associated with the emoji graphical object, change (e.g., with changing unit 2014) a second visual aspect of the emoji graphical object, wherein the change in the second visual aspect is based on the second user input.

In accordance with some embodiments, the first visual aspect and the second visual aspect are different.

In accordance with some embodiments, the device having a touch-sensitive surface, wherein: the first user input associated with the emoji graphical object comprises a touch gesture at a location on the touch-sensitive surface associated with the first visual aspect of the emoji graphical object.

In accordance with some embodiments, the device having a touch-sensitive surface configured to detect intensity of touches, wherein the first user input associated with the emoji graphical object comprises a touch gesture having a characteristic intensity; and wherein the processing unit is further configured to: in response to receiving the first user input and in accordance with a determination that the characteristic intensity exceeds an intensity threshold, change (e.g., with the changing unit 2014) the first visual aspect of the emoji graphical object comprises changing a first feature of the emoji graphical object.

In accordance with some embodiments, the processing unit is further configured to: in response to receiving the first user input and in accordance with a determination that the characteristic intensity does not exceed the intensity threshold, change (e.g., with the changing unit 2014) the first visual aspect of the emoji graphical object comprises change (e.g., with the changing unit 2014) a second feature of the emoji graphical object different than the first feature.

In accordance with some embodiments, the device having a rotatable input mechanism, wherein: the first user input associated with the emoji graphical object comprises a rotation of the rotatable input mechanism.

In accordance with some embodiments, the device having a touch-sensitive surface and a rotatable input mechanism, wherein: the first user input associated with the emoji graphical object comprises a touch gesture at a location on the touch-sensitive surface associated with the first visual aspect of the emoji graphical object and a rotation of the rotatable input mechanism.

In accordance with some embodiments, wherein to transmit the emoji graphical object, the processing unit is further configured to transmit (e.g., with transmitting unit 2016) the emoji graphical object in response to receiving a third user input associated with a selection affordance.

In accordance with some embodiments, the processing unit is further configured to: prior to transmitting the emoji graphical object, add (e.g., with content adding unit 2020) the emoji graphical object to a message body in response to receiving a fourth user input.

In accordance with some embodiments, the emoji graphical object is an animated emoji graphical object.

In accordance with some embodiments, to change the first visual aspect of the emoji graphical object, the processing unit is further configured to animate (e.g., with animating unit 2022) a change in the first visual aspect of the emoji graphical object.

The operations described above with reference to FIG. 12 are, optionally, implemented by components depicted in FIGS. 1A-1B or FIG. 20. For example, receiving operation 1202, displaying operation 1204, and changing operation 1208 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 21:
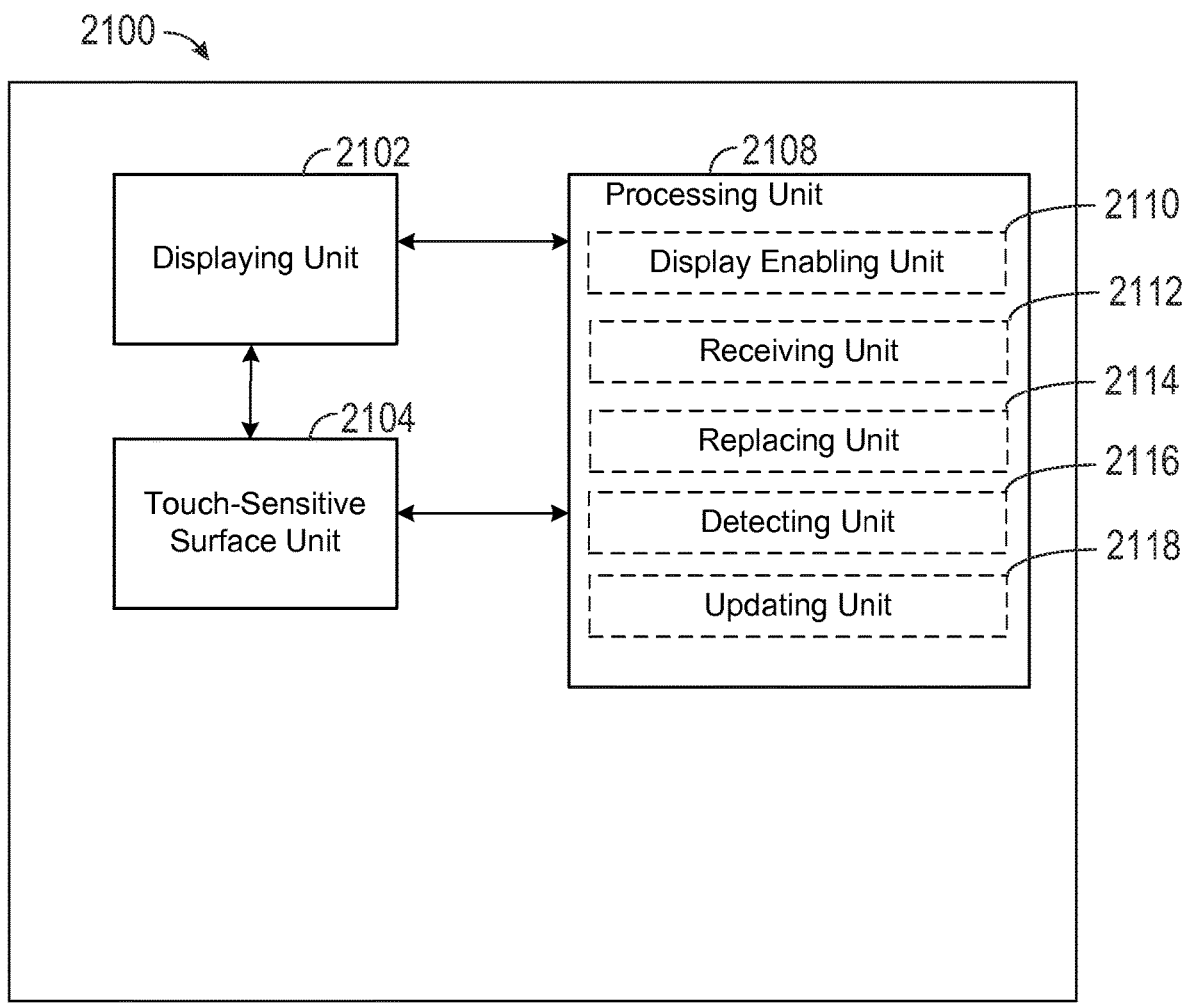

In accordance with some embodiments, FIG. 21 shows an exemplary functional block diagram of an electronic device 2100 configured in accordance with the principles of the various described embodiments. In accordance with some embodiments, the functional blocks of electronic device 2100 are configured to perform the techniques described above. The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

As shown in FIG. 21, an electronic device 2100 includes a displaying unit 2102 configured to display graphical objects; a touch-sensitive surface unit 2104 configured to receive user gestures (e.g., touches); and a processing unit 2108 coupled to displaying unit 2102, touch-sensitive surface unit 2104. In some embodiments, the processing unit 2108 includes at least a display enabling unit 2110, a receiving unit 2112, a replacing unit 2114, a detecting 2116, and an updating unit 2118.

The processing unit 2108 is configured to: display (e.g., with display enabling unit 2110), on the displaying unit 2102, a first page of a user interface and a first set of paging affordances, wherein the first set of paging affordances comprises a first paging affordance that includes a focus selector, and wherein the first paging affordance corresponds to the first page of the user interface; receive (e.g., with receiving unit 2112) a user touch at a first location on the touch-sensitive surface unit, wherein the first location is associated with the first set of paging affordances; in response to receiving the user touch at the first location, replace (e.g., with replacing unit 2114) display of the first set of paging affordances with display of a second set of paging affordances, wherein the second set of paging affordances comprises a second paging affordance that corresponds to a second page of the user interface; while continuing to receive the user touch, detect (e.g., with detecting unit 2116) movement of the user touch from the first location to a second location on the touch-sensitive surface unit without a break in contact of the user touch on the touch-sensitive surface unit, wherein the second location is associated with the second paging affordance; and in response to detecting the user touch at the second location, display (e.g., with display enabling unit 2110) the second page of the user interface.

In accordance with some embodiments, the processing unit 2108 is further configured to: detect (e.g., with detecting unit 2116) a lift-off of the user touch from the touch-sensitive surface unit at the second location; and in response to detecting the lift-off of the user touch at the second location, maintain display (e.g., with display enabling unit 2110) of the second page of the user interface.

In accordance with some embodiments, the processing unit 2108 is further configured to: while continuing to receive the user touch, detect (e.g., with detecting unit 2116) a characteristic intensity of the user touch at the second location on the touch-sensitive surface unit and detect a subsequent lift-off of the user touch from the touch-sensitive surface unit; and in accordance with a determination that the characteristic intensity exceeds an intensity threshold, maintain display (e.g., with display enabling unit 2110), on the displaying unit 2102, of the second page of the user interface.

In accordance with some embodiments, the processing unit 2108 is further configured to: in accordance with a determination that the characteristic intensity does not exceed the intensity threshold, replace (e.g., with replacing unit 2114) display of the second page of the user interface with display of the first page of the user interface.

In accordance with some embodiments, the processing unit 2108 is further configured to: in response to detecting the user touch at the second location, update (e.g., with updating unit 2118) the second paging affordance to include a focus selector.

In accordance with some embodiments, to display the second page of the user interface, the processing unit 2108 is further configured to: replace (e.g., with replacing unit display of the first page of the user interface with display of the second page of the user interface.

In accordance with some embodiments, to display the second set of paging affordances, the processing unit 2108 is further configured to display (e.g., with display enabling unit 2110) an enlarged version of the first set of paging affordances.

In accordance with some embodiments, the first page of the user interface and the second page of the user interface are different.

In accordance with some embodiments, displaying the second set of paging affordances comprises an animation of the first set of paging affordances enlarging.

In accordance with some embodiments, each paging affordance in the second set of paging affordances is associated with a corresponding page of the user interface.

The operations described above with reference to FIG. 14A are, optionally, implemented by components depicted in FIGS. 1A-1B or FIG. 21. For example, displaying operation 1402, receiving operation 1404, and detecting operation 1408 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 22:
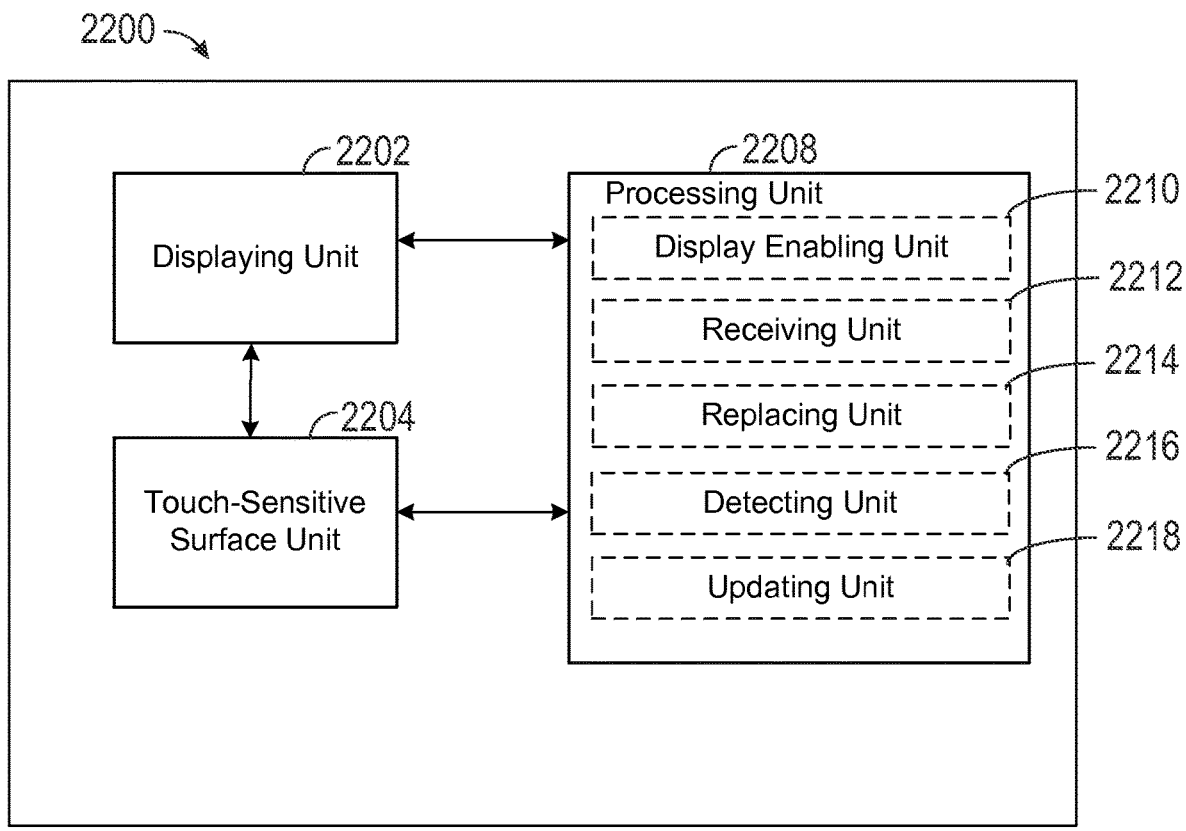

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes a displaying unit 2202 configured to display graphical objects; a touch-sensitive surface unit 2204 configured to receive user gestures (e.g., touches); and a processing unit 2208 coupled to displaying unit 2202, touch-sensitive surface unit 2204. In some embodiments, the processing unit 2208 includes at least a display enabling unit 2210, a receiving unit 2212, a replacing unit 2214, a detecting 2216, and an updating unit 2218.

The processing unit 2208 is configured to: display (e.g., with display enabling unit 2210), on the displaying unit 2202, a first page, of a plurality of pages, of a user interface and a first set of paging affordances, wherein the first set of paging affordances comprises a first paging affordance that includes a focus selector, and wherein the first paging affordance corresponds to the first page of the user interface; receive (e.g., with receiving unit 2212) a user touch at a first location on the touch-sensitive surface unit, the first location corresponding to the first set of paging affordances; responsive to receiving the user touch at the first location, replace (e.g., with replacing unit 2214) display of the first set of paging affordances with display of a second set of paging affordances, wherein the second set of paging affordances comprises a first paging affordance that includes a focus selector, and wherein the first paging affordance corresponds to the first page of the user interface; while continuing to receive the user touch, detect (e.g., with detecting unit 2216) movement of the user touch from the first location to a second location on the touch-sensitive surface unit without breaking contact with the touch-sensitive surface, wherein the second location is associated with the second paging affordance; and responsive to detecting the user touch at the second location: replace (e.g., with replacing unit 2214) display if the first page with a second page of the plurality of pages; and update (e.g., with updating unit 2218) the second set of paging affordances, wherein the updating comprises removing the focus selector from the first paging affordance of the set and displaying a second paging affordance of the set of paging affordances with the focus selector.

In accordance with some embodiments, the processing unit 2208 is further configured to: detect (e.g., with detecting unit 2216) a lift-off of the user touch from the touch-sensitive surface at the second location; and in response to detecting the lift-off of the user touch at the second location, maintain display (e.g., with display enabling unit 2210) of the second page of the user interface.

In accordance with some embodiments, the processing unit 2208 is further configured to: while continuing to receive the user touch, detect (e.g., with detecting unit 2216) a characteristic intensity of the user touch at the second location on the touch-sensitive surface and detecting a subsequent lift-off of the user touch from the touch-sensitive surface; and in accordance with a determination that the characteristic intensity exceeds an intensity threshold, maintain display (e.g., with display enabling unit 2210) of the second page of the user interface.

In accordance with some embodiments, to display the second set of paging affordances, the processing unit 2208 is further configured to display (e.g., with display enabling unit 2210) an enlarged version of the first set of paging affordances.

In accordance with some embodiments, the first page of the user interface and the second page of the user interface are different.

In accordance with some embodiments, displaying the second set of paging affordances comprises animating the first set of paging affordances enlarging.

In accordance with some embodiments, each paging affordance in the second set of paging affordances is associated with a corresponding page of the user interface.

The operations described above with reference to FIG. 14B are, optionally, implemented by components depicted in FIGS. 1A-1B or FIG. 22. For example, displaying operation 1422, receiving operation 1424, and detecting operation 1428 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
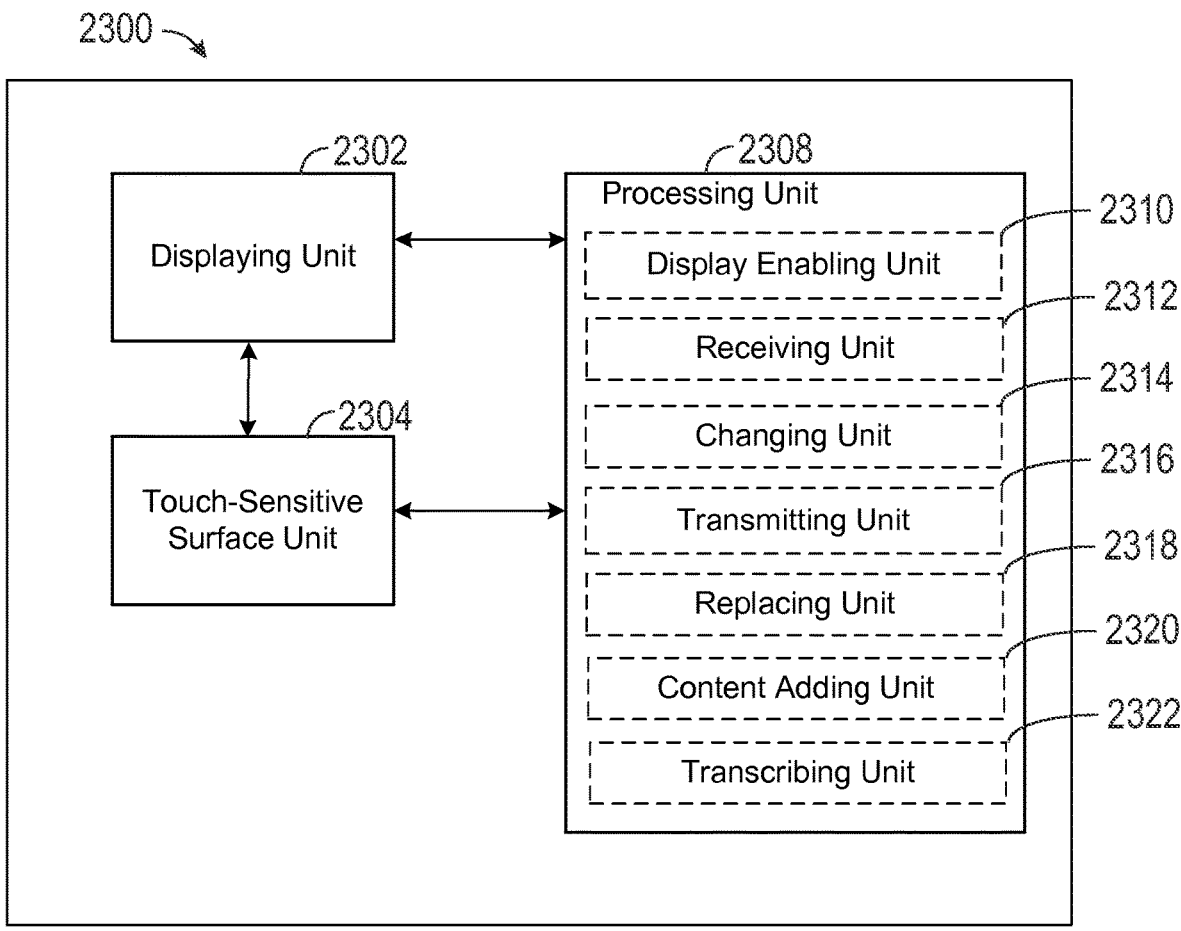

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes a displaying unit 2302 configured to display graphical objects; a touch-sensitive surface unit 2304 configured to receive user gestures (e.g., touches); and a processing unit 2308 coupled to displaying unit 2302, touch-sensitive surface unit 2304. In some embodiments, the processing unit 2308 includes at least a display enabling unit 2310, a receiving unit 2312, a changing unit 2314, a transmitting 2316, and a replacing unit 2318.

The processing unit 2308 is configured to: receive (e.g., with receiving unit 2312) a first user input; in response to receiving the first user input, display (e.g., with display enabling unit 2310), on the displaying unit 2302, a dictation user interface; receive (e.g., with receiving unit 2312) a second user input; responsive to receiving the second user input, replace (e.g., with replacing unit 2318) display of the dictation user interface with display of a first emoji graphical object; receive (e.g., with receiving unit 2312) a first user swipe gesture input at a location on the touch-sensitive surface unit associated with the first emoji graphical object; in response to receiving the first user swipe gesture input, replace (e.g., with replacing unit 2318) display of the first emoji graphical object with display of a second emoji graphical object; receive (e.g., with receiving unit 2312) a second user swipe gesture input at the touch-sensitive surface unit; and in response to receiving the second user swipe gesture input, display (e.g., with display enabling unit 2310) a set of recently accessed emoji graphical objects.

In accordance with some embodiments, the set of recently accessed emoji graphical objects comprises: one or more emoji graphical objects, wherein the one or more emoji graphical objects are selected based on emoji graphical objects recently accessed by an external electronic device.

In accordance with some embodiments, the set of recently accessed emoji graphical objects comprises: one or more visually manipulatable emoji graphical objects, wherein the one or more visually manipulatable emoji graphical objects are selected based on visually manipulatable emoji graphical objects recently accessed by a wirelessly linked external electronic device.

In accordance with some embodiments, the processing unit 2308 is further configured to: receive (e.g., with receiving unit 2312) a third user input; in response to receiving the third user input, display (e.g., with display enabling unit 2310) a suggested replies user input interface; and wherein the suggested replies user input interface includes one or more suggested responses.

In accordance with some embodiments, the processing unit 2308 is further configured to: receive (e.g., with receiving unit 2312) user input representing a touch associated with a first suggested response of the one or more suggested responses; and in response to receiving user input representing the touch associated with the first suggested response, add (e.g., with content adding unit 2320) the first suggested response as response information to an electronic message.

In accordance with some embodiments, the processing unit 2308 is further configured to: receive (e.g., with receiving unit 2312) a fourth user input; and in response to receiving the fourth user input, display (e.g., with display enabling unit 2310) the dictation user interface.

In accordance with some embodiments, the processing unit 2308 is further configured to: receive (e.g., with receiving unit 2312) user input representing speech; and in response to receiving user input representing speech: transcribe (e.g., with transcribing unit 2322) the user input representing speech, and add (e.g., with content adding unit 2320) the transcribed speech to an electronic message.

In accordance with some embodiments, the processing unit 2308 is further configured to: receive (e.g., with receiving unit 2312) a fifth user input; and in response to receiving the fifth user input, display (e.g., with display enabling unit 2310) one or more keys of a keyboard.

In accordance with some embodiments, the processing unit 2308 is further configured to: receive (e.g., with receiving unit 2312) a sixth user input, the sixth user input associated with the second emoji graphical object; and in response to receiving the sixth user input associated with the second emoji graphical object, change (e.g., with changing unit 2314) a first visual aspect of the second emoji graphical object, wherein the change in the first visual aspect is based on the sixth user input.

In accordance with some embodiments, the processing unit 2308 is further configured to: receive (e.g., with receiving unit 2312) a third user swipe gesture input; and in response to receiving the third user swipe gesture input, replace (e.g., with replacing unit 2318) display of the second emoji graphical object with display of a third emoji graphical object.

In accordance with some embodiments, the processing unit 2308 is further configured to: transmit (e.g., with transmitting unit 2316) an electronic message to a recipient, the electronic message including response information.

In accordance with some embodiments, the first emoji graphical object and the second emoji graphical object are different; and the first emoji graphical object and the second emoji graphical object are selected from the group comprising a smiley, a heart, and a thumb signal.

The operations described above with reference to FIG. 16 are, optionally, implemented by components depicted in FIGS. 1A-1B or FIG. 23. For example, receiving operation 1602 and displaying operation 1604 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 24 is a flow diagram illustrating a method for receiving user input using an electronic device in accordance with some embodiments, such as those illustrated in FIG. 17A-17D. Method 2400 is performed at a device (e.g., 100, 300, 500) with a touch-sensitive (e.g., touchscreen) display. Some operations in method 2400 may be combined, the order of some operations may be changed, and some operations may be omitted.

As described below, method 2400 provides an intuitive way for receiving user input. The method reduces the cognitive burden on a user for entering characters using a keyboard, thereby creating a more efficient human-machine interface. For battery-operated computing devices, enabling a user to enter characters faster and more efficiently conserves power and increases the time between battery charges.

At block 2402, the device displays a keyboard (e.g., 1708A) and a text entry interface, the text entry interface comprising a character insertion point.

At block 2404, the device detects a touch user input (e.g., at 1708) with a first characteristic intensity at a first location on the touch-sensitive display, the first location associated with the keyboard and corresponding to a first character (e.g., character M).

At block 2406, the device determines a first characteristic intensity of the touch user input at the first location and whether the characteristic intensity exceeds an intensity threshold.

At block 2408, in accordance with a determination that the first characteristic intensity of the touch user input does not exceed the intensity threshold, the device displays a preview (e.g., 1708B) of the first character on the touch-sensitive display (e.g., the user performs a light touch or resting contact at a location on the displayed keyboard and the corresponding character is displayed above the location of the touch user input).

At block 2410, in accordance with a determination that the first characteristic intensity of the touch user input at the first location exceeds the intensity threshold (e.g., user performed a hard press), the device displays the first character at the character insertion point (e.g., 1710B) on the touch-sensitive display (e.g., insert the character at a cursor).

In accordance with some embodiments, while continuing to detect the touch user input on the touch-sensitive display: the device detects movement (e.g., movement of the finger as shown in 1710 and 1712) of the touch user input from the first location to a second location (e.g., different from the first location) on the touch-sensitive display and with a second characteristic intensity, the second location associated with the keyboard (e.g., 1712A) and corresponding to a second character (e.g., character O). The device determines a second characteristic intensity of the touch user input at the second location. In accordance with a determination that the second characteristic intensity of the touch user input does not exceed the intensity threshold, the device displays a preview (e.g., 1712B) of the second character on the touch-sensitive display (e.g., the user performs a light touch or resting contact at a location on the displayed keyboard and the corresponding character is displayed above the location of the touch user input). In accordance with a determination that the second characteristic intensity of the touch user input at the second location exceeds the intensity threshold (e.g., user performed a hard press), the device displays the second character at the character insertion point (e.g., 1714C) on the touch-sensitive display (e.g., inserts the character at a cursor).

In accordance with some embodiments, a characteristic intensity of the touch user input while moving from the first location to the second location does not exceed the intensity threshold.

In accordance with some embodiments, the device determines that the touch user input is no longer detected on the touch-sensitive display (e.g., user performs a lift-off of their finger). In accordance with a determination that the touch user input is no longer detected (e.g., the user is no longer touching the touch-sensitive display), the device displays a whitespace at the character insertion point on the touch-sensitive display, as illustrated by character "MO" 1720A (i.e., "MO<whitespace>") in user interface screen 1720. Thus, the device displays a whitespace character when the user lifts their finger off the touch-sensitive display.

In accordance with some embodiments, the device determines that the touch user input is no longer detected (e.g., user performs a lift off of their finger). Subsequent to determining that the touch user input is no longer detected, the device detects a second touch user input at a second location on the touch-sensitive display, the second location associated with the keyboard. In response to detecting the second touch user input (e.g., the user picks up and replaces their finger), the device displays a whitespace at the character insertion point on the touch-sensitive display. Thus, the device displays a whitespace character when a user lifts and replaces their finger on the touch-sensitive display.

In accordance with some embodiments, the device determines that the touch user input is no longer detected (e.g., user performs a hard press) at a first time. Subsequent to determining that the touch user input is no longer detected, detecting a second touch user input at a second location on the touch-sensitive display at a second time, the second location associated with the keyboard. In response to detecting the second touch user input (e.g., the user picks up and replaces their finger) and in accordance with a determination that the second time is within a predetermined period of time after the first time, displaying a whitespace at the character insertion point on the touch-sensitive display. Thus, the device displays a whitespace character when a user lifts and (within a predetermined period of time) replaces their finger on the touch-sensitive display.

In accordance with some embodiments, alphabet characters of the keyboard are arranged in alphabetical order (e.g., keyboard 1708A). In accordance with some embodiments, alphabet characters of the keyboard are arranged in a QWERTY configuration (e.g., the keyboard of 1726).

Note that details of the processes described above with respect to method 2400 (e.g., FIGS. 24 and 17A-17D) are also applicable in an analogous manner to the methods described above. For example, the above methods 700, 900,

1000, 1200, 1400, and 1600 may include one or more of the characteristics of the various methods described above with reference to method 2400. For brevity, these details are not repeated.

Figure 25:
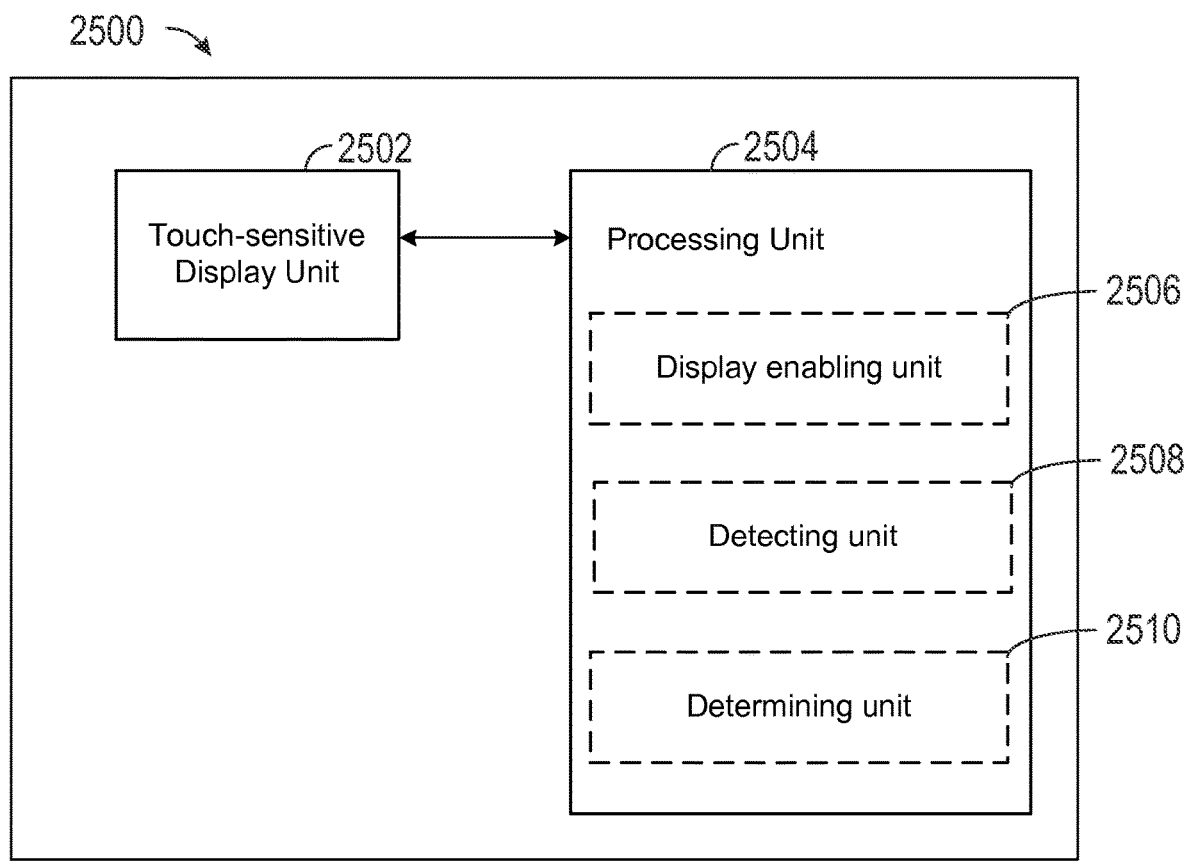
FIG. 25 illustrates a functional block diagram in accordance with some embodiments.

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a touch-sensitive display unit 2502 configured to display a graphic user interface and to receive contacts. The touch-sensitive display unit 2502 is coupled to a processing unit 2504. In some embodiments, the processing unit 2504 includes a display enabling unit 2506, a detecting unit 2508, and a determining unit 2510.

The processing unit 2504 is configured to: display (e.g., with display enabling unit 2506) a keyboard and a text entry interface, the text entry interface comprising a character insertion point; detect (e.g., with detecting unit 2508) a touch user input with a first characteristic intensity at a first location on the touch-sensitive display unit (e.g., 2502), the first location associated with the keyboard and corresponding to a first character; determine (e.g., with determining unit 2510) a first characteristic intensity of the touch user input at the first location; in accordance with a determination that the first characteristic intensity of the touch user input does not exceed an intensity threshold, display (e.g., with display enabling unit 2506) a preview of the first character on the touch-sensitive display unit (e.g., 2502); and in accordance with a determination that the first characteristic intensity of the touch user input at the first location exceeds the intensity threshold, display (e.g., with display enabling unit 2506) the first character at the character insertion point on the touch-sensitive display unit (e.g., 2502).

In accordance with some embodiments, the processing unit 2504 is further configured to: while continuing to detect (e.g., with detecting unit 2508) the touch user input on the touch-sensitive display unit (e.g., 2502): detect (e.g., with detecting unit 2508) movement of the touch user input from the first location to a second location on the touch-sensitive display unit (e.g., 2502) and with a second characteristic intensity, the second location associated with the keyboard and corresponding to a second character; determine (e.g., with determining unit 2510) a second characteristic intensity of the touch user input at the second location; in accordance with a determination that the second characteristic intensity of the touch user input does not exceed the intensity threshold, display (e.g., with display enabling unit 2506) a preview of the second character on the touch-sensitive display unit (e.g., 2502); and in accordance with a determination that the second characteristic intensity of the touch user input at the second location exceeds the intensity threshold, display (e.g., with display enabling unit 2506) the second character at the character insertion point on the touch-sensitive display unit (e.g., 2502).

In accordance with some embodiments, a characteristic intensity of the touch user input while moving from the first location to the second location does not exceed the intensity threshold.

In accordance with some embodiments, the processing unit 2504 is further configured to: determine (e.g., with determining unit 2510) that the touch user input is no longer detected on the touch-sensitive display unit (e.g., 2502); and in accordance with a determination that the touch user input is no longer detected, display (e.g., with display enabling unit 2506) a whitespace at the character insertion point on the touch-sensitive display unit (e.g., 2502).

In accordance with some embodiments, the processing unit 2504 is further configured to: determine (e.g., with determining unit 2510) that the touch user input is no longer detected; subsequent to determining that the touch user input is no longer detecting, detect (e.g., with detecting unit 2508) a second touch user input at a second location on the touch-sensitive display unit (e.g., 2502), the second location associated with the keyboard; and in response to detecting the second touch user input, display (e.g., with display enabling unit 2506) a whitespace at the character insertion point on the touch-sensitive display unit (e.g., 2502).

In accordance with some embodiments, the processing unit 2504 is further configured to: determine (e.g., with determining unit 2510) that the touch user input is no longer detected at a first time; subsequent to determining that the touch user input is no longer detected, detect (e.g., with detecting unit 2508) a second touch user input at a second location on the touch-sensitive display unit (e.g., 2502) at a second time, the second location associated with the keyboard; in response to detecting the second touch user input and in accordance with a determination that the second time is within a predetermined period of time after the first time, display (e.g., with display enabling unit 2506) a whitespace at the character insertion point on the touch-sensitive display unit (e.g., 2502).

In accordance with some embodiments, alphabet characters of the keyboard are arranged in alphabetical order. In accordance with some embodiments, alphabet characters of the keyboard are arranged in a QWERTY configuration.

The operations described above with reference to FIG. 24 are, optionally, implemented by components depicted in FIGS. 1A-1B or FIG. 25. For example, displaying operation 2402, detecting operation 2404, and determining operation 2406 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26A:
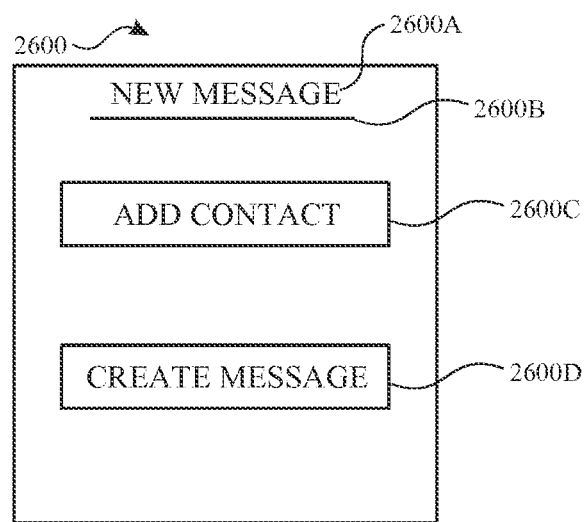
FIGS. 26A-26N illustrate exemplary user interfaces for receiving user input in accordance with some embodiments.
Figure 26B:
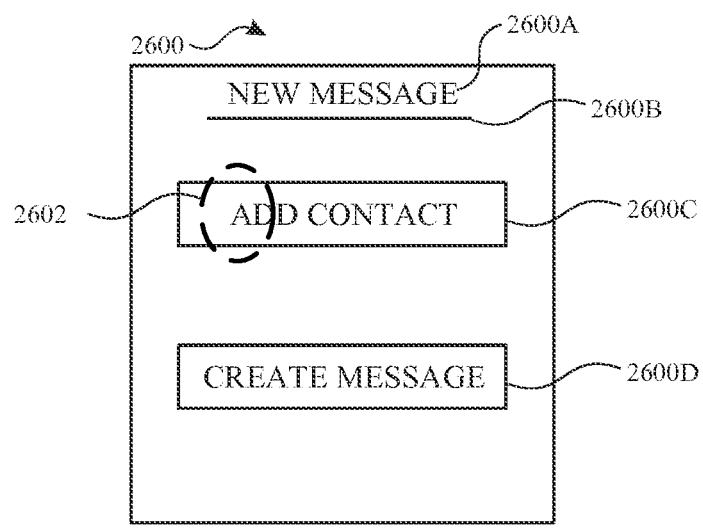
Figure 26C:
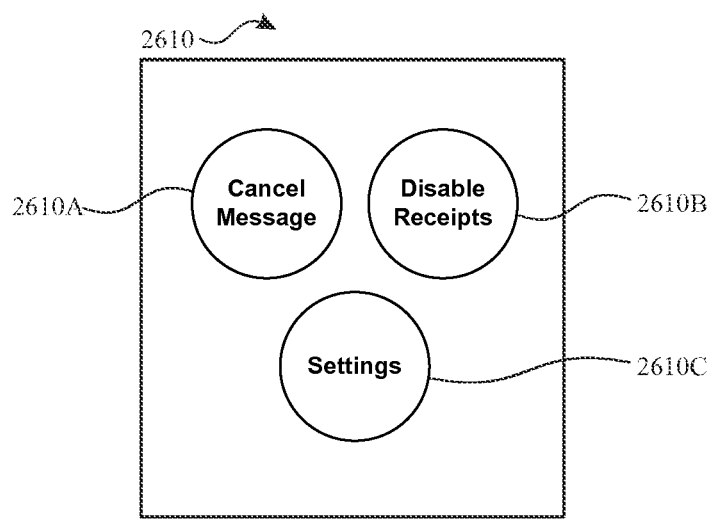
Figure 26D:
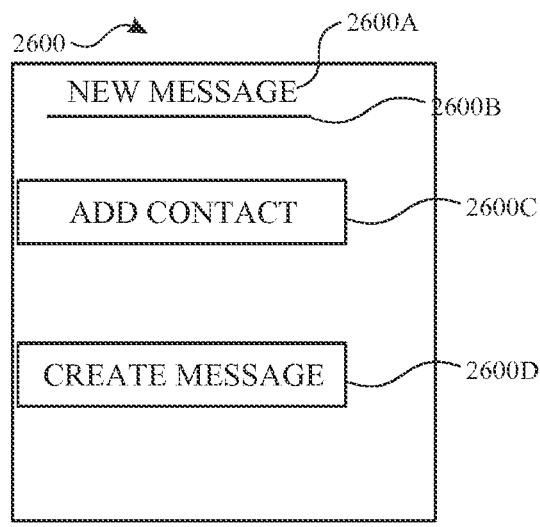
Figure 26E:
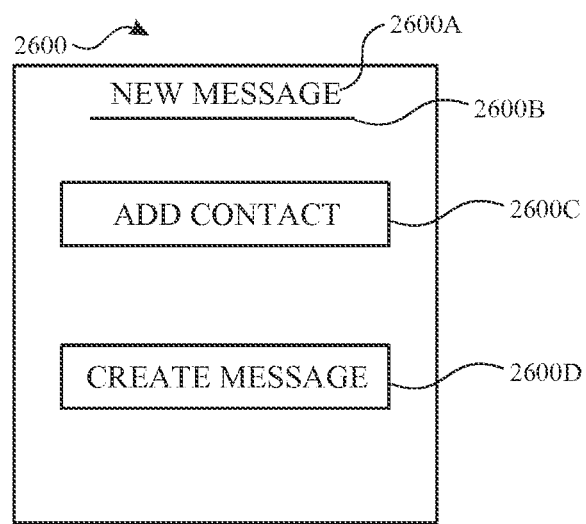
Figure 26F:
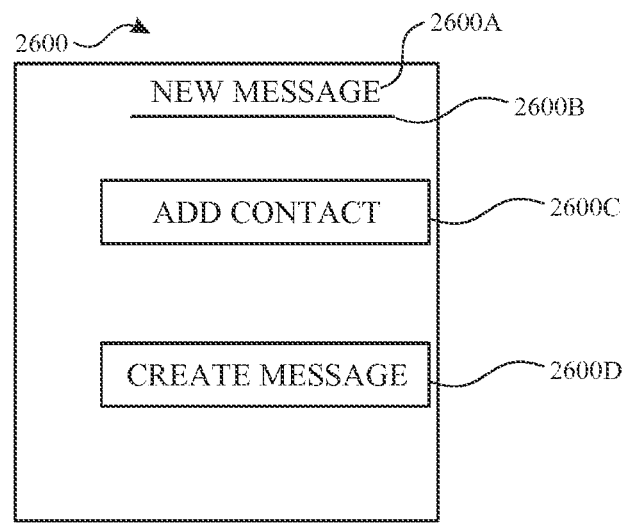
Figure 26G:
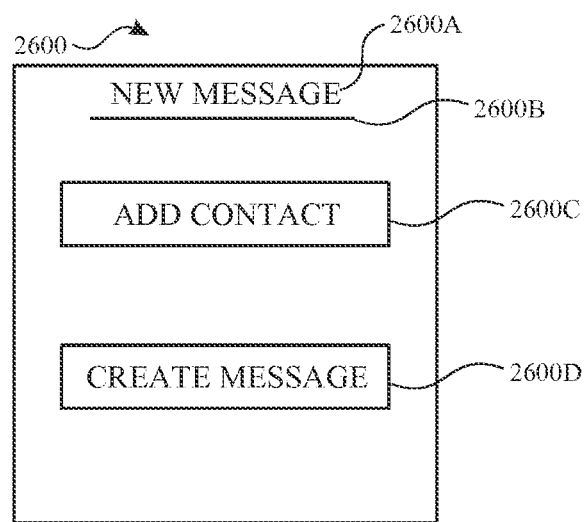
Figure 26H:
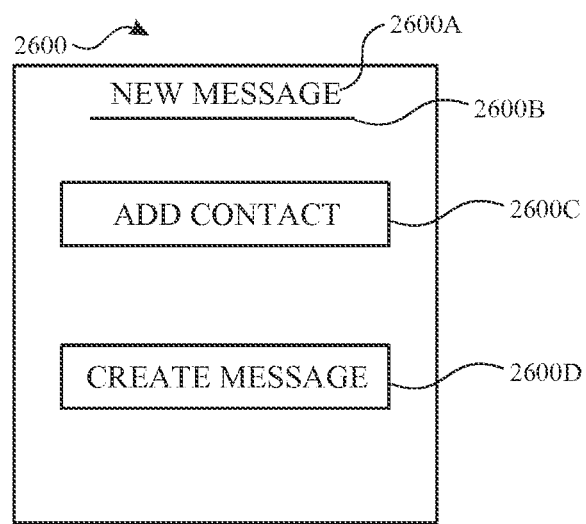
Figure 26I:
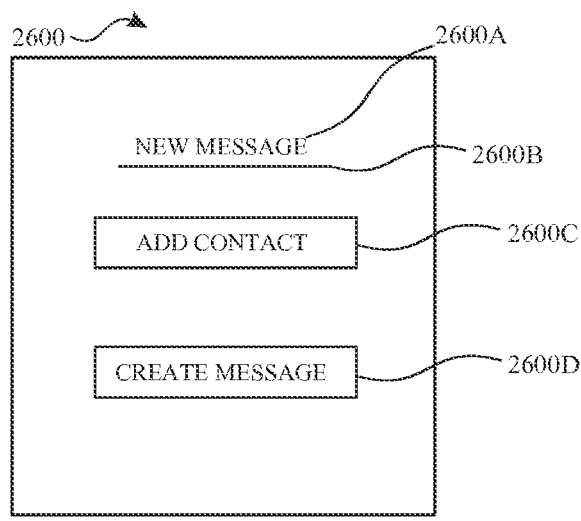
Figure 26J:
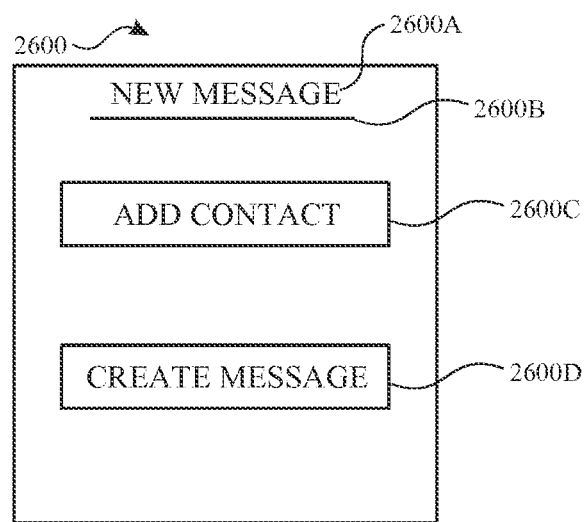
Figure 26K:
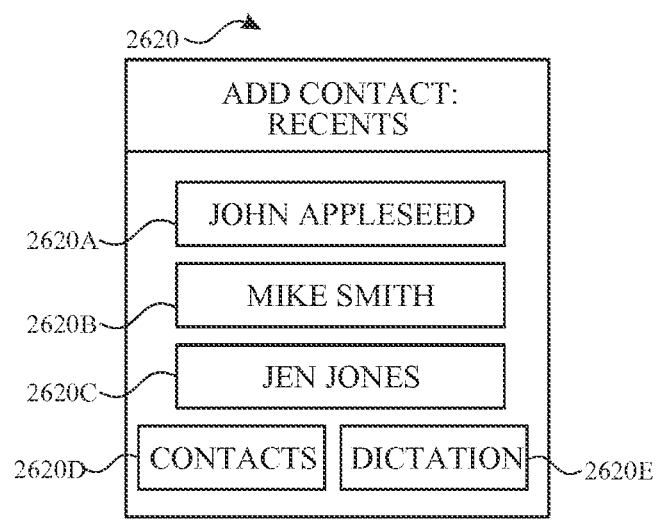
Figure 26L:
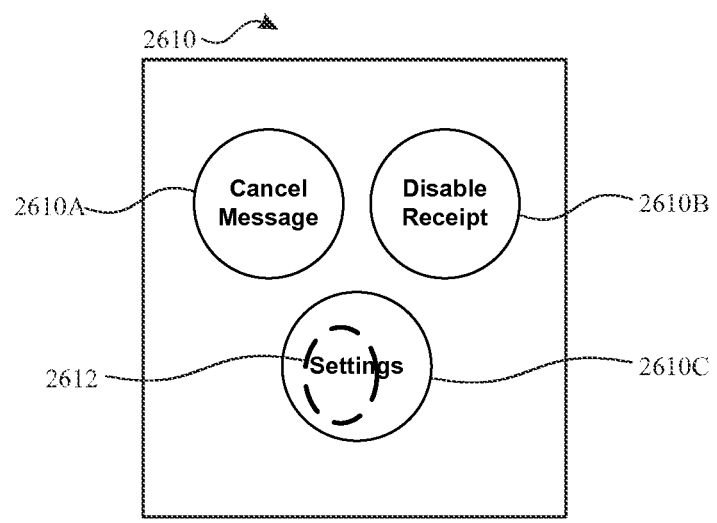
Figure 26M:
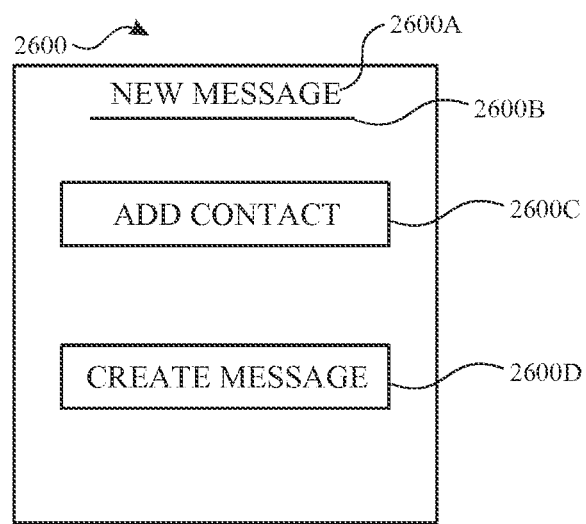
Figure 26N:
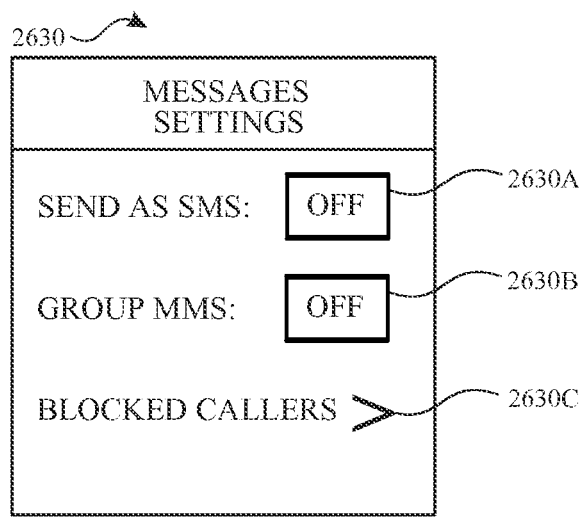

FIGS. 26A-26N illustrate exemplary user interfaces for receiving user input, in accordance with some embodiments.

The user interfaces in these figures are used to illustrate the processes described below, including the processes in FIG. 28. The user interfaces may be displayed, for example, at an electronic device (e.g., 100, 300, 500) with a display and a touch-sensitive surface configured to detect intensities of contacts.

At FIG. 26A, the device displays a user interface 2600A. The user interface 2600A includes a set of one or more affordances 2600C and 2600D (e.g., a first set of one or more affordances are displayed at a first position on the display). The user interface 2600A may also include, for example, a title 2600A and a partitioning element 2600B that separates the title 2600A from the set of one or more affordances 2600C and 2600D.

At FIG. 26B, while displaying the user interface 2600, the device receives a user input 2602, as illustrated by the dotted fingerprint outline, on the touch-sensitive surface. The device determines a characteristic intensity of the user input. In accordance with a determination that the characteristic intensity of the user input exceeds an intensity threshold (e.g., without regard to a location of the user input on the touch-sensitive surface), the device determines whether a contextual affordance (e.g., a second set of one or more contextual affordances, the contextual menu) is available for the user interface.

At FIG. 26C, in accordance with a determination that the contextual affordance 2610C is available (e.g., based on a current state of the device), the device displays the contextual affordance 2610C. For example, the device may display a contextual affordance(s) or a contextual menu (e.g., 2610A, 2610B, 2610C of user interface 2610) on top of the first set of one or more affordances or may replace the first set of one or more affordances. In some examples, the device ceases to display the user interface 2600 and/or the affordance 2600C when displaying the contextual affordance 2610C. Thus, when the device detects a hard press (exceeding a threshold) and determines that a contextual menu is available for the current state of the device, the device displays the contextual menu (e.g., including one or more contextual affordances).

FIGS. 26D-26G illustrate one example of a visual indication that the contextual affordance(s) is not available for the user interface. As illustrated in FIGS. 26D-26G, in accordance with a determination that the contextual affordance is not available (e.g., based on the current state of the device), the device displays a visual indication (such as the left-right shift of 2600A, 2600B, 2600C, 2600D) that the contextual affordance is not available for the user interface. Thus, when the device detects a hard press, the device displays a contextual menu (if it is available) or indicates to the user that a contextual menu is not available. By providing a visual indication that a contextual menu is not available, the user does not misinterpret the failure of a display of a contextual menu as a failure of the device to receive the user input. In other embodiments, the indication may be a non-visual indication (or a combination of a visual and non-visual indication), such as an audio indication, a haptic indication, or a combination of audio and haptic indication.

As illustrated in FIGS. 26D-26G, in some embodiments, displaying the visual indication comprises shifting the display of the set of one or more affordances 2600C and 2600D of the user interface 2600 one or more times (e.g., shifting an affordance of the set, shifting the first set of affordances, or the entire user interface shifts left to a second position, then shifts right to go past the first position to a third position, then shifts left to go to back the first position) on the display (and forgoing display of a contextual object). For example, this side-to-side shake indicates to the user that there is no contextual menu available for the current state of the device.

In some embodiments, displaying the visual indication comprises shifting the display of the set of one or more affordances 2600C and 2600D of the user interface one or more times in the left and right directions (e.g., the first set of affordances or the entire user interface shifts left to a second position, then shifts right to go past the first position to a third position, then shifts left to go to back the first position) on the display (and forgoing display of a contextual object). For example, this side-to-side shake indicates to the user that there is no contextual menu available for the current state of the device.

In some embodiments, displaying the visual indication comprises animating a horizontal shake of the set of one or more affordances. In some embodiments, displaying the visual indication comprises animating a vertical shake of the set of one or more affordances.

FIGS. 26H-26J illustrate another example of a visual indication that the contextual affordance is not available for the user interface. As illustrated in FIG. 26H-26J, in some embodiments, displaying the visual indication comprises reducing (as shown in FIG. 26I) the size of a first affordance 2600C of the set of one or more affordances of the user interface 26000 on the display, and subsequent to reducing the size of the first affordance 2600C of the set of one or more affordances 2600, increasing (e.g., as shown in FIG. 26J) the size of the first affordance 2600C of the set of one or more affordances 2600 on the display. For example, a first affordance 2600C (or, alternatively, the entire user interface) appears to push into the display (and therefore looks smaller) and then pops back out (and therefore returns to its original size). For example, this pushing in and popping back up motion indicates to the user that there is no contextual menu available for the current state of the device.

In some embodiments, displaying the visual indication comprises oscillating (e.g., the size, location, rotation) a first affordance of the set of one or more affordances of the user interface (or, alternatively, the entire user interface) on the display.

FIG. 26K illustrates an "Add Recent Contacts" user interface 2620. This user interface includes affordances (e.g., 2620A, 2620B, 2620C), which, when activated, cause the corresponding recent contact to be added as a recipient to a new message. Affordance 2620D, when activated, causes display of affordances for all contacts (rather than recent contacts). Affordance 2620E, when activated, causes a microphone of the device to become active for transcribing user speech into text.

In some embodiments, in accordance with a determination that the characteristic intensity of the user input 2602 does not exceed the intensity threshold, the device performs an action based on a location of the user input on the touch-sensitive surface. For example, the device determines that the input 2602 is for activating an affordance 2600C of the set of one or more affordances that corresponds to the location of the user input 2602. Thus, the user input 2602 illustrated at FIG. 26B activates affordance 2600C, and causes the device to display "Add Recent Contacts" user interface 2620 at FIG. 26K.

In some embodiments, in accordance with a determination that the characteristic intensity of the user input 2602 does not exceed the intensity threshold, the device determines whether a location of the user input 2602 corresponds to a location of an affordance 2600C of the set of one or more affordances. In accordance with a determination that the user input 2602 corresponds to the location of the affordance 2600C of the set of one or more affordances, the device performs an action associated with the affordance of the set of one or more affordances, such as the action of displaying the "Add Recent Contacts" user interface 2620 of FIG. 26K.

In some embodiments, performing the action associated with the affordance of the set of one or more affordances comprises launching an application associated with the affordance. Thus, activating the affordance causes the device to launch an application.

In some embodiments, performing the action associated with the affordance of the set of one or more affordances comprises displaying one or more characters in a text field. Thus, activating the affordance (e.g., a key of a display keyboard) causes the device to display a character (e.g., the character associated with the key of the displayed keyboard) into the text field.

In some embodiments, performing the action associated with the affordance of the set of one or more affordances comprises activating an action associated with a notification. In some embodiments, performing the action associated with the affordance of the set of one or more affordances comprises displaying one or more emoji in a text field.

In some embodiments, performing the action associated with the affordance of the set of one or more affordances comprises activating voice input functionality for transcription into a text field. For example, the device enters a mode in which a microphone is activated and speech is transcribed and entered into the text field.

In some embodiments, performing the action associated with the affordance of the set of one or more affordances comprises activating a user interface for adding an emoji into a text field. In some embodiments, performing the action associated with the affordance of the set of one or more affordances comprises activating a user interface for transcribing voice input.

FIG. 26L illustrates contextual user interface 2610, including a second user input 2612, as indicated by the dotted fingerprint outline. In some embodiments, while displaying the contextual affordance 2610C (e.g., the second set of one or more affordances; the contextual menu), the device receives a second user input 2612 on the touch-sensitive surface. The device determines a characteristic intensity of the second user input 2612. In accordance with a determination that the characteristic intensity of the second user input 2612 exceeds a second intensity threshold, the device ceases to display the contextual affordance 2610C (e.g., the second set of one or more affordances; the contextual menu) and displays the set of one or more affordances 2600C and 2600D, as illustrated in FIG. 26M. Thus, this second user input 2612 dismisses the contextual menu and displays the initial user interface.

In some embodiments, while displaying the contextual affordance 2610C (e.g., a second set of one or more contextual affordances; the contextual menu), the device receives a second user input 2612 on the touch-sensitive surface. The device determines a characteristic intensity of the second user input 2612. In accordance with a determination that the characteristic intensity of the second user input 2612 does not exceed the second intensity threshold, the device performs a second action based on a location of the second user input 2612. For example, this second user input 2612 activates a contextual affordance 2630C corresponding to the location of the second user input 2612 on the touch-sensitive surface, which causes the device to display a user interface 2630 of FIG. 26N.

FIG. 26N illustrates the user interface 2630, including an affordance 2630A (which when activated causes messages to be delivered as SMS messages, rather than messages over a data network), affordance 2630B (which when activated causes group MMS to be enabled for a messaging application), and affordance 2630C (which when activated displays a list of blocked callers and options to add/remove callers to the list of blocked callers).

In some embodiments, while the device displays the contextual affordance 2610C (e.g., the second set of one or more affordances; the contextual menu), the device receives a second user input 2612 on the touch-sensitive surface. In accordance with a determination that the characteristic intensity of the second user input 2612 does not exceed the second intensity threshold, the device determines whether a location of the second user input 2612 corresponds to a location of the contextual affordance. In accordance with a determination that the second user input 2612 corresponds to the location of the contextual affordance, the device performs a second action associated with the contextual affordance 2610C (e.g., activating the displayed contextual affordance 2610C corresponding to the location of the second user input). For example, this second user input 2612 activates a contextual affordance 2630C corresponding to the location of the second user input 2612 on the touch-sensitive surface, which causes the device to display the user interface 2630 of FIG. 26N.

In some embodiments, the intensity threshold is the same as the second intensity threshold. In other embodiments, the intensity threshold is different from the second intensity threshold.

Figure 27:
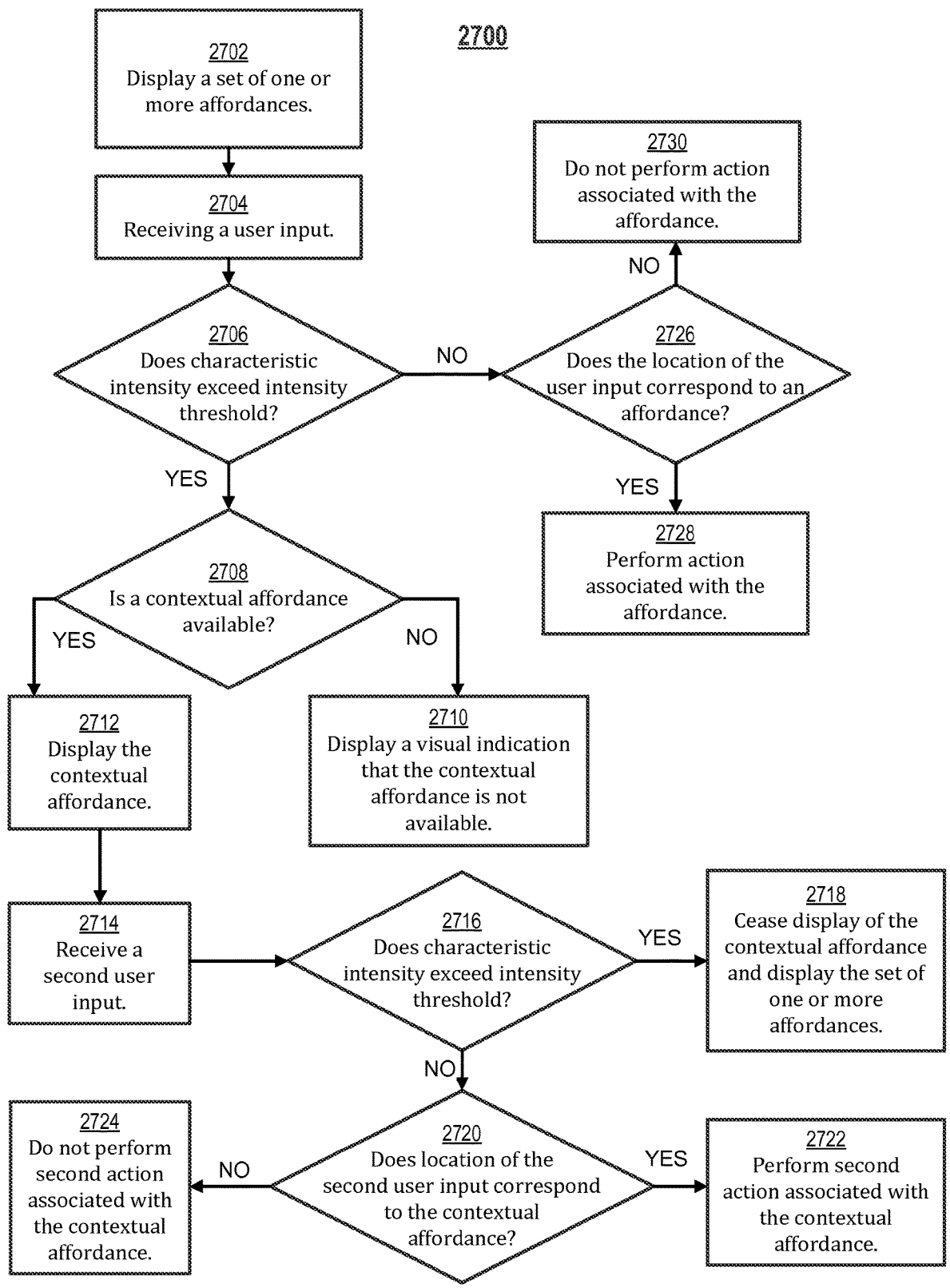
FIG. 27 is a flow diagram illustrating an exemplary process for receiving user input in accordance with some embodiments.

FIG. 27 is a flow diagram illustrating a method for receiving user input using an electronic device in accordance with some embodiments. Method 2700 is performed at a device (e.g., 100, 300, 500) with a display and a touch-sensitive surface. The touch-sensitive surface is configured to detect intensities of contacts. Some operations in method 2700 may be combined, the order of some operations may be changed, and some operations may be omitted.

As described below, method 2700 provides an intuitive way to receive user input. The method reduces the cognitive burden on a user by simplifying access to a contextual menu, thereby creating a more efficient human-machine interface. For battery-operated computing devices, enabling a user to access a contextual menu faster and more efficiently conserves power and increases the time between battery charges.

At block 2702, the device displays a user interface (e.g., 2600) including a set of one or more affordances (e.g., 2600C and 2600D). At block 2704, while displaying the user interface (e.g., 2600), the device receives a user input (e.g., 2602) on the touch-sensitive surface. At block 2706, the device determines whether a characteristic intensity of the user input exceeds an intensity threshold. At block 2708, in accordance with a determination that the characteristic intensity of the user input exceeds an intensity threshold, the device determines whether a contextual affordance is available for the user interface.

At block 2712, in accordance with a determination that the contextual affordance is available, the device displays the contextual affordance (e.g., 2610C). At block 2710, in accordance with a determination that the contextual affordance (e.g., 2610C) is not available, the device displays a visual indication (e.g., as illustrated in FIGS. 26D-26G or FIGS. 26H-26J) that the contextual affordance (e.g., 2610C) is not available for the user interface (e.g., 2600).

In some embodiments, the visual indication comprises shifting the display of the set of one or more affordances of the user interface one or more times (e.g., shifting an affordance of the set, shifting the first set of affordances, or shifting the entire user interface shifts left to a second position, then shifts right to go past the first position to a third position, then shifts left to go to back the first position) on the display (and forgoing display of a contextual object). For example, this side-to-side shake indicates to the user that there is no contextual menu available for the current state of the device.

In some embodiments, displaying the visual indication comprises shifting the display of the set of one or more affordances of the user interface one or more times in the left and right directions (e.g., the first set of affordances or the entire user interface shifts left to a second position, then shifts right to go past the first position to a third position, then shifts left to go to back the first position) on the display (and forgoing display of a contextual object). For example, this side-to-side shake indicates to the user that there is no contextual menu available for the current state of the device.

In some embodiments, displaying the visual indication comprises reducing the size of a first affordance of the set of one or more affordances of the user interface on the display, and subsequent to reducing the size of the first affordance of the set of one or more affordances, increasing the size of the first affordance of the set of one or more affordances on the display. For example, a first affordance (or, alternatively, the entire user interface) pushes in (and therefore looks smaller) and then pops back out (and therefore returns to its original size). For example, this pushing in and popping back up motion indicates to the user that there is no contextual menu available for the current state of the device.

In some embodiments, displaying the visual indication comprises oscillating (e.g., the size, location, rotation) a first affordance of the set of one or more affordances of the user interface (or, alternatively, the entire user interface) on the display. In some embodiments, displaying the visual indication comprises animating a horizontal shake of the set of one or more affordances. In some embodiments, displaying the visual indication comprises animating a vertical shake of the set of one or more affordances.

At block 2726, in some embodiments, in accordance with a determination that the characteristic intensity of the user input does not exceed the intensity threshold, the device determines whether a location of the user input (e.g., 2602) corresponds to a location of an affordance (e.g., 2600C) of the set of one or more affordances. At block 2728, in accordance with a determination that the user input (e.g., 2602) corresponds to the location of the affordance (e.g., 2600C) of the set of one or more affordances, the device performs an action associated with the affordance (e.g., 2600C) of the set of one or more affordances. At block 2730, in accordance with a determination that the user input does not correspond to the location of an affordance of the set of one or more affordances, the device forgoes performing (or does not perform) an action associated with an affordance of the set of one or more affordances.

In some embodiments, in accordance with a determination that the characteristic intensity of the user input does not exceed the intensity threshold, the device performs an action based on a location of the user input (e.g., activating an affordance of the set of one or more affordances that corresponds to the location of the user input) on the touch-sensitive surface.

In some embodiments, performing the action associated with the affordance of the set of one or more affordances comprises launching an application associated with the affordance. In some embodiments, performing the action associated with the affordance of the set of one or more affordances comprises displaying one or more characters in a text field. In some embodiments, performing the action associated with the affordance of the set of one or more affordances comprises activating an action associated with a notification. In some embodiments, performing the action associated with the affordance of the set of one or more affordances comprises displaying one or more emoji in a text field. In some embodiments, performing the action associated with the affordance of the set of one or more affordances comprises activating voice input functionality for transcription into a text field. In some embodiments, performing the action associated with the affordance of the set of one or more affordances comprises activating a user interface for adding an emoji into a text field. In some embodiments, performing the action associated with the affordance of the set of one or more affordances comprises activating a user interface for transcribing voice input.

In some embodiments, at block 2714, while displaying the contextual affordance (e.g., 2610C), the device receives a second user input (e.g., 2612) on the touch-sensitive surface. At block 2716, the device determines whether a characteristic intensity of the second user input (e.g., 2612) exceeds a second intensity threshold.

In some embodiments, at block 2718, in accordance with a determination that the characteristic intensity of the second user input (e.g., 2612) exceeds the second intensity threshold, the device ceases display of the contextual affordance and displays the set of one or more affordances (e.g., 2600C and 2600D).

In some embodiments, at block 2720, in accordance with a determination that the characteristic intensity of the second user input (e.g., 2612) does not exceed the second intensity threshold, the device determines whether a location of the second user input (e.g., 2612) corresponds to a location of the contextual affordance (e.g., 2610C). At block 2722, in accordance with a determination that the second user input (e.g., 2612) corresponds to the location of the contextual affordance (e.g., 2610C), the device performs a second action associated with the contextual affordance (e.g., 2610C). At block 2724, in accordance with a determination that the second user input (e.g., 2612) does not correspond to the location of the contextual affordance (e.g., 2610C), the device forgoes (or does not perform) a second action associated with the contextual affordance (e.g., 2610C).

In some embodiments, in accordance with a determination that the characteristic intensity of the second user input does not exceed the second intensity threshold, the device performs a second action based on a location of the second user input (e.g., activating the displayed contextual affordance corresponding to the location of the second user input) on the touch-sensitive surface.

In some embodiments, the intensity threshold is the same as the second intensity threshold. This provides a consistent user interface. In other embodiments, the intensity threshold is different from the second intensity threshold. This provides the ability to make performing certain functions more or less difficult. For example, a harder press may be needed on the touch-sensitive surface to activate a contextual menu that includes a "reformat your device" feature, while a less hard press may be needed to activate a contextual menu that provides access to device settings.

Note that details of the processes described above with respect to method 2700 (e.g., FIG. 27) are also applicable in an analogous manner to the methods described above. For example, methods 700, 900, 1000, 1200, 1400, 1420, and 1600 may include one or more of the characteristics of the various methods described above with reference to method 2700. For example, user interface 602 may be the same user interface as 2600. For another example, some of the described user interfaces may have a contextual menu, such as contextual menu 2610, associated with them. For brevity, these details are not repeated.

Figure 28:
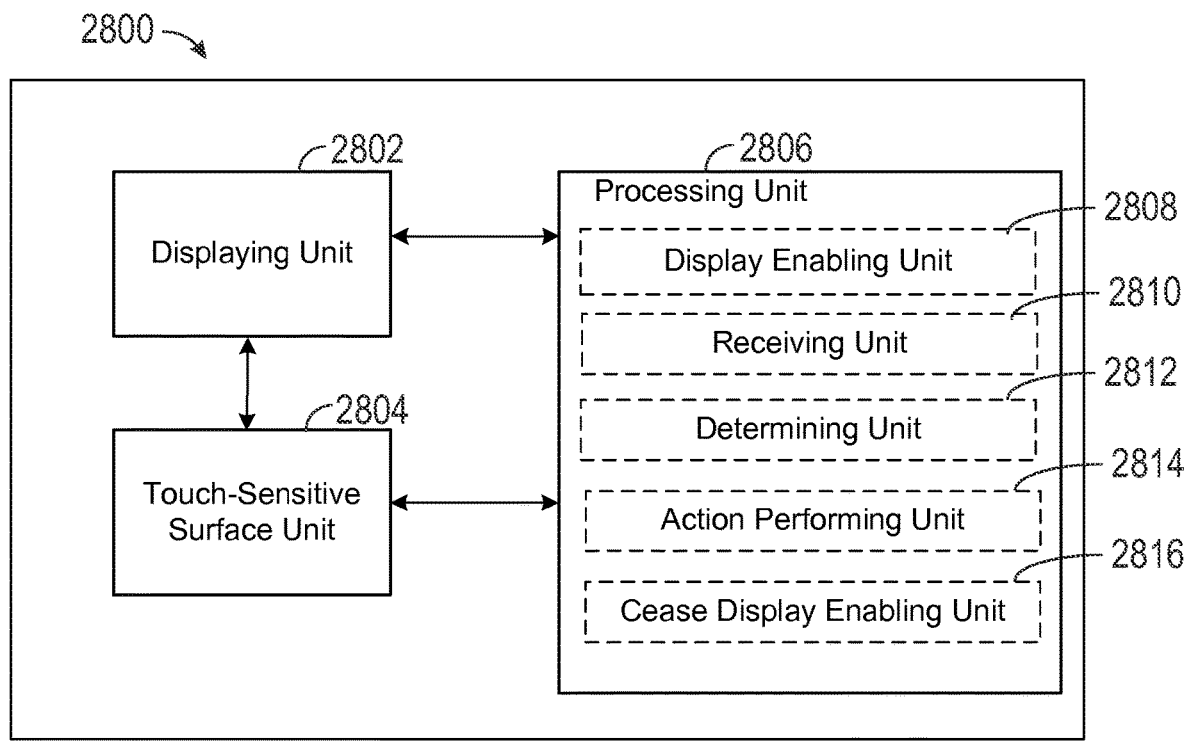
FIG. 28 illustrates a functional block diagram in accordance with some embodiments.

In accordance with some embodiments, FIG. 28 shows an exemplary functional block diagram of an electronic device 2800 configured in accordance with the principles of the various described embodiments. In accordance with some embodiments, the functional blocks of electronic device 2800 are configured to perform the techniques described above. The functional blocks of the device 2800 are, optionally, implemented by hardware, software, or a combination of hardware and software to carry out the principles of the various described examples. It is understood by persons of skill in the art that the functional blocks described in FIG. 28 are, optionally, combined or separated into sub-blocks to implement the principles of the various described examples. Therefore, the description herein optionally supports any possible combination or separation or further definition of the functional blocks described herein.

As shown in FIG. 28, an electronic device 2800 includes a displaying unit 2802 configured to display a graphic user interface, a touch-sensitive surface unit 2804 configured to detect intensity of contacts, and a processing unit 2806 coupled to the displaying unit 2802 and the touch-sensitive surface unit 2804. In some embodiments, the processing unit 2806 includes a display enabling unit 2808, a receiving unit 2810, a determining unit 2812, an action performing unit 2814, and a cease display enabling unit 2816.

The processing unit 2806 is configured to: enable display (e.g., using display enabling unit 2808) a user interface including a set of one or more affordances; while enabling display of the user interface, receive (e.g., using receiving unit 2810) a user input on the touch-sensitive surface; determine (e.g., using determining unit 2812) a characteristic intensity of the user input; and in accordance with a determination that the characteristic intensity of the user input exceeds an intensity threshold: determine (e.g., using determining unit 2812) whether a contextual affordance is available for the user interface; in accordance with a determination that the contextual affordance is available, enable display (e.g., using display enabling unit 2808) of the contextual affordance; and in accordance with a determination that the contextual affordance is not available, enable display (e.g., using display enabling unit 2808) of a visual indication that the contextual affordance is not available for the user interface.

In some embodiments, displaying the visual indication comprises shifting the display of the set of one or more affordances of the user interface one or more times on the display.

In some embodiments, displaying the visual indication comprises shifting the display of the set of one or more affordances of the user interface one or more times in the left and right directions on the display.

In some embodiments, displaying the visual indication comprises reducing a size of a first affordance of the set of one or more affordances of the user interface on the display; and subsequent to reducing the size of the first affordance of the set of one or more affordances, increasing the size of the first affordance of the set of one or more affordances on the display.

In some embodiments, displaying the visual indication comprises oscillating a first affordance of the set of one or more affordances of the user interface on the display.

In some embodiments, the processing unit 2806 is further configured to: in accordance with a determination that the characteristic intensity of the user input does not exceed the intensity threshold: perform (e.g., using action performing unit 2814) an action based on a location of the user input on the touch-sensitive surface.

In some embodiments, the processing unit 2806 is further configured to: in accordance with a determination that the characteristic intensity of the user input does not exceed the intensity threshold: determine (e.g., using determining unit 2812) whether a location of the user input corresponds to a location of an affordance of the set of one or more affordances; and in accordance with a determination that the user input corresponds to the location of the affordance of the set of one or more affordances, perform (e.g., using action performing unit 2814) an action associated with the affordance of the set of one or more affordances.

In some embodiments, performing the action associated with the affordance of the set of one or more affordances comprises launching an application associated with the affordance. In some embodiments, performing the action associated with the affordance of the set of one or more affordances comprises enabling display of one or more characters in a text field. In some embodiments, performing the action associated with the affordance of the set of one or more affordances comprises activating an action associated with a notification. In some embodiments, performing the action associated with the affordance of the set of one or more affordances comprises enabling display of one or more emoji in a text field.

In some embodiments, performing the action associated with the affordance of the set of one or more affordances comprises activating voice input functionality for transcription into a text field. In some embodiments, performing the action associated with the affordance of the set of one or more affordances comprises activating a user interface for adding an emoji into a text field. In some embodiments, performing the action associated with the affordance of the set of one or more affordances comprises activating a user interface for transcribing voice input.

In some embodiments, the processing unit 2806 is further configured to: while enabling display the contextual affordance, receive (e.g., using receiving unit 2810) a second user input on the touch-sensitive surface; determine (e.g., using determining unit 2812) a characteristic intensity of the second user input; and in accordance with a determination that the characteristic intensity of the second user input exceeds a second intensity threshold: cease display (e.g., using cease display enabling unit 2816) of the contextual affordance and displaying the set of one or more affordances.

In some embodiments, the processing unit 2806 is further configured to: while enabling display of the contextual affordance, receive (e.g., using receiving unit 2810) a second user input on the touch-sensitive surface; determine (e.g., using determining unit 2812) a characteristic intensity of the second user input; and in accordance with a determination that the characteristic intensity of the second user input does not exceed the second intensity threshold: perform (e.g., using action performing unit 2814) a second action based on a location of the second user input on the touch-sensitive surface.

In some embodiments, the processing unit 2806 is further configured to: while enabling display of the contextual affordance, receive (e.g., using receiving unit 2810) a second user input on the touch-sensitive surface; in accordance with a determination that the characteristic intensity of the second user input does not exceed the second intensity threshold: determine (e.g., using determining unit 2812) whether a location of the second user input corresponds to a location of the contextual affordance; and in accordance with a determination that the second user input corresponds to the location of the contextual affordance, perform (e.g., using action performing unit 2814) a second action associated with the contextual affordance.

In some embodiments, enabling display of the visual indication comprises animating a horizontal shake of the set of one or more affordances. In some embodiments, enabling display of the visual indication comprises animating a vertical shake of the set of one or more affordances.

In some embodiments, the intensity threshold is the same as the second intensity threshold.

The operations described above with reference to FIG. 27 are, optionally, implemented by components depicted in FIGS. 1A-1B or FIG. 28. For example, displaying operation 2702 and receiving operation 2704 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer-readable storage medium storing one or more programs, the one or more programs comprising instructions, which when executed by one or more processors of an electronic device with a display, cause the device to:
   receive a user input;
   in response to receiving the user input:
      identify a most recently accessed user input technique of a set of user input techniques, wherein the most recently accessed user input technique has a first user input interface;
      identify a least recently accessed user input technique of the set of user input techniques, wherein the least recently accessed user input technique has a second user input interface different than the first user input interface;
      display, on the display, the first user input interface of the most recently accessed user input technique; and
      display, on the display, a first affordance associated with the second user input interface of the least recently accessed user input technique; and
   while displaying the first user input interface, receive user input associated with the first affordance; and
   in response to receiving the user input associated with the first affordance, replace display of the first user input interface of the most recently accessed user input technique with display of the second user input interface of the least recently accessed user input technique.

2. The non-transitory computer-readable storage medium of claim 1, wherein the user input interface of the most recently accessed user input technique comprises a selection affordance associated with the most recently accessed user input technique.

3. The non-transitory computer-readable storage medium of claim 1, wherein the non-transitory computer-readable storage medium further comprises instructions, which when executed by the one or more processors of the electronic device, cause the device to:
   in response to receiving the user input:
      identify a second-most recently accessed user input technique of the set of user input techniques; and
      display, on the display, a second affordance associated with a user input interface of the second-most recently accessed user input technique.

4. The non-transitory computer-readable storage medium of claim 3, wherein the most recently accessed user input technique, the least recently accessed user input technique, and the second-most recently accessed user input technique are different techniques of the set of user input techniques.

5. The non-transitory computer-readable storage medium of claim 3, wherein the most recently accessed user input technique, the least recently accessed user input technique, and the second-most recently accessed user input technique are selected from the group comprising a recent contacts functionality, an all contacts functionality, and a dictation functionality.

6. The non-transitory computer-readable storage medium of claim 3, wherein the most recently accessed user input technique, the least recently accessed user input technique, and the second-most recently accessed user input technique are selected from the group comprising a suggested replies functionality, an emoji functionality, and a dictation functionality.

7. The non-transitory computer-readable storage medium of claim 1, wherein the set of user input techniques is a closed set of predetermined input techniques.

8. The non-transitory computer-readable storage medium of claim 1, wherein a quantity of user input techniques of the set of user input techniques is predetermined.

9. The non-transitory computer-readable storage medium of claim 1, wherein the first affordance provides an indication of the least recently accessed user input technique.

10. The non-transitory computer-readable storage medium of claim 3, wherein the second affordance provides an indication of the second-most recently accessed user input technique.

11. The non-transitory computer-readable storage medium of claim 3, wherein the first affordance, the second affordance, and the user input interface of the most recently accessed user input technique are concurrently displayed.

12. The non-transitory computer-readable storage medium of claim 3, wherein the non-transitory computer-readable storage medium further comprises instructions, which when executed by the one or more processors of the electronic device, cause the device to:
in response to receiving the user input associated with the first affordance:
replace display of the user input interface of the most recently accessed user input technique with display of the user input interface of the least recently accessed user input technique;
replace display of the first affordance associated with the user input interface of the least recently accessed user input technique with display of a third affordance associated with the user input interface of the second-most recently accessed user input technique; and
replace display of the second affordance associated with the user input interface of the second-most recently accessed user input technique with display of a fourth affordance associated with the user input interface of the most recently accessed user input technique.

13. A method, comprising:
at an electronic device with a display:
receiving a user input;
in response to receiving the user input:
identifying a most recently accessed user input technique of a set of user input techniques, wherein the most recently accessed user input technique has a first user input interface;
identifying a least recently accessed user input technique of the set of user input techniques, wherein the least recently accessed user input technique has a second user input interface different than the first user input interface;
displaying, on the display, the first user input interface of the most recently accessed user input technique; and
displaying, on the display, a first affordance associated with the second user input interface of the least recently accessed user input technique; and
while displaying the first user input interface, receiving user input associated with the first affordance; and
in response to receiving the user input associated with the first affordance, replacing display of the first user input interface of the most recently accessed user input technique with display of the second user input interface of the least recently accessed user input technique.

14. An electronic device, comprising:
a display;
one or more processors;
a memory; and
one or more programs, wherein the one or more programs are stored in the memory and configured to be executed by the one or more processors, the one or more programs including instructions for:
receiving a user input;
in response to receiving the user input:
identifying a most recently accessed user input technique of a set of user input techniques, wherein the most recently accessed user input technique has a first user input interface;
identifying a least recently accessed user input technique of the set of user input techniques, wherein the least recently accessed user input technique has a second user input interface different than the first user input interface;
displaying, on the display, the first user input interface of the most recently accessed user input technique; and
displaying, on the display, a first affordance associated with the second user input interface of the least recently accessed user input technique; and
while displaying the first user input interface, receiving user input associated with the first affordance; and
in response to receiving the user input associated with the first affordance, replacing display of the first user input interface of the most recently accessed user input technique with display of the second user input interface of the least recently accessed user input technique.

15. The method of claim 13, wherein the user input interface of the most recently accessed user input technique comprises a selection affordance associated with the most recently accessed user input technique.

16. The method of claim 13, wherein the method further comprising:
in response to receiving the user input:
identify a second-most recently accessed user input technique of the set of user input techniques; and
display, on the display, a second affordance associated with a user input interface of the second-most recently accessed user input technique.

17. The method of claim 16, wherein the most recently accessed user input technique, the least recently accessed user input technique, and the second-most recently accessed user input technique are different techniques of the set of user input techniques.

18. The method of claim 16, wherein the most recently accessed user input technique, the least recently accessed user input technique, and the second-most recently accessed user input technique are selected from the group comprising a recent contacts functionality, an all contacts functionality, and a dictation functionality.

19. The method of claim 16, wherein the most recently accessed user input technique, the least recently accessed user input technique, and the second-most recently accessed user input technique are selected from the group comprising a suggested replies functionality, an emoji functionality, and a dictation functionality.

20. The method of claim 13, wherein the set of user input techniques is a closed set of predetermined input techniques.

21. The method of claim 13, wherein a quantity of user input techniques of the set of user input techniques is predetermined.

22. The method of claim 13, wherein the first affordance provides an indication of the least recently accessed user input technique.

23. The method of claim 16, wherein the second affordance provides an indication of the second-most recently accessed user input technique.

24. The method of claim 16, wherein the first affordance, the second affordance, and the user input interface of the most recently accessed user input technique are concurrently displayed.

25. The method of claim 16, wherein the method further comprising:
in response to receiving the user input associated with the first affordance:
replace display of the user input interface of the most recently accessed user input technique with display of the user input interface of the least recently accessed user input technique;

replace display of the first affordance associated with the user input interface of the least recently accessed user input technique with display of a third affordance associated with the user input interface of the second-most recently accessed user input technique; and replace display of the second affordance associated with the user input interface of the second-most recently accessed user input technique with display of a fourth affordance associated with the user input interface of the most recently accessed user input technique.

26. The electronic device of claim 14, wherein the user input interface of the most recently accessed user input technique comprises a selection affordance associated with the most recently accessed user input technique.

27. The electronic device of claim 14, wherein the one or more programs further including instructions for:

in response to receiving the user input:
identify a second-most recently accessed user input technique of the set of user input techniques; and
display, on the display, a second affordance associated with a user input interface of the second-most recently accessed user input technique.

28. The electronic device of claim 27, wherein the most recently accessed user input technique, the least recently accessed user input technique, and the second-most recently accessed user input technique are different techniques of the set of user input techniques.

29. The electronic device of claim 27, wherein the most recently accessed user input technique, the least recently accessed user input technique, and the second-most recently accessed user input technique are selected from the group comprising a recent contacts functionality, an all contacts functionality, and a dictation functionality.

30. The electronic device of claim 27, wherein the most recently accessed user input technique, the least recently accessed user input technique, and the second-most recently accessed user input technique are selected from the group comprising a suggested replies functionality, an emoji functionality, and a dictation functionality.

31. The electronic device of claim 14, wherein the set of user input techniques is a closed set of predetermined input techniques.

32. The electronic device of claim 14, wherein a quantity of user input techniques of the set of user input techniques is predetermined.

33. The electronic device of claim 14, wherein the first affordance provides an indication of the least recently accessed user input technique.

34. The electronic device of claim 27, wherein the second affordance provides an indication of the second-most recently accessed user input technique.

35. The electronic device of claim 27, wherein the first affordance, the second affordance, and the user input interface of the most recently accessed user input technique are concurrently displayed.

36. The electronic device of claim 27, wherein the one or more programs further including instructions for:

in response to receiving the user input associated with the first affordance:
replace display of the user input interface of the most recently accessed user input technique with display of the user input interface of the least recently accessed user input technique;

replace display of the first affordance associated with the user input interface of the least recently accessed user input technique with display of a third affordance associated with the user input interface of the second-most recently accessed user input technique; and replace display of the second affordance associated with the user input interface of the second-most recently accessed user input technique with display of a fourth affordance associated with the user input interface of the most recently accessed user input technique.

* * * * *

UNITED STATES PATENT AND TRADEMARK OFFICE
CERTIFICATE OF CORRECTION

| | |
|---|---|
| PATENT NO. | : 10,613,743 B2 |
| APPLICATION NO. | : 14/833014 |
| DATED | : April 7, 2020 |
| INVENTOR(S) | : Nicholas Zambetti et al. |

It is certified that error appears in the above-identified patent and that said Letters Patent is hereby corrected as shown below:

On the Title Page

Page 2, Column 1, in the last sentence of item (57) the Abstract, delete "keyboard is displays for receiving user input." and insert -- "keyboard is displayed for receiving user input." --.

Signed and Sealed this
Twenty-fifth Day of June, 2024

Katherine Kelly Vidal
*Director of the United States Patent and Trademark Office*